United States Patent
Zhang et al.

(10) Patent No.: US 12,543,157 B2
(45) Date of Patent: *Feb. 3, 2026

(54) METHOD AND APPARATUS FOR MANAGING SECONDARY CARRIER IN SIDELINK COMMUNICATION

(71) Applicant: Huawei Technologies Co., Ltd., Shenzhen (CN)

(72) Inventors: Mengchen Zhang, Beijing (CN); Haibo Xu, Beijing (CN); Jian Wang, Beijing (CN); Chuting Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 498 days.

This patent is subject to a terminal disclaimer.

(21) Appl. No.: 17/927,499
(22) PCT Filed: May 21, 2021
(86) PCT No.: PCT/CN2021/095061
§ 371 (c)(1),
(2) Date: Nov. 23, 2022
(87) PCT Pub. No.: WO2021/238780
PCT Pub. Date: Dec. 2, 2021

(65) Prior Publication Data
US 2023/0292295 A1    Sep. 14, 2023

(30) Foreign Application Priority Data
May 25, 2020 (CN) .......................... 202010450899.2

(51) Int. Cl.
H04W 72/0453 (2023.01)
H04L 5/00 (2006.01)
H04W 72/40 (2023.01)

(52) U.S. Cl.
CPC ....... H04W 72/0453 (2013.01); H04L 5/0098 (2013.01); H04W 72/40 (2023.01)

(58) Field of Classification Search
CPC . H04W 72/0453; H04W 72/40; H04W 88/04; H04W 92/18; H04W 76/15;
(Continued)

(56) References Cited

U.S. PATENT DOCUMENTS 11,438,892 B2   9/2022  Hou et al.
2011/0038266 A1*  2/2011  Kim ...................... H04W 24/08
                                                          370/242
(Continued)

FOREIGN PATENT DOCUMENTS

CN          109246659 A     1/2019
CN          109379171 A     2/2019
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 16)," 3GPP TS 36.321 V16.0.0, Mar. 2020, 141 pages.

*Primary Examiner* — Ian N Moore
(74) *Attorney, Agent, or Firm* — Slater Matsil, LLP

(57) ABSTRACT

Embodiments of this application relate to a wireless communication method applied to transmission user equipment (Tx UE), including: receiving first secondary carrier status indication information from a network device, to indicate that each of a plurality of secondary carriers is in an activated state or a deactivated state, the plurality of secondary carriers are used for multi-carrier sidelink communication between the transmission user equipment and at least one reception user equipment, and each of the at least one reception user equipment corresponds to at least one of the plurality of secondary carriers; and sending second secondary carrier status indication information to each reception user equipment, to indicate that each of the at least one secondary carrier is in an activated state or a deactivated state.

21 Claims, 33 Drawing Sheets

(58) Field of Classification Search
CPC ..... H04W 72/23; H04W 76/11; H04W 76/27; H04L 5/0098; H04L 5/0037; H04L 5/0094; H04L 5/001
See application file for complete search history.

(56) References Cited

U.S. PATENT DOCUMENTS

| | | | |
|---|---|---|---|
| 2013/0039202 A1* | 2/2013 | Feuersanger | H04L 5/0048 370/252 |
| 2014/0177566 A1* | 6/2014 | Wang | H04W 72/20 370/329 |
| 2014/0247802 A1 | 9/2014 | Wijting et al. | |
| 2016/0081090 A1* | 3/2016 | Jung | H04L 5/0007 370/329 |
| 2016/0119930 A1* | 4/2016 | Yan | H04W 72/23 370/329 |
| 2017/0126306 A1* | 5/2017 | Kim | H04W 72/044 |
| 2019/0045491 A1* | 2/2019 | Zhang | H04W 72/232 |
| 2019/0215685 A1 | 7/2019 | Wang et al. | |
| 2019/0239112 A1* | 8/2019 | Rao | H04L 1/08 |
| 2020/0163061 A1* | 5/2020 | Tang | H04L 1/1812 |
| 2021/0051653 A1* | 2/2021 | Park | H04W 8/22 |

FOREIGN PATENT DOCUMENTS

| | | |
|---|---|---|
| CN | 111165042 A | 5/2020 |
| KR | 20190113574 A | 10/2019 |
| WO | 2018228127 A1 | 12/2018 |
| WO | WO-2019023857 A1 * 2/2019 ............ H04W 72/02 |

\* cited by examiner

| R | F | LCID | | Oct 1 |
|---|---|---|---|---|
| L | | | | Oct 2 |

FIG. 4A

| R | F | LCID | Oct 1 |
|---|---|---|---|
| L | | | Oct 2 |
| L | | | Oct 3 |

FIG. 4B

| Carriers allocated to Tx UE 110 at a network device 120 | | | |
|---|---|---|---|
| $F_1$ | $F_2$ | $F_3$ | $F_4$ |
| $F_5$ | $F_6$ | $F_7$ | $F_8$ |

| Carrier allocation at the network device 120 | | | | | Local numbers of the carriers at the network device 120 | Local numbers of the carriers at the Tx UE 110 |
|---|---|---|---|---|---|---|
| Rx UE 130a | $F_1$ | $F_2$ | $F_5$ | $F_8$ | ①②③④ | ①②③④ |
| Rx UE 130b | $F_3$ | $F_6$ | $F_7$ | | ①②③ | ①②③ |
| Rx UE 130n | $F_1$ | $F_4$ | $F_6$ | $F_8$ | ①②③④ | ①②③④ |

FIG. 5

| Index of Rx UE 130 | | | | SCell₄ | SCell₃ | SCell₂ | SCell₁ | Oct 1 |
|---|---|---|---|---|---|---|---|---|
| SCell₈ | SCell₇ | SCell₆ | SCell₅ | | | | | Oct 2 |

FIG. 6A

| Index of Rx UE 130a | | | | 0 | 1 | 0 | 1 | Oct 1 |
|---|---|---|---|---|---|---|---|---|
| N | N | N | N | | | | | Oct 2 |

FIG. 6B

| Index of Rx UE 130 | | | | SCell₄ | SCell₃ | SCell₂ | SCell₁ | Oct 1 |
|---|---|---|---|---|---|---|---|---|
| SCell₁₂ | SCell₁₁ | SCell₁₀ | SCell₉ | SCell₈ | SCell₇ | SCell₆ | SCell₅ | Oct 2 |
| SCell₁₆ | SCell₁₅ | SCell₁₄ | SCell₁₃ | | | | | Oct 3 |

FIG. 6C

| R | R | R | R | Index of Rx UE 130 | | | | Oct 1 |
|---|---|---|---|---|---|---|---|---|
| SCell₈ | SCell₇ | SCell₆ | SCell₅ | SCell₄ | SCell₃ | SCell₂ | SCell₁ | Oct 2 |

FIG. 7A

| R | R | R | R | Index of Rx UE 130 | | | | Oct 1 |
|---|---|---|---|---|---|---|---|---|
| SCell₈ | SCell₇ | SCell₆ | SCell₅ | SCell₄ | SCell₃ | SCell₂ | SCell₁ | Oct 2 |
| SCell₁₆ | SCell₁₅ | SCell₁₄ | SCell₁₃ | SCell₁₂ | SCell₁₁ | SCell₁₀ | SCell₉ | Oct 3 |

FIG. 7B

| | | | | Index of Rx UE 130 | | | | Oct 1 |
|---|---|---|---|---|---|---|---|---|
| R | R | R | R | | | | | |
| SCell$_7$ | SCell$_6$ | SCell$_5$ | SCell$_4$ | SCell$_3$ | SCell$_2$ | SCell$_1$ | R | Oct 2 |

FIG. 7C

| | | | | | | | | |
|---|---|---|---|---|---|---|---|---|
| | | | | | | | | Oct 1 |
| | | Layer-2 identifier of Rx UE 130 | | | | | | Oct 2 |
| | | | | | | | | Oct 3 |
| SCell$_8$ | SCell$_7$ | SCell$_6$ | SCell$_5$ | SCell$_4$ | SCell$_3$ | SCell$_2$ | SCell$_1$ | Oct 4 |

FIG. 8A

| | | | | | | | | |
|---|---|---|---|---|---|---|---|---|
| | | | | | | | | Oct 1 |
| | | Layer-2 identifier of Rx UE 130 | | | | | | Oct 2 |
| | | | | | | | | Oct 3 |
| SCell$_8$ | SCell$_7$ | SCell$_6$ | SCell$_5$ | SCell$_4$ | SCell$_3$ | SCell$_2$ | SCell$_1$ | Oct 4 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 5 |

FIG. 8B

| Rx UE$_8$ | Rx UE$_7$ | Rx UE$_6$ | Rx UE$_5$ | Rx UE$_4$ | Rx UE$_3$ | Rx UE$_2$ | Rx UE$_1$ | Oct 1 |
|---|---|---|---|---|---|---|---|---|
| Rx UE$_{16}$ | Rx UE$_{15}$ | Rx UE$_{14}$ | Rx UE$_{13}$ | Rx UE$_{12}$ | Rx UE$_{11}$ | Rx UE$_{10}$ | Rx UE$_9$ | Oct 2 |
| SCell$_8$ | SCell$_7$ | SCell$_6$ | SCell$_5$ | SCell$_4$ | SCell$_3$ | SCell$_2$ | SCell$_1$ | Oct 3 |
| SCell$_8$ | SCell$_7$ | SCell$_6$ | SCell$_5$ | SCell$_4$ | SCell$_3$ | SCell$_2$ | SCell$_1$ | Oct 4 |
| SCell$_8$ | SCell$_7$ | SCell$_6$ | SCell$_5$ | SCell$_4$ | SCell$_3$ | SCell$_2$ | SCell$_1$ | Oct 5 |
| SCell$_8$ | SCell$_7$ | SCell$_6$ | SCell$_5$ | SCell$_4$ | SCell$_3$ | SCell$_2$ | SCell$_1$ | Oct 6 |
| SCell$_8$ | SCell$_7$ | SCell$_6$ | SCell$_5$ | SCell$_4$ | SCell$_3$ | SCell$_2$ | SCell$_1$ | Oct 7 |
| SCell$_8$ | SCell$_7$ | SCell$_6$ | SCell$_5$ | SCell$_4$ | SCell$_3$ | SCell$_2$ | SCell$_1$ | Oct 8 |
| SCell$_8$ | SCell$_7$ | SCell$_6$ | SCell$_5$ | SCell$_4$ | SCell$_3$ | SCell$_2$ | SCell$_1$ | Oct 9 |
| SCell$_8$ | SCell$_7$ | SCell$_6$ | SCell$_5$ | SCell$_4$ | SCell$_3$ | SCell$_2$ | SCell$_1$ | Oct 10 |
| ... | ... | ... | ... | ... | ... | ... | ... | ... |

FIG. 9A

| 0 | 0 | 0 | 0 | 1 | 0 | 0 | 1 | Oct 1 |
|---|---|---|---|---|---|---|---|---|
| 0 | 0 | 0 | 0 | 0 | 0 | 0 | 1 | Oct 2 |
| N | N | N | N | 0 | 1 | 0 | 1 | Oct 3 |
| N | N | N | N | N | 1 | 1 | 0 | Oct 4 |
| N | N | N | N | 0 | 0 | 1 | 1 | Oct 5 |

FIG. 9B

| Rx UE$_8$ | Rx UE$_7$ | Rx UE$_6$ | Rx UE$_5$ | Rx UE$_4$ | Rx UE$_3$ | Rx UE$_2$ | Rx UE$_1$ | Oct 1 |
|---|---|---|---|---|---|---|---|---|
| Rx UE$_{16}$ | Rx UE$_{15}$ | Rx UE$_{14}$ | Rx UE$_{13}$ | Rx UE$_{12}$ | Rx UE$_{11}$ | Rx UE$_{10}$ | Rx UE$_9$ | Oct 2 |
| SCell$_8$ | SCell$_7$ | SCell$_6$ | SCell$_5$ | SCell$_4$ | SCell$_3$ | SCell$_2$ | SCell$_1$ | Oct 3 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 4 |
| SCell$_8$ | SCell$_7$ | SCell$_6$ | SCell$_5$ | SCell$_4$ | SCell$_3$ | SCell$_2$ | SCell$_1$ | Oct 5 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 6 |
| SCell$_8$ | SCell$_7$ | SCell$_6$ | SCell$_5$ | SCell$_4$ | SCell$_3$ | SCell$_2$ | SCell$_1$ | Oct 7 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 8 |
| SCell$_8$ | SCell$_7$ | SCell$_6$ | SCell$_5$ | SCell$_4$ | SCell$_3$ | SCell$_2$ | SCell$_1$ | Oct 9 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 10 |
| ... | ... | ... | ... | ... | ... | ... | ... | ... |

FIG. 9C

| Rx UE$_8$ | Rx UE$_7$ | Rx UE$_6$ | Rx UE$_5$ | Rx UE$_4$ | Rx UE$_3$ | Rx UE$_2$ | Rx UE$_1$ | Oct 1 |
|---|---|---|---|---|---|---|---|---|
| Rx UE$_{16}$ | Rx UE$_{15}$ | Rx UE$_{14}$ | Rx UE$_{13}$ | Rx UE$_{12}$ | Rx UE$_{11}$ | Rx UE$_{10}$ | Rx UE$_9$ | Oct 2 |
| SCell$_7$ | SCell$_6$ | SCell$_5$ | SCell$_4$ | SCell$_3$ | SCell$_2$ | SCell$_1$ | R | Oct 3 |
| SCell$_7$ | SCell$_6$ | SCell$_5$ | SCell$_4$ | SCell$_3$ | SCell$_2$ | SCell$_1$ | R | Oct 4 |
| SCell$_7$ | SCell$_6$ | SCell$_5$ | SCell$_4$ | SCell$_3$ | SCell$_2$ | SCell$_1$ | R | Oct 5 |
| SCell$_7$ | SCell$_6$ | SCell$_5$ | SCell$_4$ | SCell$_3$ | SCell$_2$ | SCell$_1$ | R | Oct 6 |
| SCell$_7$ | SCell$_6$ | SCell$_5$ | SCell$_4$ | SCell$_3$ | SCell$_2$ | SCell$_1$ | R | Oct 7 |
| SCell$_7$ | SCell$_6$ | SCell$_5$ | SCell$_4$ | SCell$_3$ | SCell$_2$ | SCell$_1$ | R | Oct 8 |
| SCell$_7$ | SCell$_6$ | SCell$_5$ | SCell$_4$ | SCell$_3$ | SCell$_2$ | SCell$_1$ | R | Oct 9 |
| SCell$_7$ | SCell$_6$ | SCell$_5$ | SCell$_4$ | SCell$_3$ | SCell$_2$ | SCell$_1$ | R | Oct 10 |
| ... | ... | ... | ... | ... | ... | ... | ... | ... |

FIG. 9D

| | | | | SCell₄ | SCell₃ | SCell₂ | SCell₁ | Oct 1 |
|---|---|---|---|---|---|---|---|---|
| \multicolumn{4}{c}{Index of Rx UE₁} | | | | | |
| SCell₈ | SCell₇ | SCell₆ | SCell₅ | Index of Rx UE₂ | | | | Oct 2 |
| SCell₈ | SCell₇ | SCell₆ | SCell₅ | SCell₄ | SCell₃ | SCell₂ | SCell₁ | Oct 3 |
| Index of Rx UE₃ | | | | SCell₄ | SCell₃ | SCell₂ | SCell₁ | Oct 4 |
| SCell₈ | SCell₇ | SCell₆ | SCell₅ | | | ... | | Oct 5 |
| ... | ... | ... | ... | ... | ... | ... | ... | ... |

FIG. 10A

| | | | | SCell₄ | SCell₃ | SCell₂ | SCell₁ | Oct 1 |
|---|---|---|---|---|---|---|---|---|
| Index of Rx UE₁ | | | | | | | | |
| SCell₁₂ | SCell₁₁ | SCell₁₀ | SCell₉ | SCell₈ | SCell₇ | SCell₆ | SCell₅ | Oct 2 |
| SCell₁₆ | SCell₁₅ | SCell₁₄ | SCell₁₃ | Index of Rx UE₂ | | | | Oct 3 |
| SCell₈ | SCell₇ | SCell₆ | SCell₅ | SCell₄ | SCell₃ | SCell₂ | SCell₁ | Oct 4 |
| SCell₁₆ | SCell₁₅ | SCell₁₄ | SCell₁₃ | SCell₁₂ | SCell₁₁ | SCell₁₀ | SCell₉ | Oct 5 |
| ... | ... | ... | ... | ... | ... | ... | ... | ... |

FIG. 10B

| | | | | | | | | |
|---|---|---|---|---|---|---|---|---|
| R | R | R | R | \multicolumn{3}{c}{Index of Rx UE$_1$} | | Oct 1 |
| SCell$_8$ | SCell$_7$ | SCell$_6$ | SCell$_5$ | SCell$_4$ | SCell$_3$ | SCell$_2$ | SCell$_1$ | Oct 2 |
| R | R | R | R | \multicolumn{3}{c}{Index of Rx UE$_2$} | | Oct 3 |
| SCell$_8$ | SCell$_7$ | SCell$_6$ | SCell$_5$ | SCell$_4$ | SCell$_3$ | SCell$_2$ | SCell$_1$ | Oct 4 |
| R | R | R | R | \multicolumn{3}{c}{Index of Rx UE$_3$} | | Oct 5 |
| SCell$_8$ | SCell$_7$ | SCell$_6$ | SCell$_5$ | SCell$_4$ | SCell$_3$ | SCell$_2$ | SCell$_1$ | Oct 6 |
| ... | ... | ... | ... | ... | ... | ... | ... | ... |

FIG. 11A

| | | | | | | | | |
|---|---|---|---|---|---|---|---|---|
| R | R | R | R | \multicolumn{3}{c}{Index of Rx UE$_1$} | | Oct 1 |
| SCell$_8$ | SCell$_7$ | SCell$_6$ | SCell$_5$ | SCell$_4$ | SCell$_3$ | SCell$_2$ | SCell$_1$ | Oct 2 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 3 |
| R | R | R | R | \multicolumn{3}{c}{Index of Rx UE$_2$} | | Oct 4 |
| SCell$_8$ | SCell$_7$ | SCell$_6$ | SCell$_5$ | SCell$_4$ | SCell$_3$ | SCell$_2$ | SCell$_1$ | Oct 5 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 6 |
| R | R | R | R | \multicolumn{3}{c}{Index of Rx UE$_3$} | | Oct 7 |
| SCell$_8$ | SCell$_7$ | SCell$_6$ | SCell$_5$ | SCell$_4$ | SCell$_3$ | SCell$_2$ | SCell$_1$ | Oct 8 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 9 |
| ... | ... | ... | ... | ... | ... | ... | ... | ... |

FIG. 11B

| | | | | | | | |
|---|---|---|---|---|---|---|---|
| | | | | | | | Oct 1 |
| | Layer-2 identifier of Rx $UE_1$ | | | | | | Oct 2 |
| | | | | | | | Oct 3 |
| $SCell_7$ | $SCell_6$ | $SCell_5$ | $SCell_4$ | $SCell_3$ | $SCell_2$ | $SCell_1$ | Oct 4 |
| | | | | | | | Oct 5 |
| | Layer-2 identifier of Rx $UE_2$ | | | | | | Oct 6 |
| | | | | | | | Oct 7 |
| $SCell_7$ | $SCell_6$ | $SCell_5$ | $SCell_4$ | $SCell_3$ | $SCell_2$ | $SCell_1$ | Oct 8 |
| ... | ... | ... | ... | ... | ... | ... | ... |

FIG. 12A

| | | | | | | | | |
|---|---|---|---|---|---|---|---|---|
| | | | | | | | | Oct 1 |
| | Layer-2 identifier of Rx $UE_1$ | | | | | | | Oct 2 |
| | | | | | | | | Oct 3 |
| $SCell_8$ | $SCell_7$ | $SCell_6$ | $SCell_5$ | $SCell_4$ | $SCell_3$ | $SCell_2$ | $SCell_1$ | Oct 4 |
| $SCell_{16}$ | $SCell_{15}$ | $SCell_{14}$ | $SCell_{13}$ | $SCell_{12}$ | $SCell_{11}$ | $SCell_{10}$ | $SCell_9$ | Oct 5 |
| | | | | | | | | Oct 6 |
| | Layer-2 identifier of Rx $UE_2$ | | | | | | | Oct 7 |
| | | | | | | | | Oct 8 |
| $SCell_8$ | $SCell_7$ | $SCell_6$ | $SCell_5$ | $SCell_4$ | $SCell_3$ | $SCell_2$ | $SCell_1$ | Oct 9 |
| $SCell_{16}$ | $SCell_{15}$ | $SCell_{14}$ | $SCell_{13}$ | $SCell_{12}$ | $SCell_{11}$ | $SCell_{10}$ | $SCell_9$ | Oct 10 |
| ... | ... | ... | ... | ... | ... | ... | ... | ... |

FIG. 12B

| SCell$_8$ | SCell$_7$ | SCell$_6$ | SCell$_5$ | SCell$_4$ | SCell$_3$ | SCell$_2$ | SCell$_1$ | Oct 1 |
|---|---|---|---|---|---|---|---|---|

FIG. 13A

| SCell$_8$ | SCell$_7$ | SCell$_6$ | SCell$_5$ | SCell$_4$ | SCell$_3$ | SCell$_2$ | SCell$_1$ | Oct 1 |
|---|---|---|---|---|---|---|---|---|
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 2 |

FIG. 13B

| SCell$_7$ | SCell$_6$ | SCell$_5$ | SCell$_4$ | SCell$_3$ | SCell$_2$ | SCell$_1$ | R | Oct 1 |
|---|---|---|---|---|---|---|---|---|

FIG. 13C

| Rx UE$_8$ | Rx UE$_7$ | Rx UE$_6$ | Rx UE$_5$ | Rx UE$_4$ | Rx UE$_3$ | Rx UE$_2$ | Rx UE$_1$ | Oct 1 |
|---|---|---|---|---|---|---|---|---|
| Rx UE$_{16}$ | Rx UE$_{15}$ | Rx UE$_{14}$ | Rx UE$_{13}$ | Rx UE$_{12}$ | Rx UE$_{11}$ | Rx UE$_{10}$ | Rx UE$_9$ | Oct 2 |
| SCell$_8$ | SCell$_7$ | SCell$_6$ | SCell$_5$ | SCell$_4$ | SCell$_3$ | SCell$_2$ | SCell$_1$ | Oct 3 |
| SCell$_8$ | SCell$_7$ | SCell$_6$ | SCell$_5$ | SCell$_4$ | SCell$_3$ | SCell$_2$ | SCell$_1$ | Oct 4 |
| SCell$_8$ | SCell$_7$ | SCell$_6$ | SCell$_5$ | SCell$_4$ | SCell$_3$ | SCell$_2$ | SCell$_1$ | Oct 5 |
| SCell$_8$ | SCell$_7$ | SCell$_6$ | SCell$_5$ | SCell$_4$ | SCell$_3$ | SCell$_2$ | SCell$_1$ | Oct 6 |
| SCell$_8$ | SCell$_7$ | SCell$_6$ | SCell$_5$ | SCell$_4$ | SCell$_3$ | SCell$_2$ | SCell$_1$ | Oct 7 |
| SCell$_8$ | SCell$_7$ | SCell$_6$ | SCell$_5$ | SCell$_4$ | SCell$_3$ | SCell$_2$ | SCell$_1$ | Oct 8 |
| SCell$_8$ | SCell$_7$ | SCell$_6$ | SCell$_5$ | SCell$_4$ | SCell$_3$ | SCell$_2$ | SCell$_1$ | Oct 9 |
| SCell$_8$ | SCell$_7$ | SCell$_6$ | SCell$_5$ | SCell$_4$ | SCell$_3$ | SCell$_2$ | SCell$_1$ | Oct 10 |
| ... | ... | ... | ... | ... | ... | ... | ... | ... |

FIG. 14A

| 0 | 0 | 0 | 0 | 1 | 0 | 0 | 1 | Oct 1 |
|---|---|---|---|---|---|---|---|---|
| 0 | 0 | 0 | 0 | 0 | 0 | 0 | 1 | Oct 2 |
| N | N | N | N | 0 | 1 | 0 | 1 | Oct 3 |
| N | N | N | N | N | 1 | 1 | 0 | Oct 4 |
| N | N | N | N | 0 | 0 | 1 | 1 | Oct 5 |

FIG. 14B

| Rx $UE_8$ | Rx $UE_7$ | Rx $UE_6$ | Rx $UE_5$ | Rx $UE_4$ | Rx $UE_3$ | Rx $UE_2$ | Rx $UE_1$ | Oct 1 |
|---|---|---|---|---|---|---|---|---|
| Rx $UE_{16}$ | Rx $UE_{15}$ | Rx $UE_{14}$ | Rx $UE_{13}$ | Rx $UE_{12}$ | Rx $UE_{11}$ | Rx $UE_{10}$ | Rx $UE_9$ | Oct 2 |
| $SCell_8$ | $SCell_7$ | $SCell_6$ | $SCell_5$ | $SCell_4$ | $SCell_3$ | $SCell_2$ | $SCell_1$ | Oct 3 |
| $SCell_{16}$ | $SCell_{15}$ | $SCell_{14}$ | $SCell_{13}$ | $SCell_{12}$ | $SCell_{11}$ | $SCell_{10}$ | $SCell_9$ | Oct 4 |
| $SCell_8$ | $SCell_7$ | $SCell_6$ | $SCell_5$ | $SCell_4$ | $SCell_3$ | $SCell_2$ | $SCell_1$ | Oct 5 |
| $SCell_{16}$ | $SCell_{15}$ | $SCell_{14}$ | $SCell_{13}$ | $SCell_{12}$ | $SCell_{11}$ | $SCell_{10}$ | $SCell_9$ | Oct 6 |
| $SCell_8$ | $SCell_7$ | $SCell_6$ | $SCell_5$ | $SCell_4$ | $SCell_3$ | $SCell_2$ | $SCell_1$ | Oct 7 |
| $SCell_{16}$ | $SCell_{15}$ | $SCell_{14}$ | $SCell_{13}$ | $SCell_{12}$ | $SCell_{11}$ | $SCell_{10}$ | $SCell_9$ | Oct 8 |
| $SCell_8$ | $SCell_7$ | $SCell_6$ | $SCell_5$ | $SCell_4$ | $SCell_3$ | $SCell_2$ | $SCell_1$ | Oct 9 |
| $SCell_{16}$ | $SCell_{15}$ | $SCell_{14}$ | $SCell_{13}$ | $SCell_{12}$ | $SCell_{11}$ | $SCell_{10}$ | $SCell_9$ | Oct 10 |
| ... | ... | ... | ... | ... | ... | ... | ... | ... |

FIG. 14C

| Rx UE$_8$ | Rx UE$_7$ | Rx UE$_6$ | Rx UE$_5$ | Rx UE$_4$ | Rx UE$_3$ | Rx UE$_2$ | Rx UE$_1$ | Oct 1 |
|---|---|---|---|---|---|---|---|---|
| Rx UE$_{16}$ | Rx UE$_{15}$ | Rx UE$_{14}$ | Rx UE$_{13}$ | Rx UE$_{12}$ | Rx UE$_{11}$ | Rx UE$_{10}$ | Rx UE$_9$ | Oct 2 |
| SCell$_7$ | SCell$_6$ | SCell$_5$ | SCell$_4$ | SCell$_3$ | SCell$_2$ | SCell$_1$ | R | Oct 3 |
| SCell$_7$ | SCell$_6$ | SCell$_5$ | SCell$_4$ | SCell$_3$ | SCell$_2$ | SCell$_1$ | R | Oct 4 |
| SCell$_7$ | SCell$_6$ | SCell$_5$ | SCell$_4$ | SCell$_3$ | SCell$_2$ | SCell$_1$ | R | Oct 5 |
| SCell$_7$ | SCell$_6$ | SCell$_5$ | SCell$_4$ | SCell$_3$ | SCell$_2$ | SCell$_1$ | R | Oct 6 |
| SCell$_7$ | SCell$_6$ | SCell$_5$ | SCell$_4$ | SCell$_3$ | SCell$_2$ | SCell$_1$ | R | Oct 7 |
| SCell$_7$ | SCell$_6$ | SCell$_5$ | SCell$_4$ | SCell$_3$ | SCell$_2$ | SCell$_1$ | R | Oct 8 |
| SCell$_7$ | SCell$_6$ | SCell$_5$ | SCell$_4$ | SCell$_3$ | SCell$_2$ | SCell$_1$ | R | Oct 9 |
| SCell$_7$ | SCell$_6$ | SCell$_5$ | SCell$_4$ | SCell$_3$ | SCell$_2$ | SCell$_1$ | R | Oct 10 |
| ... | ... | ... | ... | ... | ... | ... | ... | ... |

FIG. 14D

| | | | | | | | | |
|---|---|---|---|---|---|---|---|---|
| Index of Rx UE$_1$ | | | | SCell$_4$ | SCell$_3$ | SCell$_2$ | SCell$_1$ | Oct 1 |
| SCell$_8$ | SCell$_7$ | SCell$_6$ | SCell$_5$ | Index of Rx UE$_2$ | | | | Oct 2 |
| SCell$_8$ | SCell$_7$ | SCell$_6$ | SCell$_5$ | SCell$_4$ | SCell$_3$ | SCell$_2$ | SCell$_1$ | Oct 3 |
| Index of Rx UE$_3$ | | | | SCell$_4$ | SCell$_3$ | SCell$_2$ | SCell$_1$ | Oct 4 |
| SCell$_8$ | SCell$_7$ | SCell$_6$ | SCell$_5$ | | | ... | | Oct 5 |
| ... | ... | ... | ... | ... | ... | ... | ... | ... |

FIG. 15A

| | Index of Rx UE$_1$ | | | SCell$_4$ | SCell$_3$ | SCell$_2$ | SCell$_1$ | Oct 1 |
|---|---|---|---|---|---|---|---|---|
| SCell$_{12}$ | SCell$_{11}$ | SCell$_{10}$ | SCell$_9$ | SCell$_8$ | SCell$_7$ | SCell$_6$ | SCell$_5$ | Oct 2 |
| SCell$_{16}$ | SCell$_{15}$ | SCell$_{14}$ | SCell$_{13}$ | | Index of Rx UE$_2$ | | | Oct 3 |
| SCell$_8$ | SCell$_7$ | SCell$_6$ | SCell$_5$ | SCell$_4$ | SCell$_3$ | SCell$_2$ | SCell$_1$ | Oct 4 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 5 |
| ... | ... | ... | ... | ... | ... | ... | ... | ... |

FIG. 15B

| R | R | R | R | | Index of Rx UE$_1$ | | | Oct 1 |
|---|---|---|---|---|---|---|---|---|
| SCell$_8$ | SCell$_7$ | SCell$_6$ | SCell$_5$ | SCell$_4$ | SCell$_3$ | SCell$_2$ | SCell$_1$ | Oct 2 |
| R | R | R | R | | Index of Rx UE$_2$ | | | Oct 3 |
| SCell$_8$ | SCell$_7$ | SCell$_6$ | SCell$_5$ | SCell$_4$ | SCell$_3$ | SCell$_2$ | SCell$_1$ | Oct 4 |
| R | R | R | R | | Index of Rx UE$_3$ | | | Oct 5 |
| SCell$_8$ | SCell$_7$ | SCell$_6$ | SCell$_5$ | SCell$_4$ | SCell$_3$ | SCell$_2$ | SCell$_1$ | Oct 6 |
| ... | ... | ... | ... | ... | ... | ... | ... | ... |

FIG. 16A

| | | | | | | | | |
|---|---|---|---|---|---|---|---|---|
| R | R | R | R | \multicolumn{3}{c}{Index of Rx UE$_1$} | | Oct 1 |
| SCell$_8$ | SCell$_7$ | SCell$_6$ | SCell$_5$ | SCell$_4$ | SCell$_3$ | SCell$_2$ | SCell$_1$ | Oct 2 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 3 |
| R | R | R | R | \multicolumn{3}{c}{Index of Rx UE$_2$} | | Oct 4 |
| SCell$_8$ | SCell$_7$ | SCell$_6$ | SCell$_5$ | SCell$_4$ | SCell$_3$ | SCell$_2$ | SCell$_1$ | Oct 5 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 6 |
| R | R | R | R | \multicolumn{3}{c}{Index of Rx UE$_3$} | | Oct 7 |
| SCell$_8$ | SCell$_7$ | SCell$_6$ | SCell$_5$ | SCell$_4$ | SCell$_3$ | SCell$_2$ | SCell$_1$ | Oct 8 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 9 |
| ... | ... | ... | ... | ... | ... | ... | ... | ... |

FIG. 16B

| | | | | | | |
|---|---|---|---|---|---|---|
| | | | | | | Oct 1 |
| \multicolumn{6}{c}{Layer-2 identifier of Rx UE$_1$} | Oct 2 |
| | | | | | | Oct 3 |
| SCell$_7$ | SCell$_6$ | SCell$_5$ | SCell$_4$ | SCell$_3$ | SCell$_2$ | SCell$_1$ | Oct 4 |
| | | | | | | Oct 5 |
| \multicolumn{6}{c}{Layer-2 identifier of Rx UE$_2$} | Oct 6 |
| | | | | | | Oct 7 |
| SCell$_7$ | SCell$_6$ | SCell$_5$ | SCell$_4$ | SCell$_3$ | SCell$_2$ | SCell$_1$ | Oct 8 |
| ... | ... | ... | ... | ... | ... | ... | ... |

FIG. 17A

| | | | | | | | | |
|---|---|---|---|---|---|---|---|---|
| | | | | | | | | Oct 1 |
| | | Layer-2 identifier of Rx UE$_1$ | | | | | | Oct 2 |
| | | | | | | | | Oct 3 |
| SCell$_8$ | SCell$_7$ | SCell$_6$ | SCell$_5$ | SCell$_4$ | SCell$_3$ | SCell$_2$ | SCell$_1$ | Oct 4 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 5 |
| | | | | | | | | Oct 6 |
| | | Layer-2 identifier of Rx UE$_2$ | | | | | | Oct 7 |
| | | | | | | | | Oct 8 |
| SCell$_8$ | SCell$_7$ | SCell$_6$ | SCell$_5$ | SCell$_4$ | SCell$_3$ | SCell$_2$ | SCell$_1$ | Oct 9 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 10 |
| ... | ... | ... | ... | ... | ... | ... | ... | ... |

FIG. 17B

| Carriers allocated to Tx UE 110 at a network device 120 | | | |
|---|---|---|---|
| $F_1$ | $F_2$ | $F_3$ | $F_4$ |
| $F_5$ | $F_6$ | $F_7$ | $F_8$ |

| Carrier allocation at the network device 120 | | | | | Globally non-unique numbers of the carriers at the network device 120 | Local numbers of the carriers at the Tx UE 110 |
|---|---|---|---|---|---|---|
| Rx UE 130a | $F_1$ | $F_2$ | $F_5$ | $F_8$ | ①②⑤⑧ | ①②③④ |
| Rx UE 130b | $F_3$ | $F_6$ | $F_7$ | | ③⑥⑦ | ①②③ |
| Rx UE 130n | $F_1$ | $F_4$ | $F_6$ | $F_8$ | ①④⑥⑧ | ①②③④ |

FIG. 18

| | Index of Rx UE 130 | | | $SCell_4$ | $SCell_3$ | $SCell_2$ | $SCell_1$ | Oct 1 |
|---|---|---|---|---|---|---|---|---|
| $SCell_8$ | $SCell_7$ | $SCell_6$ | $SCell_5$ | | | | | Oct 2 |

FIG. 19A

| | Index of Rx UE 130a | | | N | N | 0 | 1 | Oct 1 |
|---|---|---|---|---|---|---|---|---|
| 0 | N | N | 1 | | | | | Oct 2 |

FIG. 19B

|          | Index of Rx UE 130 |          |          | SCell$_4$ | SCell$_3$ | SCell$_2$ | SCell$_1$ | Oct 1 |
|----------|----------|----------|----------|-----------|-----------|-----------|-----------|-------|
| SCell$_{12}$ | SCell$_{11}$ | SCell$_{10}$ | SCell$_9$ | SCell$_8$ | SCell$_7$ | SCell$_6$ | SCell$_5$ | Oct 2 |
| SCell$_{16}$ | SCell$_{15}$ | SCell$_{14}$ | SCell$_{13}$ |           |           |           |           | Oct 3 |

FIG. 19C

| R | R | R | R | Index of Rx UE 130 | | | | Oct 1 |
|---|---|---|---|--------------------|---|---|---|-------|
| SCell$_8$ | SCell$_7$ | SCell$_6$ | SCell$_5$ | SCell$_4$ | SCell$_3$ | SCell$_2$ | SCell$_1$ | Oct 2 |

FIG. 20A

| R | R | R | R |   | Index of Rx UE 130 | | | Oct 1 |
|---|---|---|---|---|--------------------|---|---|-------|
| SCell$_8$ | SCell$_7$ | SCell$_6$ | SCell$_5$ | SCell$_4$ | SCell$_3$ | SCell$_2$ | SCell$_1$ | Oct 2 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 3 |

FIG. 20B

| R | R | R | R | Index of Rx UE 130 | | | | Oct 1 |
|---|---|---|---|--------------------|---|---|---|-------|
| SCell$_7$ | SCell$_6$ | SCell$_5$ | SCell$_4$ | SCell$_3$ | SCell$_2$ | SCell$_1$ | R | Oct 2 |

FIG. 20C

|   |   |   |   |   |   |   |   | Oct 1 |
|---|---|---|---|---|---|---|---|-------|
|   |   |   | Layer-2 identifier of Rx UE 130 | | | | | Oct 2 |
|   |   |   |   |   |   |   |   | Oct 3 |
| SCell$_8$ | SCell$_7$ | SCell$_6$ | SCell$_5$ | SCell$_4$ | SCell$_3$ | SCell$_2$ | SCell$_1$ | Oct 4 |

FIG. 21A

|   |   |   |   |   |   |   |   |       |
|---|---|---|---|---|---|---|---|-------|
|   |   |   |   |   |   |   |   | Oct 1 |
|   |   |   | Layer-2 identifier of Rx UE 130 |   |   |   |   | Oct 2 |
|   |   |   |   |   |   |   |   | Oct 3 |
| $SCell_8$ | $SCell_7$ | $SCell_6$ | $SCell_5$ | $SCell_4$ | $SCell_3$ | $SCell_2$ | $SCell_1$ | Oct 4 |
| $SCell_{16}$ | $SCell_{15}$ | $SCell_{14}$ | $SCell_{13}$ | $SCell_{12}$ | $SCell_{11}$ | $SCell_{10}$ | $SCell_9$ | Oct 5 |

FIG. 21B

| $Rx\ UE_8$ | $Rx\ UE_7$ | $Rx\ UE_6$ | $Rx\ UE_5$ | $Rx\ UE_4$ | $Rx\ UE_3$ | $Rx\ UE_2$ | $Rx\ UE_1$ | Oct 1 |
|---|---|---|---|---|---|---|---|---|
| $Rx\ UE_{16}$ | $Rx\ UE_{15}$ | $Rx\ UE_{14}$ | $Rx\ UE_{13}$ | $Rx\ UE_{12}$ | $Rx\ UE_{11}$ | $Rx\ UE_{10}$ | $Rx\ UE_9$ | Oct 2 |
| $SCell_8$ | $SCell_7$ | $SCell_6$ | $SCell_5$ | $SCell_4$ | $SCell_3$ | $SCell_2$ | $SCell_1$ | Oct 3 |
| $SCell_8$ | $SCell_7$ | $SCell_6$ | $SCell_5$ | $SCell_4$ | $SCell_3$ | $SCell_2$ | $SCell_1$ | Oct 4 |
| $SCell_8$ | $SCell_7$ | $SCell_6$ | $SCell_5$ | $SCell_4$ | $SCell_3$ | $SCell_2$ | $SCell_1$ | Oct 5 |
| $SCell_8$ | $SCell_7$ | $SCell_6$ | $SCell_5$ | $SCell_4$ | $SCell_3$ | $SCell_2$ | $SCell_1$ | Oct 6 |
| $SCell_8$ | $SCell_7$ | $SCell_6$ | $SCell_5$ | $SCell_4$ | $SCell_3$ | $SCell_2$ | $SCell_1$ | Oct 7 |
| $SCell_8$ | $SCell_7$ | $SCell_6$ | $SCell_5$ | $SCell_4$ | $SCell_3$ | $SCell_2$ | $SCell_1$ | Oct 8 |
| $SCell_8$ | $SCell_7$ | $SCell_6$ | $SCell_5$ | $SCell_4$ | $SCell_3$ | $SCell_2$ | $SCell_1$ | Oct 9 |
| $SCell_8$ | $SCell_7$ | $SCell_6$ | $SCell_5$ | $SCell_4$ | $SCell_3$ | $SCell_2$ | $SCell_1$ | Oct 10 |
| ... | ... | ... | ... | ... | ... | ... | ... | ... |

FIG. 22A

| 0 | 0 | 0 | 0 | 1 | 0 | 0 | 1 | Oct 1 |
|---|---|---|---|---|---|---|---|---|
| 0 | 0 | 0 | 0 | 0 | 0 | 0 | 1 | Oct 2 |
| 0 | N | N | 1 | N | N | 0 | 1 | Oct 3 |
| N | 1 | 1 | N | N | 0 | N | N | Oct 4 |
| 0 | N | 0 | N | 1 | N | N | 1 | Oct 5 |

FIG. 22B

| Rx UE$_8$ | Rx UE$_7$ | Rx UE$_6$ | Rx UE$_5$ | Rx UE$_4$ | Rx UE$_3$ | Rx UE$_2$ | Rx UE$_1$ | Oct 1 |
|---|---|---|---|---|---|---|---|---|
| Rx UE$_{16}$ | Rx UE$_{15}$ | Rx UE$_{14}$ | Rx UE$_{13}$ | Rx UE$_{12}$ | Rx UE$_{11}$ | Rx UE$_{10}$ | Rx UE$_9$ | Oct 2 |
| SCell$_8$ | SCell$_7$ | SCell$_6$ | SCell$_5$ | SCell$_4$ | SCell$_3$ | SCell$_2$ | SCell$_1$ | Oct 3 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 4 |
| SCell$_8$ | SCell$_7$ | SCell$_6$ | SCell$_5$ | SCell$_4$ | SCell$_3$ | SCell$_2$ | SCell$_1$ | Oct 5 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 6 |
| SCell$_8$ | SCell$_7$ | SCell$_6$ | SCell$_5$ | SCell$_4$ | SCell$_3$ | SCell$_2$ | SCell$_1$ | Oct 7 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 8 |
| SCell$_8$ | SCell$_7$ | SCell$_6$ | SCell$_5$ | SCell$_4$ | SCell$_3$ | SCell$_2$ | SCell$_1$ | Oct 9 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 10 |
| ... | ... | ... | ... | ... | ... | ... | ... | ... |

FIG. 22C

| | Index of Rx UE$_1$ | | | SCell$_4$ | SCell$_3$ | SCell$_2$ | SCell$_1$ | Oct 1 |
|---|---|---|---|---|---|---|---|---|
| SCell$_8$ | SCell$_7$ | SCell$_6$ | SCell$_5$ | Index of Rx UE$_2$ | | | | Oct 2 |
| SCell$_8$ | SCell$_7$ | SCell$_6$ | SCell$_5$ | SCell$_4$ | SCell$_3$ | SCell$_2$ | SCell$_1$ | Oct 3 |
| | Index of Rx UE$_3$ | | | SCell$_4$ | SCell$_3$ | SCell$_2$ | SCell$_1$ | Oct 4 |
| SCell$_8$ | SCell$_7$ | SCell$_6$ | SCell$_5$ | | | ... | | Oct 5 |
| ... | ... | ... | ... | ... | ... | ... | ... | ... |

FIG. 23A

| | Index of Rx UE$_1$ | | | SCell$_4$ | SCell$_3$ | SCell$_2$ | SCell$_1$ | Oct 1 |
|---|---|---|---|---|---|---|---|---|
| SCell$_{12}$ | SCell$_{11}$ | SCell$_{10}$ | SCell$_9$ | SCell$_8$ | SCell$_7$ | SCell$_6$ | SCell$_5$ | Oct 2 |
| SCell$_{16}$ | SCell$_{15}$ | SCell$_{14}$ | SCell$_{13}$ | Index of Rx UE$_2$ | | | | Oct 3 |
| SCell$_8$ | SCell$_7$ | SCell$_6$ | SCell$_5$ | SCell$_4$ | SCell$_3$ | SCell$_2$ | SCell$_1$ | Oct 4 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 5 |
| ... | ... | ... | ... | ... | ... | ... | ... | ... |

FIG. 23B

| R | R | R | R | Index of Rx UE$_1$ | | | | Oct 1 |
|---|---|---|---|---|---|---|---|---|
| SCell$_8$ | SCell$_7$ | SCell$_6$ | SCell$_5$ | SCell$_4$ | SCell$_3$ | SCell$_2$ | SCell$_1$ | Oct 2 |
| R | R | R | R | Index of Rx UE$_2$ | | | | Oct 3 |
| SCell$_8$ | SCell$_7$ | SCell$_6$ | SCell$_5$ | SCell$_4$ | SCell$_3$ | SCell$_2$ | SCell$_1$ | Oct 4 |
| R | R | R | R | Index of Rx UE$_3$ | | | | Oct 5 |
| SCell$_8$ | SCell$_7$ | SCell$_6$ | SCell$_5$ | SCell$_4$ | SCell$_3$ | SCell$_2$ | SCell$_1$ | Oct 6 |
| ... | ... | ... | ... | ... | ... | ... | ... | ... |

FIG. 24A

| R | R | R | R | Index of Rx UE$_1$ | | | | Oct 1 |
|---|---|---|---|---|---|---|---|---|
| SCell$_8$ | SCell$_7$ | SCell$_6$ | SCell$_5$ | SCell$_4$ | SCell$_3$ | SCell$_2$ | SCell$_1$ | Oct 2 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 3 |
| R | R | R | R | Index of Rx UE$_2$ | | | | Oct 4 |
| SCell$_8$ | SCell$_7$ | SCell$_6$ | SCell$_5$ | SCell$_4$ | SCell$_3$ | SCell$_2$ | SCell$_1$ | Oct 5 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 6 |
| R | R | R | R | Index of Rx UE$_3$ | | | | Oct 7 |
| SCell$_8$ | SCell$_7$ | SCell$_6$ | SCell$_5$ | SCell$_4$ | SCell$_3$ | SCell$_2$ | SCell$_1$ | Oct 8 |
| SCell$_{16}$ | SCell$_{15}$ | SCell$_{14}$ | SCell$_{13}$ | SCell$_{12}$ | SCell$_{11}$ | SCell$_{10}$ | SCell$_9$ | Oct 9 |
| ... | ... | ... | ... | ... | ... | ... | ... | ... |

FIG. 24B

| | | | | | | | |
|---|---|---|---|---|---|---|---|
| | | | | | | | Oct 1 |
| | | | Layer-2 identifier of Rx $UE_1$ | | | | Oct 2 |
| | | | | | | | Oct 3 |
| $SCell_7$ | $SCell_6$ | $SCell_5$ | $SCell_4$ | $SCell_3$ | $SCell_2$ | $SCell_1$ | Oct 4 |
| | | | | | | | Oct 5 |
| | | | Layer-2 identifier of Rx $UE_2$ | | | | Oct 6 |
| | | | | | | | Oct 7 |
| $SCell_7$ | $SCell_6$ | $SCell_5$ | $SCell_4$ | $SCell_3$ | $SCell_2$ | $SCell_1$ | Oct 8 |
| ... | ... | ... | ... | ... | ... | ... | ... |

FIG. 25A

| | | | | | | | | |
|---|---|---|---|---|---|---|---|---|
| | | | | | | | | Oct 1 |
| | | | Layer-2 identifier of Rx $UE_1$ | | | | | Oct 2 |
| | | | | | | | | Oct 3 |
| $SCell_8$ | $SCell_7$ | $SCell_6$ | $SCell_5$ | $SCell_4$ | $SCell_3$ | $SCell_2$ | $SCell_1$ | Oct 4 |
| $SCell_{16}$ | $SCell_{15}$ | $SCell_{14}$ | $SCell_{13}$ | $SCell_{12}$ | $SCell_{11}$ | $SCell_{10}$ | $SCell_9$ | Oct 5 |
| | | | | | | | | Oct 6 |
| | | | Layer-2 identifier of Rx $UE_2$ | | | | | Oct 7 |
| | | | | | | | | Oct 8 |
| $SCell_8$ | $SCell_7$ | $SCell_6$ | $SCell_5$ | $SCell_4$ | $SCell_3$ | $SCell_2$ | $SCell_1$ | Oct 9 |
| $SCell_{16}$ | $SCell_{15}$ | $SCell_{14}$ | $SCell_{13}$ | $SCell_{12}$ | $SCell_{11}$ | $SCell_{10}$ | $SCell_9$ | Oct 10 |
| ... | ... | ... | ... | ... | ... | ... | ... | ... |

FIG. 25B

| Carriers allocated to Tx UE 110 at a network device 120 | | | |
|---|---|---|---|
| $F_1$ | $F_2$ | $F_3$ | $F_4$ |
| $F_5$ | $F_6$ | $F_7$ | $F_8$ |

| Carrier allocation at the network device 120 | | | | | Globally non-unique numbers of the carriers at the network device 120 | Numbers of the carriers at the Tx UE 110 | |
|---|---|---|---|---|---|---|---|
| | | | | | | Globally non-unique numbers | Local numbers |
| Rx UE 130a | $F_1$ | $F_2$ | $F_5$ | $F_8$ | ①②③④ | ①②③④ | ①②③④ |
| Rx UE 130b | $F_3$ | $F_6$ | $F_7$ | | ⑤⑥⑦ | ⑤⑥⑦ | ①②③ |
| Rx UE 130c | $F_1$ | $F_4$ | $F_6$ | $F_8$ | ⑧⑨⑩⑪ | ⑧⑨⑩⑪ | ①②③④ |

FIG. 26

| $SCell_8$ | $SCell_7$ | $SCell_6$ | $SCell_5$ | $SCell_4$ | $SCell_3$ | $SCell_2$ | $SCell_1$ | Oct 1 |
|---|---|---|---|---|---|---|---|---|
| ... | ... | ... | ... | ... | $SCell_{11}$ | $SCell_{10}$ | $SCell_9$ | Oct 2 |
| ... | ... | ... | ... | ... | ... | ... | ... | ... |

FIG. 27A

| 1 | 1 | 1 | 0 | 0 | 1 | 0 | 1 | Oct 1 |
|---|---|---|---|---|---|---|---|---|
| | | | | | 0 | 0 | 1 | Oct 2 |

FIG. 27B

| 1 | N | N | N | 0 | 1 | 0 | 1 | Oct 1 |
|---|---|---|---|---|---|---|---|---|
|   |   |   |   | ... | 0 | 0 | 1 | Oct 2 |

FIG. 27C

| SCell$_8$ | SCell$_7$ | SCell$_6$ | SCell$_5$ | SCell$_4$ | SCell$_3$ | SCell$_2$ | SCell$_1$ | Oct 1 |
|---|---|---|---|---|---|---|---|---|
| ... | ... | ... | ... | ... | SCell$_{11}$ | SCell$_{10}$ | SCell$_9$ | Oct 2 |
| ... | ... | ... | ... | ... | ... | ... | ... | ... |

FIG. 28A

| 1 | 1 | 1 | 0 | 0 | 1 | 0 | 1 | Oct 1 |
|---|---|---|---|---|---|---|---|---|
|   |   |   |   |   | 0 | 0 | 1 | Oct 2 |

FIG. 28B

| 1 | N | N | N | 0 | 1 | 0 | 1 | Oct 1 |
|---|---|---|---|---|---|---|---|---|
|   |   |   |   | ... | 0 | 0 | 1 | Oct 2 |

FIG. 28C

METHOD AND APPARATUS FOR MANAGING SECONDARY CARRIER IN SIDELINK COMMUNICATION

CROSS-REFERENCE TO RELATED APPLICATIONS

This application is a national stage of International Application No. PCT/CN2021/095061, filed on May 21, 2021, which claims priority to Chinese Patent Application No. 202010450899.2, filed on May 25, 2020. Both of the aforementioned applications are hereby incorporated by reference in their entireties.

TECHNICAL FIELD

One or more embodiments of this application usually relate to the communications field, and specifically, to wireless communication methods applied to transmission user equipment and a network device, to activate or deactivate a plurality of carriers used for multi-carrier sidelink communication between transmission user equipment and reception user equipment.

BACKGROUND

In a 5G new radio (new radio, NR) vehicle to everything (vehicle to everything, V2X) scenario, for V2X communication between transmission user equipment (transmission UE, Tx UE) and reception user equipment (reception UE, Rx UE), there are currently two resource allocation modes: a base station scheduled resource allocation mode and a Tx UE autonomous resource selection allocation mode. In the base station scheduled resource allocation mode, Tx UE requests a communication resource from a base station, and the base station allocates a dedicated resource to the Tx UE to transmit control information and data information. In the Tx UE autonomous resource selection allocation mode, a base station configures a resource pool for Tx UE, and the Tx UE autonomously selects a resource from the resource pool to send control information and data information.

In an existing NR-V2X technical solution, V2X communication between Tx UE and Rx UE supports only a single carrier. For example, in the base station scheduled resource allocation mode, after the Tx UE and the Rx UE complete a V2X sidelink communication connection, when the Tx UE has a data transmission requirement, the Tx UE reports, to the base station, a scheduling request (scheduling request, SR) and a buffer status report (buffer status report, BSR) that indicates a size of an amount of to-be-transmitted data, and the base station schedules a single-carrier related data transmission resource for the Tx UE based on the SR and the BSR. However, because a single-carrier data transmission capability is limited, communication quality of the Tx UE is limited when the Tx UE has a large data communication requirement.

SUMMARY

The following describes this application from a plurality of aspects. For implementations and beneficial effects of the following plurality of aspects, refer to each other.

A first aspect of this application provides a wireless communication method applied to transmission user equipment (Tx UE), and the method includes: receiving first secondary carrier status indication information from a network device, where the first secondary carrier status indication information indicates that each of a plurality of secondary carriers is in an activated state or a deactivated state, the plurality of secondary carriers are used for multi-carrier sidelink communication between the transmission user equipment and at least one reception user equipment, and each of the at least one reception user equipment corresponds to at least one of the plurality of secondary carriers; and sending second secondary carrier status indication information to each reception user equipment, where the second secondary carrier status indication information indicates that each of the at least one secondary carrier is in an activated state or a deactivated state.

In some embodiments, the method further includes: receiving first multi-carrier configuration information from the network device, where the first multi-carrier configuration information is used to indicate information related to the plurality of secondary carriers configured by the network device, and the first multi-carrier configuration information includes an identifier of each reception user equipment and an identifier of the at least one secondary carrier corresponding to each reception user equipment in the plurality of secondary carriers; and sending second multi-carrier configuration information to each reception user equipment based on the first multi-carrier configuration information, where the second multi-carrier configuration information includes the identifier of the at least one secondary carrier corresponding to each reception user equipment.

In some embodiments, when the at least one reception user equipment includes a plurality of reception user equipments, the first secondary carrier status indication information includes a secondary carrier status bitmap, and the secondary carrier status bitmap includes a first bitmap part that is used to indicate an index or a destination layer-2 identifier of each reception user equipment and a second bitmap part that is used to indicate the activated state or the deactivated state of each of the at least one secondary carrier corresponding to each reception user equipment.

In some embodiments, a total quantity of bits in the first bitmap part is related to a maximum quantity of reception user equipments supported by the transmission user equipment, a plurality of bits in the first bitmap are in a one-to-one correspondence with the plurality of reception user equipments, and the correspondence between the plurality of bits and the plurality of reception user equipments is related to the index of each reception user equipment.

In some embodiments, the second bitmap part includes a plurality of bit rows, the plurality of bit rows correspond to the plurality of reception user equipments, at least one bit row corresponding to each reception user equipment in the plurality of bit rows includes at least one bit, the at least one bit is in a one-to-one correspondence with the at least one secondary carrier, and a value of each of the at least one bit indicates the activated state or the deactivated state of each of the at least one secondary carrier.

In some embodiments, a total quantity of bits included in the at least one bit row is related to a maximum quantity of secondary carriers supported by each reception user equipment or the transmission user equipment.

In some embodiments, the correspondence between the at least one bit in the at least one bit row and the at least one secondary carrier is related to an arrangement order of the identifier of the at least one secondary carrier in the first multi-carrier configuration information, or is related to an index of each of the at least one secondary carrier in the plurality of secondary carriers.

In some embodiments, the second secondary carrier status indication information includes a bitmap part related to each reception user equipment in the second bitmap part, or includes the first bitmap part and the second bitmap part.

In some embodiments, the first secondary carrier status indication information includes a secondary carrier status bitmap that is used to indicate the activated state or the deactivated state of each of the at least one secondary carrier corresponding to each reception user equipment.

In some embodiments, the secondary carrier status bitmap includes at least one bitmap part, the at least one bitmap part is in a one-to-one correspondence with the at least one reception user equipment, each of the at least one bitmap part includes at least one bit, the at least one bit is in a one-to-one correspondence with the at least one secondary carrier, and a value of each of the at least one bit indicates the activated state or the deactivated state of each of the at least one secondary carrier.

In some embodiments, a total quantity of bits in the at least one bit part is related to a total quantity of secondary carriers corresponding to the at least one reception user equipment, and the total quantity of secondary carriers corresponding to the at least one reception user equipment is equal to a sum of quantities of the at least one secondary carrier corresponding to all the reception user equipments.

In some embodiments, an arrangement order of each bitmap part in the secondary carrier status bitmap is related to an arrangement order of the identifier of each reception user equipment in the first multi-carrier configuration information, and the correspondence between the at least one bit and the at least one secondary carrier is related to an arrangement order of the identifier of the at least one secondary carrier in the first multi-carrier configuration information.

In some embodiments, the second secondary carrier status indication information includes the at least one bitmap part.

In some embodiments, the second secondary carrier status indication information includes a secondary carrier status bitmap, and the secondary carrier status bitmap includes a first bitmap part that is used to indicate an index or a destination layer-2 identifier of each reception user equipment and a second bitmap part that is used to indicate the activated state or the deactivated state of each of the at least one secondary carrier corresponding to each reception user equipment.

A second aspect of this application provides a wireless communication method applied to a network device, and the method includes: generating first secondary carrier status indication information, where the first secondary carrier status indication information indicates that each of a plurality of secondary carriers is in an activated state or a deactivated state, the plurality of secondary carriers are used for multi-carrier sidelink communication between transmission user equipment and at least one reception user equipment, and each of the at least one reception user equipment corresponds to at least one of the plurality of secondary carriers; and sending the first secondary carrier status indication information to the transmission user equipment (Tx UE).

In some embodiments, the method further includes: sending first multi-carrier configuration information to the transmission user equipment, where the first multi-carrier configuration information is used to indicate information related to the plurality of secondary carriers configured by the network device, and the first multi-carrier configuration information includes an identifier of each reception user equipment and an identifier of the at least one secondary carrier corresponding to each reception user equipment in the plurality of secondary carriers.

In some embodiments, when the at least one reception user equipment includes a plurality of reception user equipments, the first secondary carrier status indication information includes a secondary carrier status bitmap, and the secondary carrier status bitmap includes a first bitmap part that is used to indicate an index or a destination layer-2 identifier of each reception user equipment and a second bitmap part that is used to indicate an activated state or a deactivated state of each of the at least one secondary carrier corresponding to each reception user equipment.

In some embodiments, a total quantity of bits in the first bitmap part is related to a maximum quantity of reception user equipments supported by the transmission user equipment, a plurality of bits in the first bitmap are in a one-to-one correspondence with the plurality of reception user equipments, and the correspondence between the plurality of bits and the plurality of reception user equipments is related to the index of each reception user equipment.

In some embodiments, the second bitmap part includes a plurality of bit rows, the plurality of bit rows correspond to the plurality of reception user equipments, at least one bit row corresponding to each reception user equipment in the plurality of bit rows includes the at least one bit, the at least one bit is in a one-to-one correspondence with the at least one secondary carrier, and a value of each of the at least one bit indicates the activated state or the deactivated state of each of the at least one secondary carrier.

In some embodiments, a total quantity of bits included in the at least one bit row is related to a maximum quantity of secondary carriers supported by each reception user equipment or the transmission user equipment.

In some embodiments, the correspondence between the at least one bit in the at least one bit row and the at least one secondary carrier is related to an arrangement order of the identifier of the at least one secondary carrier in the first multi-carrier configuration information, or is related to an index of each of the at least one secondary carrier in the plurality of secondary carriers.

In some embodiments, the first secondary carrier status indication information includes a secondary carrier status bitmap that is used to indicate an activated state or a deactivated state of each of the at least one secondary carrier corresponding to each reception user equipment.

In some embodiments, the secondary carrier status bitmap includes at least one bitmap part, the at least one bitmap part is in a one-to-one correspondence with the at least one reception user equipment, each of the at least one bitmap part includes at least one bit, the at least one bit is in a one-to-one correspondence with the at least one secondary carrier, and a value of each of the at least one bit indicates the activated state or the deactivated state of each of the at least one secondary carrier.

In some embodiments, a total quantity of bits in the at least one bit part is related to a total quantity of secondary carriers corresponding to the at least one reception user equipment, and the total quantity of secondary carriers corresponding to the at least one reception user equipment is equal to a sum of quantities of the at least one secondary carrier corresponding to all the reception user equipments.

In some embodiments, an arrangement order of each bitmap part in the secondary carrier status bitmap is related to an arrangement order of the identifier of each reception user equipment in the first multi-carrier configuration information, and the correspondence between the at least one bit and the at least one secondary carrier is related to an arrangement order of the identifier of the at least one secondary carrier in the first multi-carrier configuration information.

BRIEF DESCRIPTION OF THE DRAWINGS

FIG. 4A shows an example structure of a MAC subheader corresponding to a sidelink SCell activation/deactivation MAC CE on a Uu interface between a network device 120 and Tx UE 110 according to an embodiment of this application;

FIG. 4B shows another example structure of a MAC subheader corresponding to a sidelink SCell activation/deactivation MAC CE on a Uu interface between a network device 120 and Tx UE 110 according to an embodiment of this application;

FIG. 5 shows an example of carrier allocation at a network device 120 according to an embodiment of this application;

FIG. 6A is a schematic diagram of a structure of first secondary carrier status indication information according to an embodiment of this application;

FIG. 6B is a schematic diagram of a structure of the first secondary carrier status indication information that indicates activated states or deactivated states of secondary carriers corresponding to Rx UE 130a in FIG. 5 according to FIG. 6A;

FIG. 6C is a schematic diagram of another structure of first secondary carrier status indication information according to an embodiment of this application;

FIG. 7A is a schematic diagram of another structure of first secondary carrier status indication information according to an embodiment of this application;

FIG. 7B is a schematic diagram of another structure of first secondary carrier status indication information according to an embodiment of this application;

FIG. 7C is a schematic diagram of another structure of first secondary carrier status indication information according to an embodiment of this application;

FIG. 8A is a schematic diagram of another structure of first secondary carrier status indication information according to an embodiment of this application;

FIG. 8B is a schematic diagram of another structure of first secondary carrier status indication information according to an embodiment of this application;

FIG. 9A is a schematic diagram of another structure of first secondary carrier status indication information according to an embodiment of this application;

FIG. 9B is a schematic diagram of a structure of the first secondary carrier status indication information that indicates activated states or deactivated states of secondary carriers corresponding to Rx UE 130a, Rx UE 130b, and Rx UE 130n in FIG. 5 according to FIG. 9A;

FIG. 9C is a schematic diagram of another structure of first secondary carrier status indication information according to an embodiment of this application;

FIG. 9D is a schematic diagram of another structure of first secondary carrier status indication information according to an embodiment of this application;

FIG. 10A is a schematic diagram of another structure of first secondary carrier status indication information according to an embodiment of this application;

FIG. 10B is a schematic diagram of another structure of first secondary carrier status indication information according to an embodiment of this application;

FIG. 11A is a schematic diagram of another structure of first secondary carrier status indication information according to an embodiment of this application;

FIG. 11B is a schematic diagram of another structure of first secondary carrier status indication information according to an embodiment of this application;

FIG. 12A is a schematic diagram of another structure of first secondary carrier status indication information according to an embodiment of this application;

FIG. 12B is a schematic diagram of another structure of first secondary carrier status indication information according to an embodiment of this application;

FIG. 13A is a schematic diagram of a structure of second secondary carrier status indication information according to an embodiment of this application;

FIG. 13B is a schematic diagram of another structure of second secondary carrier status indication information according to an embodiment of this application;

FIG. 13C is a schematic diagram of another structure of second secondary carrier status indication information according to an embodiment of this application;

FIG. 14A is a schematic diagram of another structure of second secondary carrier status indication information according to an embodiment of this application;

FIG. 14B is a schematic diagram of a structure of the first secondary carrier status indication information that indicates activated states or deactivated states of secondary carriers corresponding to Rx UE 130a, Rx UE 130b, and Rx UE 130n in FIG. 5 according to FIG. 14A;

FIG. 14C is a schematic diagram of another structure of second secondary carrier status indication information according to an embodiment of this application;

FIG. 14D is a schematic diagram of another structure of second secondary carrier status indication information according to an embodiment of this application;

FIG. 15A is a schematic diagram of another structure of second secondary carrier status indication information according to an embodiment of this application;

FIG. 15B is a schematic diagram of another structure of second secondary carrier status indication information according to an embodiment of this application;

FIG. 16A is a schematic diagram of another structure of second secondary carrier status indication information according to an embodiment of this application;

FIG. 16B is a schematic diagram of another structure of second secondary carrier status indication information according to an embodiment of this application;

FIG. 17A is a schematic diagram of another structure of second secondary carrier status indication information according to an embodiment of this application;

FIG. 17B is a schematic diagram of another structure of second secondary carrier status indication information according to an embodiment of this application;

FIG. 18 shows another example of carrier allocation at a network device 120 according to an embodiment of this application;

FIG. 19A is a schematic diagram of another structure of first secondary carrier status indication information according to an embodiment of this application;

FIG. 19B is a schematic diagram of a structure of the first secondary carrier status indication information that indicates activated states or deactivated states of secondary carriers corresponding to Rx UE 130a in FIG. 18 according to FIG. 19A;

FIG. 19C is a schematic diagram of another structure of first secondary carrier status indication information according to an embodiment of this application;

FIG. 20A is a schematic diagram of another structure of first secondary carrier status indication information according to an embodiment of this application;

FIG. 20B is a schematic diagram of another structure of first secondary carrier status indication information according to an embodiment of this application;

FIG. 20C is a schematic diagram of another structure of first secondary carrier status indication information according to an embodiment of this application;

FIG. 21A is a schematic diagram of another structure of first secondary carrier status indication information according to an embodiment of this application;

FIG. 21B is a schematic diagram of another structure of first secondary carrier status indication information according to an embodiment of this application;

FIG. 22A is a schematic diagram of another structure of first secondary carrier status indication information according to an embodiment of this application;

FIG. 22B is a schematic diagram of a structure of the first secondary carrier status indication information that indicates activated states or deactivated states of secondary carriers corresponding to Rx UE 130a, Rx UE 130b, and Rx UE 130n in FIG. 18 according to FIG. 22A;

FIG. 22C is a schematic diagram of another structure of first secondary carrier status indication information according to an embodiment of this application;

FIG. 23A is a schematic diagram of another structure of first secondary carrier status indication information according to an embodiment of this application;

FIG. 23B is a schematic diagram of another structure of first secondary carrier status indication information according to an embodiment of this application;

FIG. 24A is a schematic diagram of another structure of first secondary carrier status indication information according to an embodiment of this application;

FIG. 24B is a schematic diagram of another structure of first secondary carrier status indication information according to an embodiment of this application;

FIG. 25A is a schematic diagram of another structure of first secondary carrier status indication information according to an embodiment of this application;

FIG. 25B is a schematic diagram of another structure of first secondary carrier status indication information according to an embodiment of this application;

FIG. 26 shows another example of carrier allocation at a network device 120 according to an embodiment of this application;

FIG. 27A is a schematic diagram of another structure of first secondary carrier status indication information according to an embodiment of this application;

FIG. 27B is a schematic diagram of a structure of the first secondary carrier status indication information that indicates activated states or deactivated states of secondary carriers corresponding to Rx UE 130a, Rx UE 130b, and Rx UE 130n in FIG. 26 according to FIG. 27A;

FIG. 27C is a schematic diagram of a structure of the first secondary carrier status indication information that indicates activated states or deactivated states of secondary carriers corresponding to Rx UE 130a and Rx UE 130n in FIG. 26 according to FIG. 27A;

FIG. 28A is a schematic diagram of another structure of second secondary carrier status indication information according to an embodiment of this application;

FIG. 28B is a schematic diagram of a structure of the second secondary carrier status indication information that indicates activated states or deactivated states of secondary carriers corresponding to Rx UE 130a, Rx UE 130b, and Rx UE 130n in FIG. 26 according to FIG. 28A;

FIG. 28C is a schematic diagram of a structure of the second secondary carrier status indication information that indicates activated states or deactivated states of secondary carriers corresponding to Rx UE 130a and Rx UE 130n in FIG. 26 according to FIG. 27A;

DETAILED DESCRIPTION OF ILLUSTRATIVE EMBODIMENTS

It should be understood that, although terms such as "first" and "second" may be used in this specification to describe various features, these features should not be limited by these terms. These terms are merely used for distinguishing, and shall not be understood as an indication or implication of relative importance. For example, without departing from the scope of example embodiments, a first feature may be referred to as a second feature, and similarly the second feature may be referred to as the first feature.

Unless otherwise stated, terms "contain", "have", and "include" are synonymous. A phrase "A/B" indicates "A or B". A phrase "A and/or B" means "(A), (B), or (A and B)".

As used herein, a term "module" may mean being a part thereof, or include a memory (a shared memory, a special-purpose memory, or a group memory) for running one or more software or firmware programs, an application-specific integrated circuit (ASIC), an electronic circuit and/or a processor (a shared processor, a special-purpose processor, or a group processor), a combined logic circuit, and/or another appropriate component that provides the function.

To make the objectives, technical solutions, and advantages of this application clearer, the following further describes implementations of this application in detail with reference to the accompanying drawings.

Figure 1A:
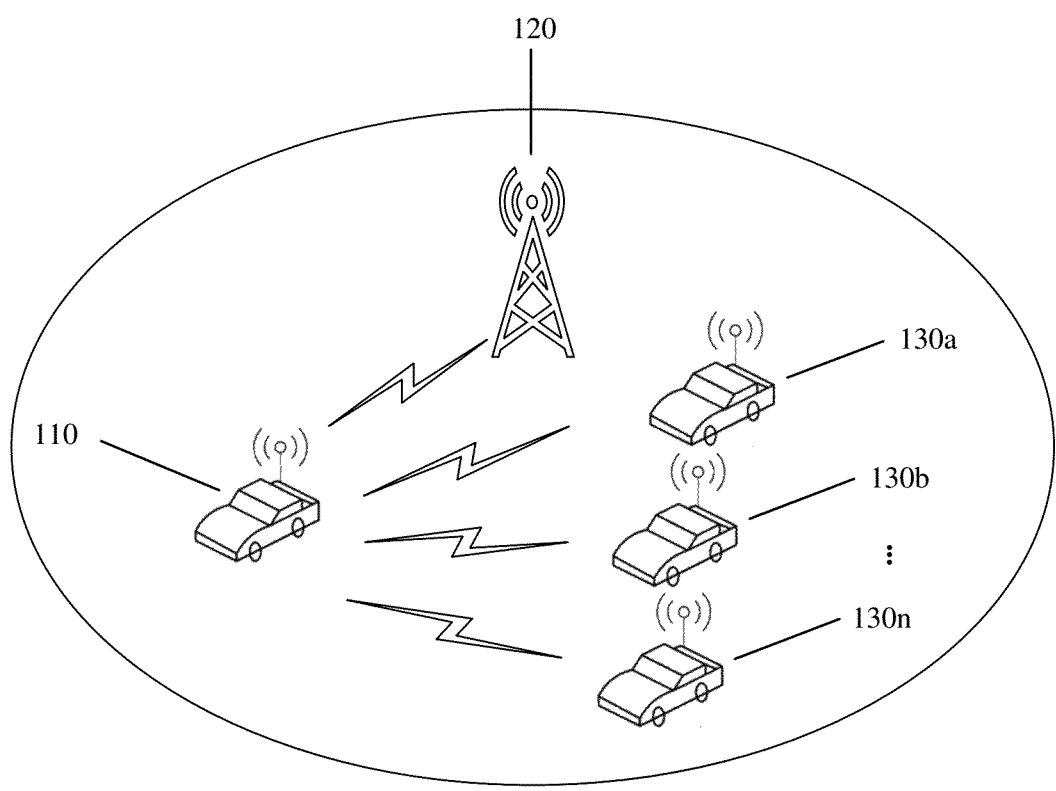
FIG. 1A is a schematic diagram of an application scenario according to an embodiment of this application.
Figure 1B:
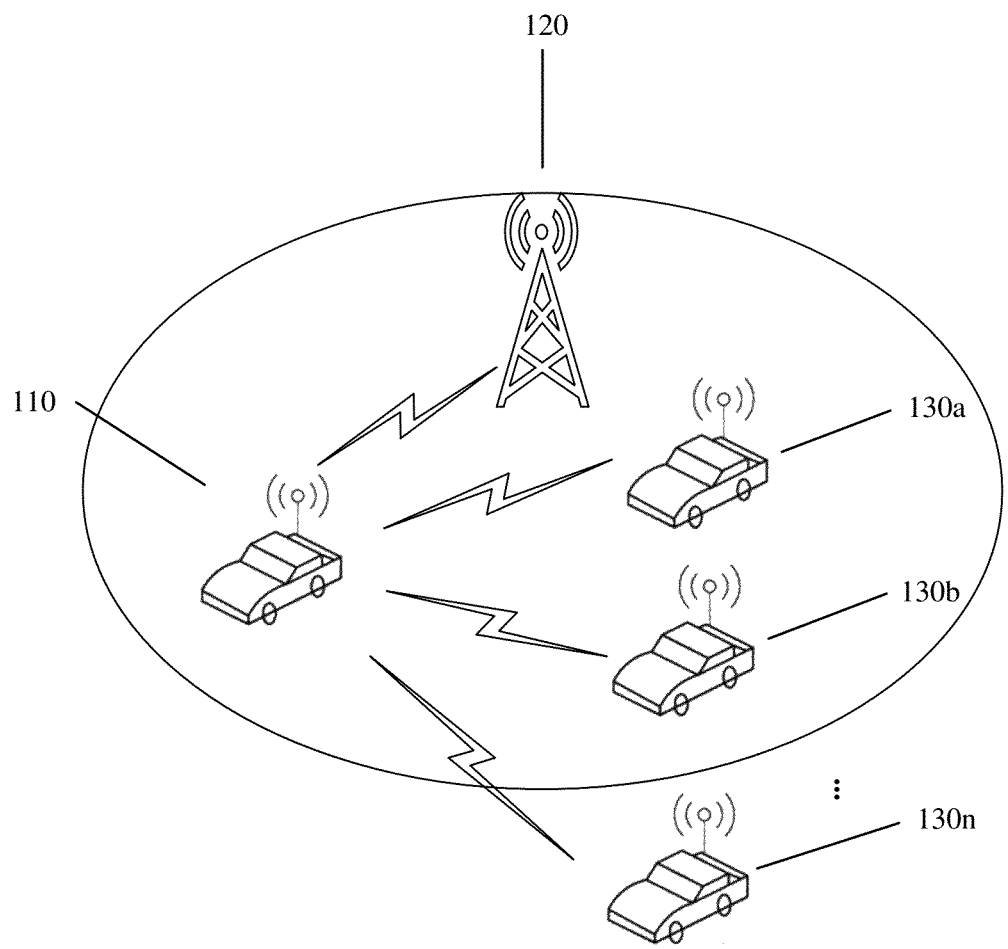
FIG. 1B is a schematic diagram of another application scenario according to an embodiment of this application.

FIG. 1A and FIG. 1B show two application scenarios according to embodiments of this application. A related communications system includes Tx UE 110, a network device 120, and Rx UE 130a to Rx UE 130n (collectively referred to as Rx UE 130 in the following embodiments). When the Tx UE 110 needs to communicate with the neighboring Rx UE 130a to Rx UE 130n, the Tx UE 110 may first request, from the network device 120, resources required for communication, and then send control information and data information to the Rx UE 130a to the Rx UE 130*n* based on the resources allocated by the network device. A difference between FIG. 1A and FIG. 1B is that, in FIG. 1A, the Tx UE 110 and the Rx UE 130*a* to the Rx UE 130*n* are all located within coverage of the network device 120, while in FIG. 1B, the Tx UE 110 and some Rx UEs 130 (for example, the Rx UE 130*a* and the Rx UE 130*b*) are located within the coverage of the base station 120, and the other Rx UEs 130 (for example, the Rx UE 130*n*) are located outside the coverage of the network device 120. It should be noted that, in FIG. 1B, the Rx UE 130*a* to the Rx UE 130*n* may alternatively be all located outside the coverage of the network device 120. In addition, although FIG. 1A and FIG. 1B show a case in which the Tx UE 110 can communicate with the Rx UE 130*a* to the Rx UE 130*n*, the Tx UE 110 can communicate with any quantity of Rx UEs 130.

In FIG. 1A and FIG. 1B:

(1) The Tx UE 110 and the Rx UE 130 are user equipments, are also referred to as terminals or terminal devices, and are devices providing voice and/or data connectivity for a user. Common terminal devices include, for example, a vehicle-mounted device, a mobile phone, a tablet computer, a notebook computer, a palmtop computer, a mobile internet device (mobile internet device, MID), a wearable device (for example, including a smartwatch, a smart band, or a pedometer), a personal digital assistant, a portable media player, a navigation device, a video game device, a set-top box, a virtual reality device and/or an augmented reality device, an internet of things device, an industrial control device, a streaming media client device, an e-book, a reading device, a POS terminal, and other devices.

(2) The network device 120 is also referred to as a radio access network (Radio Access Network, RAN) device, is a device that communicates with user equipment through a radio access network, and includes network devices in various communications standards, for example, includes but is not limited to a base station, an evolved NodeB (evolved NodeB, eNB), a next generation NodeB (next generation NodeB, gNB), a radio network controller (radio network controller, RNC), a NodeB (NodeB, NB), a base station controller (Base Station Controller, BSC), a base transceiver station (Base Transceiver Station, BTS), a home network device (for example, Home evolved NodeB or Home NodeB, HNB), and a baseband unit (Baseband Unit, BBU). The network device includes network devices in various frequency standards, for example, includes but is not limited to a low-frequency network device and a high-frequency network device.

(3) Communication between the Tx UE 110 and the Rx UE 130 may include sidelink communication (sidelink communication), and sidelink communication may include proximity-based services (proximity-based services, ProSe) direct communication (defined in 3GPP TS 23.303), V2X communication (defined in 3GPP TS 23.285), and other types of wireless communication directly performed between two or more neighboring user equipments.

(4) In sidelink communication, a communication link between the Tx UE 110 and the Rx UE 130 is referred to as a sidelink (sidelink), and a communications interface between the Tx UE 110 and the Rx UE 130 is referred to as a PC5 interface.

(5) Communication between the Tx UE 110 and the network device 120 may be based on, but is not limited to, a 3rd generation (3rd Generation, 3G) mobile communications system, a 4th generation (4th Generation, 4G) mobile communications system, a 5th generation (5th generation, 5G) system, a new radio (new radio, NR) system or a communications system having a same architecture as the 5G system, and other subsequent mobile communications systems.

In the conventional technology, in 5G NR, sidelink communication between the Tx UE 110 and the Rx UE 130 supports only a single carrier, and a resource configured by the network device 120 for the Tx UE 110 for sidelink communication includes only a single-carrier resource. In this case, if the Tx UE 110 has a large data communication requirement, communication quality of the Tx UE 110 may be limited. In addition, in 4G LTE V2X, although sidelink communication between the Tx UE 110 and the Rx UE 130 already supports a plurality of carriers, the plurality of carriers are only for a broadcast scenario. In other words, the Tx UE 110 sends broadcast data on a plurality of carriers configured by the network device 120, and Rx UE 130 of interest performs monitoring.

In a long term evolution (long term evolution, LTE) system, to meet requirements for increasing a single-user peak rate and a system capacity, a carrier aggregation (carrier aggregation, CA) technology is introduced. The CA technology can aggregate a plurality of LTE component carriers (component carrier, CC) to effectively increase an uplink/downlink transmission rate. A component carrier accessed by UE is referred to as a primary carrier, and another component carrier is referred to as a secondary carrier. An uplink carrier and a corresponding downlink carrier form a cell (Cell). Correspondingly, a primary carrier is a primary cell (Primary Cell, PCell), and a secondary carrier is a secondary cell (Secondary Cell, SCell).

However, even if the CA technology in the LTE system is used for sidelink communication between the Tx UE 110 and the Rx UE 130, because the network device 120 cannot indicate activated states or deactivated states of a plurality of carriers in the conventional technology, when a plurality of carriers are configured for the Rx UE 130, only all secondary cells (secondary cell, SCell) can be continuously monitored. Consequently, power consumption of the Rx UE is excessively high.

In embodiments of this application, the network device 120 may configure a plurality of carriers for sidelink communication between the Tx UE 110 and one or more Rx UEs 130 based on a request of the Tx UE 110, and indicate activated states or deactivated states of the plurality of carriers to the Tx UE 110; the Tx UE 110 may indicate an activated state or a deactivated state of a related carrier to the one or more Rx UEs 130 based on information about the network device 120; and then the Rx UE 130 may perform setting on the related carrier based on information about the Tx UE 110, to perform sidelink communication on an activated-state carrier in the plurality of carriers. In this way, resources used by the Tx UE 110 for data transmission increase. Even if the Tx UE 110 has a large data communication requirement, communication quality of the Tx UE 110 can be ensured, and a carrier activation or deactivation mechanism can better manage battery consumption of the Rx UE 130.

The following uses specific embodiments to describe in detail the technical solutions of this application and a manner of resolving the foregoing technical problem by using the technical solutions of this application. The following specific embodiments may be mutually combined, and same or similar concepts or processes are not repeatedly described in some embodiments.

Figure 2:
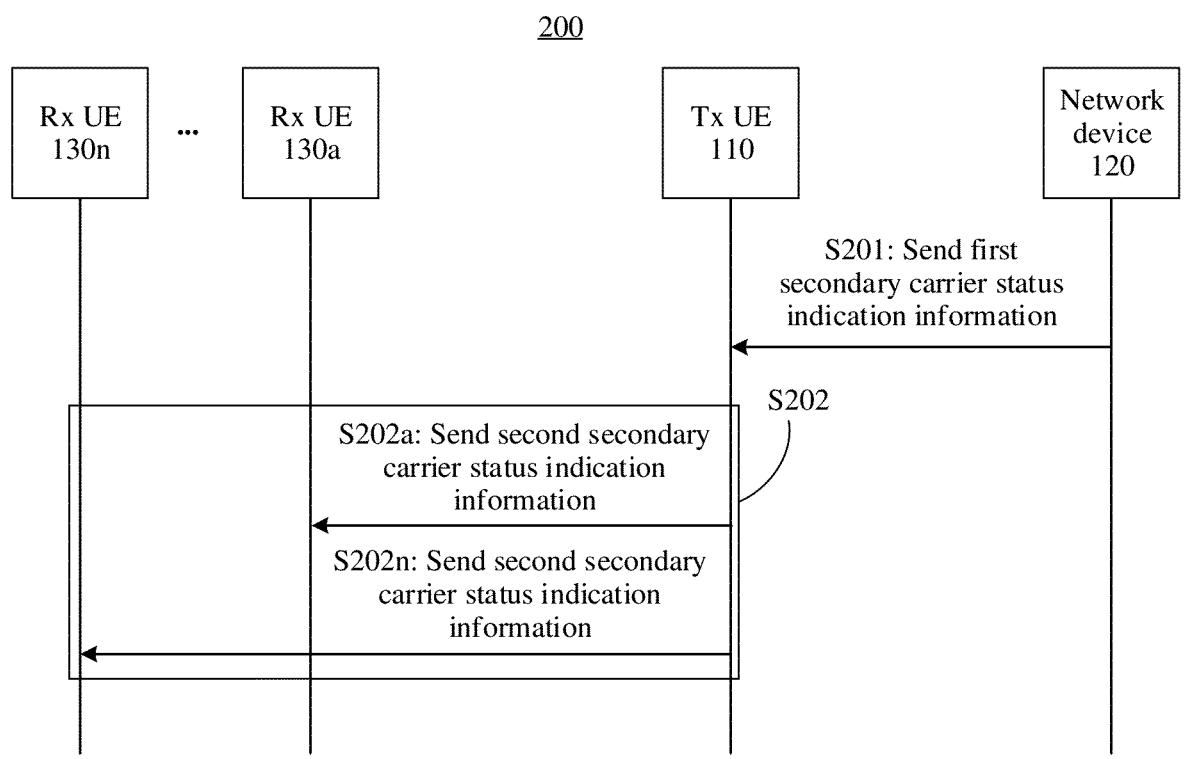
FIG. 2 is a schematic flowchart of a wireless communication method 200 according to an embodiment of this application.

FIG. 2 is a schematic flowchart of a wireless communication method 200 according to an embodiment of this application. As shown in FIG. 2, the wireless communication method 200 may include the following steps.

S201: A network device 120 sends first secondary carrier status indication information to Tx UE 110.

In an example, the first secondary carrier status indication information indicates that each of a plurality of secondary carriers is in an activated state or a deactivated state, the plurality of secondary carriers are used for multi-carrier sidelink communication between the Tx UE 110 and at least one Rx UE 130, and each of the at least one Rx UE 130 corresponds to at least one of the plurality of secondary carriers.

In an example, the first secondary carrier status indication information may be related to numbers of the plurality of secondary carriers at the network device 120. For a numbering rule of the plurality of secondary carriers at the network device 120, refer to that shown in FIG. 5, FIG. 18, or FIG. 26 in the following embodiment. For a structure of the first secondary carrier status indication information related to the numbers of the plurality of secondary carriers at the network device 120, refer to that shown in FIG. 6A to FIG. 12B, FIG. 19A to FIG. 25B, or FIG. 27A to FIG. 27C in the following embodiment.

S202: Send second secondary carrier status indication information to each of the at least one Rx UE 130 in S201, for example, in S202a, send the second secondary carrier status indication information to Rx UE 130a; and in S202n, send the second secondary carrier status indication information to Rx UE 130n.

In an example, the second secondary carrier status indication information indicates that each of the at least one secondary carrier in S201 is in an activated state or a deactivated state. In an example, the second secondary carrier status indication information may be related to numbers of the plurality of secondary carriers at the Tx UE 110. For a numbering rule of the plurality of secondary carriers at the Tx UE 110, refer to that shown in FIG. 5, FIG. 18, or FIG. 26 in the following embodiment. For a structure of the second secondary carrier status indication information related to the numbers of the plurality of secondary carriers at the Tx UE 110, refer to that shown in FIG. 13A to FIG. 17B or FIG. 28A to FIG. 28C in the following embodiment.

Figure 3A:
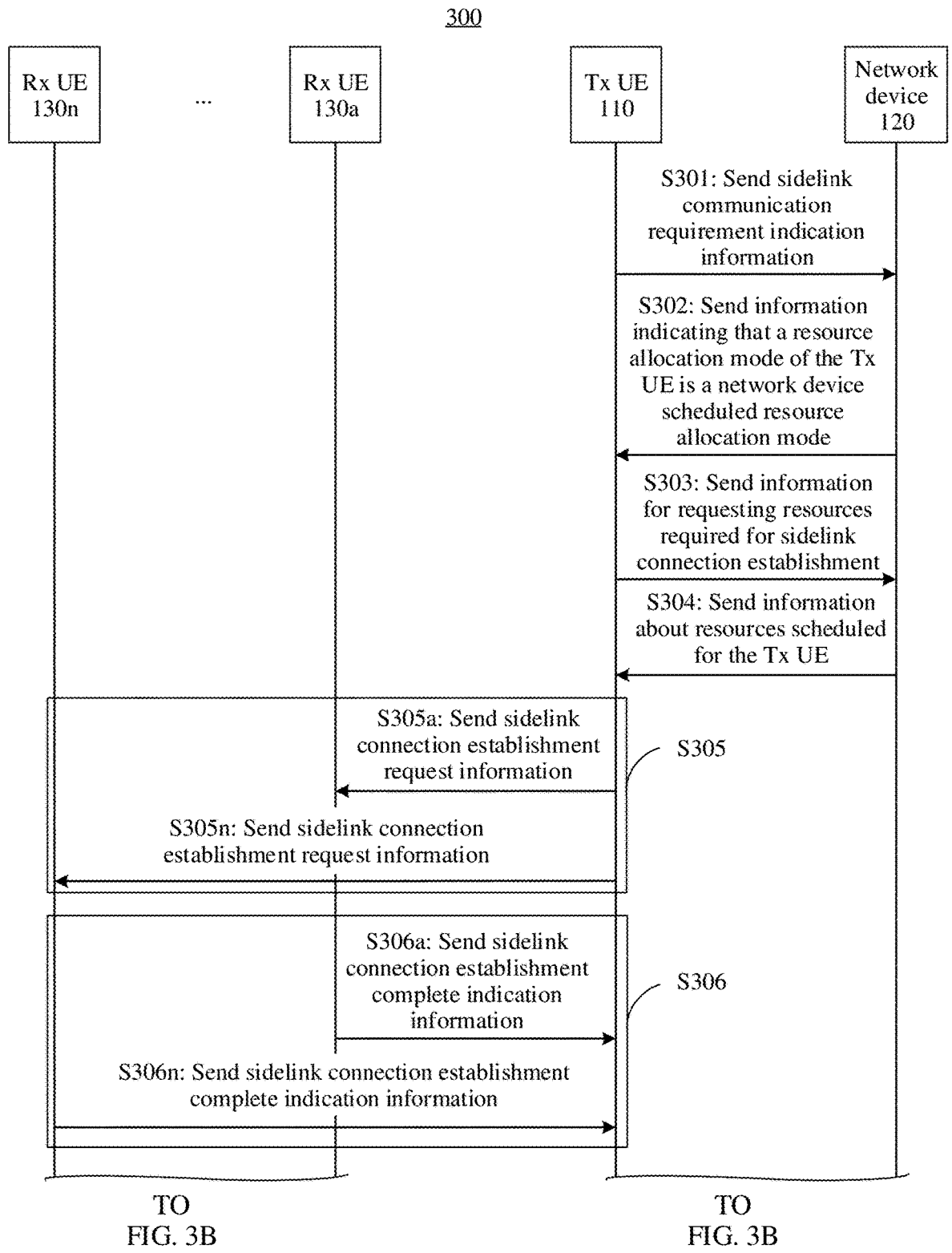
FIG. 3A and FIG. 3B are a schematic flowchart of a wireless communication method 300 according to an embodiment of this application.
Figure 3B:
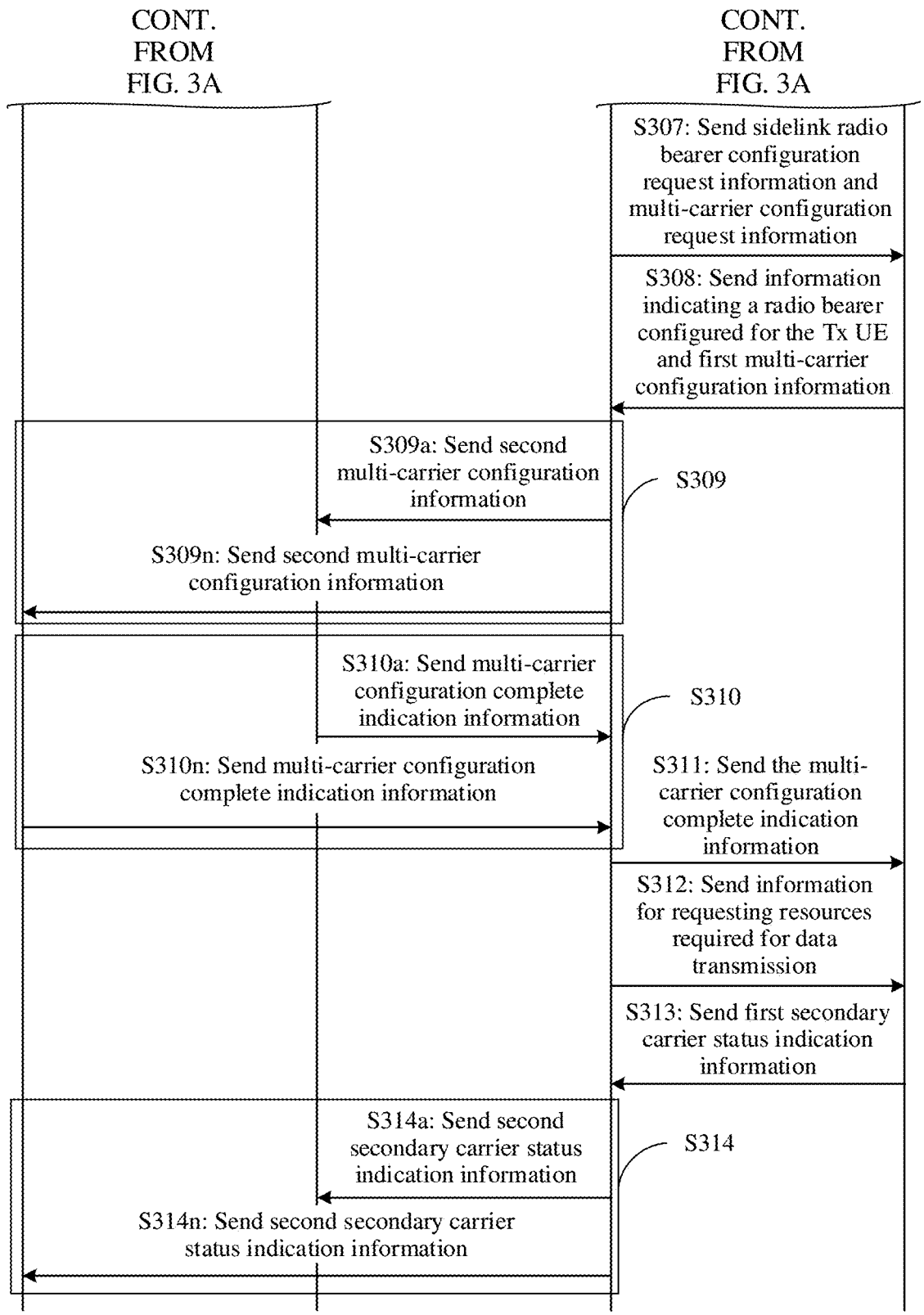

FIG. 3A and FIG. 3B are a schematic flowchart of a wireless communication method 300 according to an embodiment of this application. It should be noted that, although steps of the method are presented in a particular order in this embodiment of this application, the order of the steps may be changed in different embodiments. As shown in FIG. 3A and FIG. 3B, the wireless communication method 300 may include the following steps.

S301: Tx UE 110 sends sidelink communication requirement indication information to a network device 120.

In an example, the Tx UE 110 may send the sidelink communication requirement indication information to the network device 120 by using any one of a SidelinkUEInformation message and a SidelinkUEInformationNR message defined in 3rd Generation Partnership Project (3rd Generation Partnership Project, 3GPP) TS 36.331 and a SidelinkUEInformationEUTRA message and a SidelinkUEInformationNR message defined in TS 38.331 (which are collectively referred to as a SidelinkUEInformation type message below).

The SidelinkUEInformation type message is used by user equipment to indicate sidelink-related information to a network device (for example, a base station). In the SidelinkUEInformation type message, the sidelink communication requirement indication information may include information indicating a frequency of interest of the user equipment that is used to transmit and receive sidelink communication, destination list indication information, and the like. The destination list indication information may include information indicating identifiers (for example but not limited to, destination layer-2 identifiers (destination layer-2 ID) defined in 3GPP TS 36.300) of one or more Rx UEs 130 (for example but not limited to, Rx UE 130a to Rx UE 130n).

S302: The network device 120 sends, to the Tx UE 110, information indicating that a resource allocation mode of the Tx UE 110 is a network device scheduled resource allocation mode.

In an example, the network device 120 may send, by using a second message, the information indicating that the resource allocation mode of the Tx UE 110 is the network device scheduled resource allocation mode, where the second message may be higher layer signaling, for example, RRC signaling. For example, the second message may include an RRCConnectionReconfiguration message defined in 3GPP TS 36.331 or an RRCReconfiguration message defined in 3GPP TS 38.331. In the RRCConnectionReconfiguration message or the RRCReconfiguration message, content of an information element (information element, IE) "SL-V2X-ConfigDedicated" may indicate that the resource allocation mode of the Tx UE 110 is a base station scheduled resource allocation mode or an autonomous resource selection allocation mode.

S303: The Tx UE 110 sends, to the network device 120, information for requesting resources required for sidelink connection establishment.

In an example, the information for requesting resources required for sidelink connection establishment may include a scheduling request (scheduling request, SR) and a buffer status report (buffer status report, BSR). The SR is used by the Tx UE 110 to indicate, to the network device 120, that the Tx UE 110 has data to be transmitted, and the BSR is used by the Tx UE 110 to indicate, to the network device 120, an amount of data to be transmitted by the Tx UE 110.

It can be understood that the SR and the BSR may be separately sent, or may be simultaneously sent. This is not limited in this embodiment of this application.

S304: The network device 120 sends, to the Tx UE 110, information about resources scheduled for the Tx UE 110.

These resources are used by the Tx UE 110 to establish sidelink connections to one or more Rx UEs 130, for example but not limited to, the Rx UE 130a to the Rx UE 130n.

In an example, the network device 120 may perform resource scheduling based on the BSR reported by the Tx UE 110.

In an example, the network device 120 may send, to the Tx UE 110 through a PDCCH, the information indicating the resources scheduled by the network device 120 for the Tx UE 110.

In an example, for each of the one or more Rx UEs 130, the network device 120 allocates a single-carrier resource corresponding to the Rx UE 130, where the single-carrier resource is used by the Tx UE 110 to establish a sidelink connection to the Rx UE 130.

S305: The Tx UE 110 sends sidelink connection establishment request information to the one or more Rx UEs 130 based on the resources allocated by the network device 120.

For example, in S305a, the Tx UE 110 sends, to the Rx UE 130a, information for requesting to establish a sidelink connection on a PC5 interface; and in S305n, the Tx UE 110 sends, to the Rx UE 130n, information for requesting to establish a sidelink connection on a PC5 interface.

It can be understood that the Tx UE 110 may simultaneously or sequentially send the sidelink connection establishment request information to the one or more Rx UEs 130. This is not limited in this embodiment of this application.

It should be noted that, for each Rx UE 130, the Tx UE 110 uses a single carrier that is allocated by the network device 120 and that corresponds to the Rx UE 130 as a primary carrier (or referred to as a primary cell), where the primary carrier is a carrier used to establish a sidelink connection between the Tx UE 110 and the Rx UE 130. In addition, the Tx UE 110 may perform setting based on the information indicating the resources scheduled by the network device 120 for the Tx UE 110, to perform sidelink communication on the single carrier. For example, the Tx UE 110 may add the single carrier corresponding to an identifier of the single carrier based on a parameter configuration of the single carrier.

S306: The one or more Rx UEs 130 send sidelink connection establishment complete indication information to the Tx UE 110.

For example, in S306a, the Rx UE 130a sends the sidelink connection establishment complete indication information to the Tx UE 110; and in S306n, the Rx UE 130n sends the sidelink connection establishment complete indication information to the Tx UE 110.

S307: When the Tx UE 110 has data to be transmitted to the Rx UE 130, the Tx UE 110 may send sidelink radio bearer configuration request information and multi-carrier configuration request information to the network device 120.

In an example, the Tx UE 110 may send the foregoing information by using a third message, where the third message may include a SidelinkUEInformation type message.

In an example, the Tx UE 110 may request a multi-carrier configuration from the network device 120 in the following several forms by using the SidelinkUEInformation type message:

(1) In the SidelinkUEInformation type message, the Tx UE 110 uses 1 bit to indicate whether the Tx UE 110 requests the multi-carrier configuration from the network device 120. When a value of the bit is "1", it indicates that the Tx UE 110 requests the multi-carrier configuration from the network device 120, that is, the value "1" is the foregoing multi-carrier configuration request information; or when a value of the bit is 0, it indicates that the Tx UE 110 does not request the multi-carrier configuration from the network device 120. Alternatively, when a value of the bit is "0", it indicates that the Tx UE 110 requests the multi-carrier configuration from the network device 120, that is, the value "0" is the foregoing multi-carrier configuration request information; or when a value of the bit is 1, it indicates that the Tx UE 110 does not request the multi-carrier configuration from the network device 120.

(2) When the Tx UE 110 adds the multi-carrier configuration request information to the SidelinkUEInformation type message, it indicates that the Tx UE 110 requests the multi-carrier configuration from the network device 120; or when the Tx UE 110 does not add the multi-carrier configuration request information to the SidelinkUEInformation type message, it indicates that the Tx UE 110 does not request the multi-carrier configuration from the network device 120. In this case, the multi-carrier configuration request information may include any content, for example but not limited to, 1 bit whose value is "1" or "0", or an enumerated type value Enumerated {true}.

In another example, the multi-carrier configuration request information may further include identifiers of one or more Rx UEs 130, to indicate, to the network device 120, Rx UEs 130 in sidelink communication that is with the Tx UE 110 and for which the network device 120 needs to configure a plurality of carriers. The identifier of the Rx UE 130 may include but is not limited to a destination layer-2 identifier (destination layer-2 ID) of the Rx UE 130, an index of the Rx UE 130 in the one or more Rx UEs communicating with the Tx UE 110, and the like.

The Tx UE 110 and the network device 120 may determine, based on the destination list indication information in S301 by using a default rule, an index of Rx UE 130 in the one or more Rx UEs communicating with the Tx UE 110. For example, in the destination list indication information, the Tx UE 110 and the network device 120 may consider, by default, that an index of Rx UE 130 whose identifier ranks first is 1, an index of Rx UE 130 whose identifier ranks second is 2, and so on. Alternatively, the Tx UE 110 may directly indicate an index of Rx UE 130 in the destination list indication information in S301.

In another example, the Tx UE 110 may send the sidelink radio bearer establishment request information and the multi-carrier configuration request information by using two different messages. In this case, the message used to send the sidelink radio bearer establishment request information may include a SidelinkUEInformation type message, and the message used to send the multi-carrier configuration request information may include a UEAssistanceInformation message defined in 3GPP TS 36.331 or 38.331 or a new message that is not defined in 3GPP TS. The UEAssistanceInformation message is used by the user equipment to indicate user equipment assistance information to the network device (for example, the base station). The UEAssistanceInformation message may include information indicating a configuration preference of the user equipment for a maximum PDSCH bandwidth, information indicating that a quantity of repetitions on an MPDCCH is excessively large, information indicating a service feature of an uplink logical channel, and the like.

For a form in which the Tx UE 110 requests the multi-carrier configuration from the network device 120 by using the UEAssistanceInformation message or a newly defined message, refer to the foregoing related descriptions of the SidelinkUEInformation type message. Details are not described herein again.

It should be noted that the Tx UE 110 may alternatively not send the multi-carrier configuration request information to the network device 120, but the network device 120 determines whether a plurality of carriers need to be configured for the Tx UE 110.

S308: The network device 120 sends information indicating a radio bearer configured for the Tx UE 110 and first multi-carrier configuration information to the Tx UE 110.

The first multi-carrier configuration information is used to indicate information related to a plurality of secondary carriers configured by the network device 120, and the plurality of secondary carriers are used for multi-carrier sidelink communication (that is, sidelink communication based on a plurality of carriers, where the plurality of carriers include a primary carrier and a secondary carrier) between the Tx UE 110 and one or more Rx UEs 130. In addition, a difference between the secondary carrier and the primary carrier is that the secondary carrier is a carrier for providing additional radio resources for sidelink communication between the Tx UE 110 and the Rx UE 130.

In an example, the network device 120 may send the foregoing information by using a fourth message, where the fourth message includes an RRCConnectionReconfiguration message defined in 3GPP TS 36.331, an RRCReconfiguration message defined in 3GPP TS 38.331, or a new message that is not defined in 3GPP TS.

In an example, the first multi-carrier configuration information may include identifiers of the one or more Rx UEs 130 and an identifier of at least one secondary carrier corresponding to each Rx UE 130 in the plurality of secondary carriers, and the at least one secondary carrier corresponding to each Rx UE 130 is used for multi-carrier sidelink communication between the Tx UE 110 and the Rx UE 130. The identifier of the Rx UE 130 may include but is not limited to a destination layer-2 identifier (destination layer-2 ID) or an index of the Rx UE 130, and the index of the Rx UE 130 may include but is not limited to an index of each Rx UE 130 included in the foregoing destination list indication information, an index of each Rx UE 130 included in the foregoing multi-carrier configuration request information, an index of each Rx UE 130 having established a sidelink connection to the Tx UE 110, and the like. The identifier of the secondary carrier may include but is not limited to a secondary carrier identifier (Identifier, ID), a cell index, and the like.

In addition, for each secondary carrier, the first multi-carrier configuration information may further include a parameter configuration of the secondary carrier, for example, a frequency band, a frequency, a bandwidth, or a subcarrier spacing.

In another example, the first multi-carrier configuration information may further include a number of each secondary carrier, and the number of the secondary carrier is used by the network device 120 to indicate an activated state or a deactivated state of each of secondary carriers corresponding to one or more Rx UEs 130 to the Tx UE 110 in S313. However, when the Tx UE 110 and the network device 120 may determine the number of each secondary carrier by using a default rule, the first multi-carrier configuration information may alternatively not include the number of each secondary carrier. Details are described in the following embodiment.

It should be noted that the network device 120 may alternatively separately send the information indicating the radio bearer configured by the network device 120 for the Tx UE 110 and the first multi-carrier configuration information. For example, the network device 120 may send the foregoing two types of information by using two RRCReconfiguration messages.

It should be noted that, when the Tx UE 110 does not send the multi-carrier configuration request information to the network device 120, the network device 120 may determine whether the plurality of carriers need to be configured for the Tx UE 110. For example, the network device 120 may determine, based on historical resource usage of the Tx UE 110 and current idle resources, whether the plurality of carriers need to be configured for the Tx UE 110.

S309: The Tx UE 110 sends second multi-carrier configuration information to one or more Rx UEs 130.

For example, in S309a, the Tx UE 110 sends the second multi-carrier configuration information to the Rx UE 130a; and in S309n, the Tx UE 110 sends the second multi-carrier configuration information to the Rx UE 130n.

It can be understood that the Tx UE 110 may simultaneously or sequentially send the second multi-carrier configuration information to the one or more Rx UEs 130. This is not limited in this embodiment of this application.

In an example, the Tx UE 110 may send the second multi-carrier configuration information by using a fifth message, where the fifth message may include but is not limited to an RRCReconfigurationSidelink message on a PC5 interface or another new message that is not defined in 3GPP TS.

In an example, the second multi-carrier configuration information may include an identifier of at least one secondary carrier corresponding to the Rx UE 130 in the plurality of secondary carriers, for example but not limited to, a secondary carrier ID and a cell index. In addition, the second multi-carrier configuration information sent by the Tx UE 110 to the Rx UE 130 may further include a parameter configuration of each secondary carrier, for example, a frequency band, a frequency, a bandwidth, or a subcarrier spacing.

In another example, the second multi-carrier configuration information may further include a number of each of the at least one secondary carrier corresponding to the Rx UE 130, and the number of the secondary carrier is used by the Tx UE 110 to indicate an activated state or a deactivated state of the at least one secondary carrier to the Rx UE 130 in S314. However, when the Tx UE 110 and the Rx UE 130 may determine the number of each secondary carrier by using a default rule, the second multi-carrier configuration information sent by the Tx UE 110 to the Rx UE 130 may alternatively not include the number of each secondary carrier. Details are described in the following embodiment.

In another example, the second multi-carrier configuration information may further include an index of the Rx UE 130, and the index may be used by the Tx UE 110 to indicate an activated state or a deactivated state of the at least one secondary carrier to the Rx UE 130 in S314. Details are described in the following embodiment. For example, the index of the Rx UE 130 may be an index of each Rx UE 130 included in the foregoing destination list indication information, an index of each Rx UE 130 included in the foregoing multi-carrier configuration request information, or an index of each Rx UE 130 having established a sidelink connection to the Tx UE 110. The index of the Rx UE 130 is not specifically limited in this embodiment of this application.

It should be noted that the Tx UE 110 may further perform setting based on the first multi-carrier configuration information received from the network device 120, to perform sidelink communication on the plurality of secondary carriers. For example, the Tx UE 110 may add, based on the parameter configuration of each of the plurality of secondary carriers, each secondary carrier corresponding to each secondary carrier identifier.

S310: One or more Rx UEs 130 send multi-carrier configuration complete indication information to the Tx UE 110, to indicate, to the Tx UE 110, that the multi-carrier configuration is completed.

For example, in S310a, the Rx UE 130a sends the multi-carrier configuration complete indication information to the Tx UE 110; and in S310n, the Rx UE 130n sends the multi-carrier configuration complete indication information to the Tx UE 110.

In an example, the one or more Rx UEs 130 may send the multi-carrier configuration complete indication information by using a sixth message, where the sixth message may include but is not limited to an RRCReconfiguration-CompleteSidelink message on a PC5 interface or another new message that is not defined in 3GPP TS.

It should be noted that the Rx UE 130 may further perform setting based on the second multi-carrier configuration information received from the Tx UE 110, to perform sidelink communication on the at least one corresponding secondary carrier. For example, the Rx UE 130 may add, based on the parameter configuration of each of the at least one of secondary carrier, each secondary carrier corresponding to each secondary carrier identifier.

S311: The Tx UE 110 sends the multi-carrier configuration complete indication information to the network device 120, to indicate, to the network device 120, that the Tx UE 110 and the one or more Rx UEs 130 have completed the multi-carrier configuration.

In an example, the Tx UE 110 may send the multi-carrier configuration complete indication information to the network device 120 by using a seventh message, where the seventh message may include an RRCConnectionReconfigurationComplete message defined in 3GPP TS 36.331 or an RRCReconfigurationComplete message defined in 3GPP TS 38.331, or the seventh message may include a new message that is not defined in 3GPP TS.

In an example, the multi-carrier configuration complete indication information may include identifiers of the one or more Rx UEs 130, to indicate, to the network device 120, Rx UEs 130 that each have completed the multi-carrier configuration. The identifier of the Rx UE 130 may include but is not limited to a destination layer-2 identifier (destination layer-2 ID) of the Rx UE 130, an index of the Rx UE 130, and the like. For example, the index of the Rx UE 130 may be an index of each Rx UE 130 included in the foregoing destination list indication information, an index of each Rx UE 130 included in the foregoing multi-carrier configuration request information, or an index of each Rx UE 130 having established a sidelink connection to the Tx UE 110. The index of the Rx UE 130 is not specifically limited in this embodiment of this application.

S312: The Tx UE 110 sends, to the network device 120, information for requesting resources required for data transmission.

In an example, the information for requesting resources required for data transmission may include an SR and a BSR. The SR is used by the Tx UE 110 to indicate, to the network device 120, that the Tx UE 110 has data to be transmitted, and the BSR is used by the Tx UE 110 to indicate, to the network device 120, an amount of data to be transmitted by the Tx UE 110.

S313: The network device 120 sends first secondary carrier status indication information to the Tx UE 110.

The first secondary carrier status indication information may indicate an activated state or a deactivated state of at least one secondary carrier corresponding to each of one or more Rx UEs 130. The one or more Rx UEs 130 may include but are not limited to the Rx UEs 130 that each have completed the multi-carrier configuration.

In an example, the first secondary carrier status indication information may be related to the numbers of the plurality of secondary carriers indicated in the first multi-carrier configuration information. Details are described in the following embodiment.

In an example, the network device 120 may send the first secondary carrier status indication information to the Tx UE 110 based on a size of the data amount indicated in the BSR reported by the Tx UE 110.

In an example, the network device 120 may send the first secondary carrier status indication information to the Tx UE 110 by using an eighth message, where the eighth message may include an RRCConnectionReconfiguration message defined in 3GPP TS 36.331, an RRCReconfiguration message defined in 3GPP TS 38.331, a medium access control (medium access control, MAC) control element (control element, CE) used to exchange MAC layer control information between the network device 120 and the Tx UE 110, an uplink control information (uplink control information, UCI) message, or a new message that is not defined in 3GPP TS.

For example, the MAC CE may include a newly defined sidelink SCell activation/deactivation MAC CE on a Uu interface between the network device 120 and the Tx UE 110.

It should be noted that, when sending the MAC CE, the network device 120 further sends a MAC subheader (subheader) corresponding to the MAC CE, to indicate a type and a length of the MAC CE. FIG. 4A and FIG. 4B each show an example structure of the MAC subheader corresponding to the sidelink SCell activation/deactivation MAC CE on the Uu interface between the network device 120 and the Tx UE 110 according to embodiments of this application. As shown in FIG. 4A and FIG. 4B, the MAC subheader corresponding to the sidelink SCell activation/deactivation MAC CE on the Uu interface between the network device 120 and the Tx UE 110 may specifically include the following four fields:

R: Reserved bit.

F: 1 bit. The 1 bit is used to indicate a length of the L field. When a value is 0, it indicates that the length of the L field is 8 bits; or when a value is 1, it indicates that a length of the L field is 16 bits.

LCID: 6 bits. A value of each bit is 0 or 1, and a value of the LCID field (which is not limited in this embodiment of this application) may indicate that a MAC CE type field corresponding to the MAC subheader is the sidelink SCell activation/deactivation MAC CE, that is from the network device 120 and that indicates the first secondary carrier status indication information, on the Uu interface between the network device 120 and the Tx UE 110.

L: 8 bits or 16 bits. FIG. 4A shows a case in which the L field is 8 bits, and FIG. 4B shows a case in which the L field is 16 bits. The L field is used to indicate a length of the sidelink SCell activation/deactivation MAC CE, that corresponds to the MAC subheader, on the Uu interface between the network device 120 and the Tx UE 110. The length of the L field may be indicated by the F field.

It should be noted that the network device 120 may further send, to the Tx UE 110 through, for example, a PDCCH, information indicating resources scheduled by the network device 120 for the Tx UE 110, where the resources are used by the Tx UE 110 to send data to the one or more Rx UEs 130 based on the radio bearer allocated by the network device 120; and the network device 120 may perform resource scheduling based on the BSR reported by the Tx UE 110.

S314: The Tx UE 110 separately sends second secondary carrier status indication information to the one or more Rx UEs 130.

For example, in S314a, the Tx UE 110 may send the second secondary carrier status indication information to the Rx UE 130a; and in S314n, the Tx UE 110 may send the second secondary carrier status indication information to the Rx UE 130n.

It can be understood that the Tx UE 110 may simultaneously or sequentially send the second secondary carrier status indication information to the one or more Rx UEs 130. This is not limited in this embodiment of this application.

In an example, the second secondary carrier status indication information may indicate an activated state or a deactivated state of a secondary carrier corresponding to each of the one or more Rx UEs 130. The one or more Rx UEs 130 may include but are not limited to the Rx UEs 130 whose corresponding secondary carriers are indicated to be in activated states or deactivated states in the first secondary carrier status indication information. In an example, the second secondary carrier status indication information may be related to the numbers of the secondary carriers indicated in the second multi-carrier configuration information. Details are described in the following embodiment.

In an example, the Tx UE 110 may send the second secondary carrier status indication information by using a ninth message, where the ninth message may include a MAC CE used to exchange MAC layer control information between the Tx UE 110 and the Rx UE 130, for example, a newly defined sidelink SCell activation/deactivation MAC CE on a PC5 interface.

It should be noted that, when sending the MAC CE, the Tx UE 110 further sends a MAC subheader corresponding to the MAC CE, to indicate a type and a length of the MAC CE. For a structure of the MAC subheader corresponding to the sidelink SCell activation/deactivation MAC CE on the PC5 interface, refer to the foregoing related descriptions of FIG. 4. It should be noted that a value of an LCID field thereof is different from that of the LCID field in the MAC subheader corresponding to the sidelink SCell activation/deactivation MAC CE on the Uu interface between the network device 120 and the Tx UE 110.

It should be noted that the Tx UE 110 may perform corresponding setting based on the first secondary carrier status indication information. The corresponding setting may include: setting a lower layer to consider activated states or deactivated states of the plurality of secondary carriers, for example but not limited to, performing monitoring setting on a secondary carrier that is indicated to be in an activated state in the first secondary carrier status indication information, and/or performing de-monitoring setting on a secondary carrier that is indicated to be in a deactivated state in the first secondary carrier status indication information. The one or more Rx UEs 130 that receive the second secondary carrier status indication information may also perform corresponding setting. The corresponding setting may include: setting a lower layer to consider activated states or deactivated states of corresponding secondary carriers, for example but not limited to, performing monitoring setting on a corresponding secondary carrier that is indicated to be in an activated state in the second secondary carrier status indication information, and/or performing de-monitoring setting on a corresponding secondary carrier that is indicated to be in a deactivated state in the second secondary carrier status indication information. For example, the lower layer may be a radio link control (radio link control, RLC) layer, a MAC layer, or a physical (Physical, PHY) layer. The lower layer is not specifically limited in this embodiment of this application. It should be noted that a procedure of configuring a plurality of carriers between the Tx UE 110 and the network device 120 is not limited to that shown in FIG. 3A and FIG. 3B. For example, the Tx UE 110 may alternatively send the multi-carrier configuration request information to the network device 120 in S301, and the network device 120 may send the first multi-carrier configuration information to the Tx UE 110 in S302.

It should be noted that a procedure of configuring a plurality of carriers between the Tx UE 110 and the network device 120 is not limited to that shown in FIG. 3A and FIG. 3B. For example, the Tx UE 110 may alternatively send the multi-carrier configuration request information to the network device 120 in S301, and the network device 120 may send the first multi-carrier configuration information to the Tx UE 110 in S302.

The following uses four embodiments to describe in detail numbering performed by the network device 120 and the Tx UE 110 on the secondary carriers, the first secondary carrier status indication information, and the second secondary carrier status indication information.

Embodiment 1

In this embodiment, the network device 120 performs local numbering on the plurality of secondary carriers indicated in the first multi-carrier configuration information. The local numbering means that the network device 120 separately performs numbering on the secondary carriers that correspond to all the Rx UEs 130 and that are indicated in the first multi-carrier configuration information, and the secondary carriers corresponding to all the Rx UEs 130 may have a same local number. In this case, the local numbers cannot uniquely determine the secondary carriers of all the Rx UEs 130. Because the first secondary carrier status indication information is related to the local numbers of the secondary carriers, the network device 120 needs to add the identifiers of the Rx UEs 130 to the first secondary carrier status indication information.

In this embodiment, similar to the network device 120, the Tx UE 110 separately performs local numbering on the at least one secondary carrier that corresponds to each Rx UE 130 and that is indicated in the first multi-carrier configuration information. In addition, the secondary carriers corresponding to all the Rx UEs 130 may have a same local number. In this case, the local numbers cannot uniquely determine the secondary carriers. Because the second secondary carrier status indication information is related to the local numbers of the secondary carriers, when the second secondary carrier status indication information indicates statuses of the secondary carriers corresponding to the plurality of Rx UEs 130, the identifiers of the Rx UEs 130 need to be added.

It should be noted that, in this embodiment, that the network device 120 performs local numbering on the plurality of secondary carriers indicated in the first multi-carrier configuration information is related to S308 in FIG. 3A and FIG. 3B, that the Tx UE 110 separately performs local numbering on the at least one secondary carrier that corresponds to each Rx UE 130 and that is indicated in the first multi-carrier configuration information is related to S309 in FIG. 3A and FIG. 3B, the first secondary carrier status indication information is related to S313 in FIG. 3A and FIG. 3B, and the second secondary carrier status indication information is related to S314 in FIG. 3A and FIG. 3B.

Local Numbering Performed by the Network Device 120 and the Tx UE 110 on the Secondary Carriers FIG. 5 shows an example of carrier allocation at the network device 120 and an example of performing local numbering by the network device 120 and the Tx UE 110 on the carriers. As shown in FIG. 5, it is assumed that the plurality of secondary carriers allocated to the Tx UE 110 at the network device 120 include $F_1$, $F_2$, $F_3$, $F_4$, $F_5$, $F_6$, $F_7$, and $F_8$. Specifically, $F_1$, $F_2$, $F_5$, and $F_8$ are used by the Tx UE 110 to perform sidelink communication with the Rx UE 130a; $F_3$, $F_6$, and $F_7$ are used by the Tx UE 110 to perform sidelink communication with the Rx UE 130b; and $F_1$, $F_4$, $F_6$, and $F_8$ are used by the Tx UE 110 to perform sidelink communication with the Rx UE 130n.

The network device 120 may perform local numbering on the plurality of secondary carriers, to indicate the activated states or the deactivated states of the plurality of secondary carriers in the first secondary carrier status indication information. In an example, the network device 120 may perform local numbering in an arrangement order of the identifiers of the plurality of secondary carriers in the first multi-carrier configuration information. For example, assuming that an arrangement order of the secondary carriers corresponding to the Rx UE 130a in the first multi-carrier configuration information is $F_1$, $F_2$, $F_5$, and $F_8$, as shown in FIG. 5, local numbers of the secondary carriers $F_1$, $F_2$, $F_5$, and $F_8$ at the network device 120 may be respectively "①", "②", "③", and "④"; assuming that an arrangement order of the secondary carriers corresponding to the Rx UE 130b in the first multi-carrier configuration information is $F_3$, $F_6$, and $F_7$, as shown in FIG. 5, local numbers of the secondary carriers $F_3$, $F_6$, and $F_7$ at the network device 120 may be respectively "①", "②", and "③"; and assuming that an arrangement order of the secondary carriers corresponding to the Rx UE 130n in the first multi-carrier configuration information is $F_1$, $F_4$, $F_6$, and $F_8$, as shown in FIG. 5, local numbers of the secondary carriers $F_1$, $F_4$, $F_6$, and $F_8$ at the network device 120 may be respectively "①", "②", "③", and "④".

In another example, the network device 120 may perform local numbering in a size arrangement order of the identifiers of the plurality of secondary carriers. For example, assuming that a size arrangement order of identifiers of the secondary carriers corresponding to the Rx UE 130a is $F_1$, $F_2$, $F_5$, and $F_8$, as shown in FIG. 5, local numbers of $F_1$, $F_2$, $F_5$, and $F_8$ at the network device 120 may be respectively "①", "②", "③", and "④"; assuming that a size arrangement order of identifiers of the secondary carriers corresponding to the Rx UE 130b is $F_3$, $F_6$, and $F_7$, as shown in FIG. 5, local numbers of $F_3$, $F_6$, and $F_7$ at the network device 120 may be respectively "①", "②", and "③"; and assuming that a size arrangement order of identifiers of the secondary carriers corresponding to the Rx UE 130n is $F_1$, $F_4$, $F_6$, and $F_8$, as shown in FIG. 5, local numbers of $F_1$, $F_4$, $F_6$, and $F_8$ at the network device 120 may be respectively "①", "②", "③", and "④".

It should be noted that carrier allocation at the network device 120 is not limited to that shown in FIG. 5, and the network device 120 may alternatively perform local numbering on the plurality of secondary carriers according to any other appropriate rule.

In addition, local numbering performed by the network device 120 on the plurality of secondary carriers may be used in S308 in FIG. 3A and FIG. 3B, and the network device 120 may indicate the local numbers of the plurality of secondary carriers in the first multi-carrier configuration information. However, when there is a default local numbering rule between the Tx UE 110 and the network device 120, the network device 120 may alternatively not indicate the local numbers of the plurality of secondary carriers in the first multi-carrier configuration information. For example, the local numbering rule may be performing local numbering in the arrangement order of the identifiers of the plurality of secondary carriers in the first multi-carrier configuration information or in the size arrangement order of the identifiers of the plurality of secondary carriers, for example, "①", "②", "③", and "④". The local numbering rule is not specifically limited in this embodiment of this application.

After receiving the first multi-carrier configuration information from the network device 120, the Tx UE 110 may also perform local numbering on the plurality of secondary carriers indicated in the first multi-carrier configuration information, to indicate activated states or deactivated states of the plurality of secondary carriers in the second secondary carrier status indication information. In an example, the Tx UE 110 may perform local numbering on the plurality of secondary carriers in an arrangement order of the identifiers of the plurality of secondary carriers in the second multi-carrier configuration information. For example, assuming that an arrangement order of the identifiers of the secondary carriers corresponding to the Rx UE 130a in the second multi-carrier configuration information sent by the Tx UE 110 to the Rx UE 130a is $F_1$, $F_2$, $F_5$, and $F_8$, as shown in FIG. 5, local numbers of $F_1$, $F_2$, $F_5$, and $F_8$ at the Tx UE 110 may be respectively "①", "②", "③", and "④"; assuming that an arrangement order of the identifiers of the secondary carriers corresponding to the Rx UE 130b in the second multi-carrier configuration information sent by the Tx UE 110 to the Rx UE 130b is $F_3$, $F_6$, and $F_7$, as shown in FIG. 5, local numbers of $F_3$, $F_6$, and $F_7$ at the Tx UE 110 may be respectively "①", "②", and "③"; and assuming that an arrangement order of the identifiers of the secondary carriers corresponding to the Rx UE 130n in the second multi-carrier configuration information sent by the Tx UE 110 to the Rx UE 130n is $F_1$, $F_4$, $F_6$, and $F_8$, as shown in FIG. 5, local numbers of $F_1$, $F_4$, $F_6$, and $F_8$ at the Tx UE 110 may be respectively "①", "②", "③", and "④". It should be noted that the arrangement order of the identifiers of the plurality of secondary carriers in the second multi-carrier configuration information may be the same as or different from that of the identifiers of the plurality of secondary carriers in the first multi-carrier configuration information.

In another example, the Tx UE 110 may perform local numbering on the plurality of secondary carriers in a size arrangement order of the identifiers of the plurality of secondary carriers. In this case, refer to the foregoing related descriptions of the network device 120. Details are not described herein again.

It should be noted that the Tx UE 110 may alternatively perform, according to any other appropriate rule, local numbering on the plurality of secondary carriers indicated in the first multi-carrier configuration information.

In addition, local numbering performed by the Tx UE 110 on the plurality of secondary carriers may be used in S309 in FIG. 3A and FIG. 3B, and the Tx UE 110 may indicate the local numbers of the plurality of secondary carriers in the second multi-carrier configuration information. However, when there is a default local numbering rule between the Tx UE 110 and the Rx UE 130, the Tx UE 110 may alternatively not indicate the local numbers of the plurality of secondary carriers in the second multi-carrier configuration information. For example, the local numbering rule may be performing local numbering in the arrangement order of the identifiers of the plurality of secondary carriers in the second multi-carrier configuration information or in the size arrangement order of the identifiers of the plurality of secondary carriers, for example, "①", "②", "③", and "④". The local numbering rule is not limited in this embodiment of this application.

First Secondary Carrier Status Indication Information

When the first secondary carrier status indication information indicates an activated state or a deactivated state of at least one secondary carrier corresponding to only one Rx UE 130, the first secondary carrier status indication information may include a secondary carrier status bitmap, and the secondary carrier status bitmap may include a first bitmap part and a second bitmap part. The first bitmap part may be used to indicate an identifier of the Rx UE 130, and the second bitmap part may be used to indicate the activated state or the deactivated state of each of the at least one secondary carrier corresponding to the Rx UE 130.

In an example, a type of the identifier of the Rx UE 130 used in the first bitmap part may be the same as or different from that of the identifier of the Rx UE 130 used in the first multi-carrier configuration information.

In an example, at least one bit in the second bitmap part is in a one-to-one correspondence with at least one secondary carrier, a value of each of the at least one bit may indicate an activated state or a deactivated state of each of the at least one secondary carrier, and the at least one secondary carrier corresponds to the Rx UE 130. For example, if a value of a bit in the at least one bit is 0, it indicates that a secondary carrier corresponding to the bit is in a deactivated state; or if a value of a bit in the at least one bit is 1, it indicates that a secondary carrier corresponding to the bit is in an activated state. For another example, if a value of a bit in the at least one bit is 1, it indicates that a secondary carrier corresponding to the bit is in a deactivated state; or if a value of a bit in the at least one bit is 0, it indicates that a secondary carrier corresponding to the bit is in an activated state.

In an example, a total quantity of bits in the second bitmap part may be related to one or more of the following: a maximum quantity of secondary carriers supported by the Rx UE 130, a maximum quantity of secondary carriers supported by the Tx UE 110, a quantity of secondary carriers corresponding to the Rx UE 130, a maximum quantity of secondary carriers that can be allocated by the network device 120 to the Tx UE 110, and a quantity of available carriers at the network device 120. By way of example, and not limitation, when the maximum quantity of secondary carriers supported by the Rx UE 130 is 8 and the maximum quantity of secondary carriers supported by the Tx UE 110 is 16, the total quantity of bits in the second bitmap part may be 8; when the maximum quantity of secondary carriers supported by the Rx UE 130 is 32 and the maximum quantity of secondary carriers supported by the Tx UE 110 is 16, the total quantity of bits in the second bitmap part may be 16; or when the maximum quantity of secondary carriers supported by each of the Rx UE 130 and the Tx UE 110 is 16 and the maximum quantity of secondary carriers that can be allocated by the network device 120 to the Tx UE 110 is 8, the total quantity of bits in the second bitmap part may be 8. In addition, the total quantity of bits in the second bitmap part may alternatively be a fixed quantity, and the fixed quantity is related to a maximum quantity of secondary carriers supported by all user equipments. By way of example, and not limitation, in all Tx UEs 110 and Rx UEs 130, if a maximum quantity of supported secondary carriers is 32, the total quantity of bits in the second bitmap part may be 32.

In an example, the correspondence between the at least one bit in the second bitmap part and the at least one secondary carrier is related to a local number of the at least one secondary carrier at the network device 120.

FIG. 6A to FIG. 8B each are a schematic diagram of a structure of the first secondary carrier status indication information when the first secondary carrier status indication information indicates an activated state or a deactivated state of at least one secondary carrier corresponding to only one Rx UE 130. For each byte (Oct) shown in FIG. 6A to FIG. 8B, it is assumed that bits from right to left are arranged from the least significant bit to the most significant bit. In addition, SCell$_j$ represents a secondary carrier whose local number is "ⓙ", where j is a positive integer.

In FIG. 6A, the first bitmap part in the first secondary carrier status indication information includes the four most significant bits in the first byte (Oct 1), to indicate an index of the Rx UE 130. Assuming that the total quantity of bits in the second bitmap part is 8, as shown in the figure, the second bitmap part may include the four least significant bits in the first byte (Oct 1) and the four most significant bits in the second byte (Oct 2). In addition, the $i^{th}$ bit from right to left in the four least significant bits in the first byte may correspond to a secondary carrier SCell$_i$ (1≤i≤4), and the $i^{th}$ bit from right to left in the four most significant bits in the second byte may correspond to a secondary carrier SCell$_i$ (5≤i≤8). It should be noted that a quantity of secondary carriers corresponding to the Rx UE 130 may alternatively be less than 8. In this case, the second bitmap part includes bits that do not correspond to any secondary carrier, and values of these bits may be N or values other than 0 and 1.

FIG. 6B is a schematic diagram of a structure of the first secondary carrier status indication information that indicates activated states or deactivated states of the secondary carriers corresponding to the Rx UE 130*a* in FIG. 5 according to FIG. 6A. As shown in the figure, the first bitmap part in the first secondary carrier status indication information may include an index of the Rx UE 130*a*. In 8 bits in the second bitmap part, the four least significant bits in the first byte (Oct 1) respectively correspond to the secondary carriers $F_1$, $F_2$, $F_5$, and $F_8$. Specifically, the least significant bit corresponds to the secondary carrier $F_1$ (SCell$_1$) whose local number is "①", and a value of the bit is 1, indicating that the secondary carrier $F_1$ is in an activated state; the second bit from right corresponds to the secondary carrier $F_2$ (SCell$_2$) whose local number is "②", and a value of the bit is 0, indicating that the secondary carrier $F_2$ is in a deactivated state; the third bit from right corresponds to the secondary carrier $F_5$ (SCell$_3$) whose local number is "③", and a value of the bit is 1, indicating that the secondary carrier $F_5$ is in an activated state; and the fourth bit from right corresponds to the secondary carrier $F_8$ (SCell$_4$) whose local number is "④", and a value of the bit is 0, indicating that the secondary carrier $F_8$ is in a deactivated state. The four most significant bits in the second byte in the second bitmap part do not correspond to any secondary carrier, and values of the bits may be N.

In FIG. 6C, the first bitmap part in the first secondary carrier status indication information is the same as that in FIG. 6A. Assuming that the total quantity of bits in the second bitmap part is 16, as shown in the figure, the second bitmap part may include the four least significant bits in the first byte (Oct 1), the second byte (Oct 2), and the four most significant bits in the third byte (Oct 3). In addition, a correspondence between the four least significant bits in the first byte and secondary carriers is the same as that in FIG. 6A, the $i^{th}$ bit from right to left in the second byte may correspond to a secondary carrier SCell$_{i+4}$ (1≤i≤8), and the $i^{th}$ bit from right to left in the four most significant bits in the third byte may correspond to a secondary carrier $SCell_{i+8}$ (5≤i≤8). It should be noted that a quantity of secondary carriers corresponding to the Rx UE 130 may alternatively be less than 16. In this case, the second bitmap part includes bits that do not correspond to any secondary carrier, and values of these bits may be N or values other than 0 and 1.

In FIG. 7A, the first bitmap part in the first secondary carrier status indication information includes the four least significant bits in the first byte (Oct 1), to indicate an index of the Rx UE 130. In addition, the four most significant bits in the first byte (Oct 1) are used as reserved bits R Assuming that the total quantity of bits in the second bitmap part is 8, as shown in the figure, the second bitmap part may include the second byte (Oct 2). In addition, the $i^{th}$ bit from right to left in the second byte (Oct 2) may correspond to a secondary carrier $SCell_i$ (1≤i≤8). It should be noted that a quantity of secondary carriers corresponding to the Rx UE 130 may alternatively be less than 8. In this case, the second bitmap part includes bits that do not correspond to any secondary carrier, and values of these bits may be N or values other than 0 and 1. Alternatively, in the first bitmap part, the four most significant bits in the first byte (Oct 1) may be used to indicate the index of the Rx UE 130, and the four least significant bits may be used as the reserved bits R.

In FIG. 7B, the first bitmap part in the first secondary carrier status indication information is the same as that in FIG. 7A. Assuming that the total quantity of bits in the second bitmap part is 16, as shown in the figure, the second bitmap part may include the second byte (Oct 2) and the third byte (Oct 3). In addition, a correspondence between a bit in the second byte and a secondary carrier is the same as that in FIG. 7A, and the $i^{th}$ bit from right to left in the third byte may correspond to a secondary carrier $SCell_{i+8}$ (1≤i≤8). It should be noted that a quantity of secondary carriers corresponding to the Rx UE 130 may alternatively be less than 16. In this case, the second bitmap part includes bits that do not correspond to any secondary carrier, and values of these bits may be N or values other than 0 and 1.

In FIG. 7C, the first bitmap part in the first secondary carrier status indication information is the same as that in FIG. 7A. Assuming that the total quantity of bits in the second bitmap part is 8, as shown in the figure, the second bitmap part may include the second byte (Oct 2). In addition, the least significant bit in the second byte (Oct 2) is used as a reserved bit R, and the $i^{th}$ bit from right to left may correspond to a secondary carrier $SCell_{i-1}$ (2≤i≤8). It should be noted that a quantity of secondary carriers corresponding to the Rx UE 130 may alternatively be less than 7. In this case, the second bitmap part includes bits that do not correspond to any secondary carrier, and values of these bits may be N or values other than 0 and 1. Alternatively, in the first bitmap part, the four most significant bits in the first byte (Oct 1) may be used to indicate the index of the Rx UE 130, and the four least significant bits may be used as the reserved bits R.

In FIG. 8A, the first bitmap part in the first secondary carrier status indication information includes the first byte (Oct 1), the second byte (Oct 2), and the third byte (Oct 3), to indicate a destination layer-2 identifier of the Rx UE 130. Assuming that the total quantity of bits in the second bitmap part is 8, as shown in the figure, the second bitmap part may include the fourth byte (Oct 4). In addition, a correspondence between a bit in the fourth byte and a secondary carrier is the same as that in FIG. 7A, and details are not described herein again. It should be noted that a quantity of secondary carriers corresponding to the Rx UE 130 may alternatively be less than 8. In this case, the second bitmap part includes bits that do not correspond to any secondary carrier, and values of these bits may be N or values other than 0 and 1.

In FIG. 8B, the first bitmap part in the first secondary carrier status indication information is the same as that in FIG. 8A. Assuming that the total quantity of bits in the second bitmap part is 16, as shown in the figure, the second bitmap part may include the fourth byte (Oct 4) and the fifth byte (Oct 5). In addition, a correspondence between a bit in the fourth byte and the fifth byte and a secondary carrier is the same as that in FIG. 7B, and details are not described herein again. It should be noted that a quantity of secondary carriers corresponding to the Rx UE 130 may alternatively be less than 16. In this case, the second bitmap part includes bits that do not correspond to any secondary carrier, and values of these bits may be N or values other than 0 and 1.

It should be noted that the total quantity of bits in the first bitmap part and the total quantity of bits in the second bitmap part in the first secondary carrier status indication information are not limited to those shown in FIG. 6A to FIG. 8B. In addition, the correspondence between a bit in the second bitmap part and a secondary carrier is not limited to that shown in FIG. 6A to FIG. 8B either, provided that local numbers of secondary carriers corresponding to all bits from right to left (or from left to right) in each byte in the second bitmap part are arranged in order of size.

It should be noted that, for each byte (Oct) shown in FIG. 6A to FIG. 8B, it may alternatively be assumed that bits from right to left are arranged from the most significant bit to the least significant bit. In this case, the foregoing embodiment is still applicable.

When the first secondary carrier status indication information indicates activated states or deactivated states of secondary carriers corresponding to a plurality of Rx UEs 130, the first secondary carrier status indication information may include a secondary carrier status bitmap, and the secondary carrier status bitmap may include a first bitmap part and a second bitmap part. The first bitmap part may be used to indicate an identifier of each of the plurality of Rx UEs 130, for example but not limited to, an index of each Rx UE 130 or a destination layer-2 identifier of each Rx UE 130. The index of each Rx UE 130 may include but is not limited to an index of each Rx UE 130 included in the foregoing destination list indication information, an index of each Rx UE 130 included in the foregoing multi-carrier configuration request information, an index of each Rx UE 130 having established a sidelink connection to the Tx UE 110, and the like. The second bitmap part may be used to indicate an activated state or a deactivated state of each of at least one secondary carrier corresponding to each of the plurality of Rx UEs 130.

In an example, a total quantity of bits in the first bitmap part is related to a maximum quantity of Rx UEs supported by the Tx UE 110 (that is, a maximum quantity of Rx UEs that simultaneously perform sidelink communication with the Tx UE 110), a plurality of bits in the first bitmap are in a one-to-one correspondence with the plurality of Rx UEs 130, and the specific correspondence between the plurality of bits and the plurality of Rx UEs 130 is related to the index of each of the plurality of Rx UEs 130. The index of each Rx UE 130 may include but is not limited to an index of each Rx UE 130 included in the foregoing destination list indication information, an index of each Rx UE 130 included in the foregoing multi-carrier configuration request information, an index of each Rx UE 130 having established a sidelink connection to the Tx UE 110, and the like.

In an example, the second bitmap part may include a plurality of bit rows corresponding to the plurality of Rx UEs 130. For example, quantities of bits included in all the bit rows may be the same or may be different. For example, the bit row may include but is not limited to a byte. The bit row is not specifically limited in this embodiment of this application. Each of the plurality of Rx UEs 130 corresponds to at least one bit row, the at least one bit row includes at least one bit that is in a one-to-one correspondence with at least one secondary carrier, a value of each bit indicates an activated state or a deactivated state of a secondary carrier corresponding to the bit, and the at least one secondary carrier corresponds to the Rx UE 130. For example, if a value of a bit in the at least one bit is 0, it indicates that a secondary carrier corresponding to the bit is in a deactivated state; or if a value of a bit in the at least one bit is 1, it indicates that a secondary carrier corresponding to the bit is in an activated state. For another example, if a value of a bit in the at least one bit is 1, it indicates that a secondary carrier corresponding to the bit is in a deactivated state; or if a value of a bit in the at least one bit is 0, it indicates that a secondary carrier corresponding to the bit is in an activated state.

In addition, a total quantity of bits included in the at least one bit row is related to one or more of the following: a maximum quantity of secondary carriers supported by the Rx UE 130 corresponding to the at least one bit row, a maximum quantity of secondary carriers supported by the Tx UE 110, a quantity of secondary carriers corresponding to the Rx UE 130, a maximum quantity of secondary carriers that can be allocated by the network device 120 to the Tx UE 110, and a quantity of available carriers at the network device 120. In addition, the total quantity of bits in the at least one bit row may alternatively be a fixed quantity, and the fixed quantity is related to a maximum quantity of secondary carriers supported by all user equipments (all Tx UEs 110 and Rx UEs 130).

In addition, the correspondence between the at least one bit in the at least one bit row and the at least one secondary carrier is related to a local number of the at least one secondary carrier at the network device 120.

FIG. 9A to FIG. 9C each are a schematic diagram of a structure of the first secondary carrier status indication information when the first secondary carrier status indication information indicates activated states or deactivated states of secondary carriers corresponding to a plurality of Rx UEs 130. Each byte (Oct) shown in FIG. 9A to FIG. 9C is equivalent to the foregoing one bit row. For each byte (Oct), it is assumed that bits from right to left are arranged from the least significant bit to the most significant bit. In addition, SCell$_j$ represents a secondary carrier whose local number is "$\text{\textcircled{j}}$" at the network device 120, and Rx UE$_k$ represents Rx UE 130 whose index is "k", where j and k are positive integers.

In FIG. 9A, assuming that the maximum quantity of Rx UEs supported by the Tx UE 110 is 16, the first bitmap part in the first secondary carrier status indication information may include the first byte (Oct 1) and the second byte (Oct 2). In addition, bits from right to left in the first byte sequentially correspond to Rx UE$_1$ to Rx UE$_8$, and bits from right to left in the second byte sequentially correspond to Rx UE$_9$ to Rx UE$_{16}$. In addition, for each bit in the first bitmap part, when a value of the bit is 1, it may indicate that the first secondary carrier status indication information indicates an activated state or a deactivated state of at least one secondary carrier of Rx UE 130 corresponding to the bit; or when a value of the bit is 0, it may indicate that the first secondary carrier status indication information does not indicate an activated state or a deactivated state of at least one secondary carrier of Rx UE 130 corresponding to the bit. In this case, the plurality of Rx UEs 130 are a set of Rx UEs 130 corresponding to bits whose values are 1 in the first bitmap part. Alternatively, when a value of the bit is 0, it may indicate that the first secondary carrier status indication information indicates an activated state or a deactivated state of at least one secondary carrier of Rx UE 130 corresponding to the bit; or when a value of the bit is 1, it may indicate that the first secondary carrier status indication information does not indicate an activated state or a deactivated state of at least one secondary carrier of Rx UE 130 corresponding to the bit. In this case, the plurality of Rx UEs 130 are a set of Rx UEs 130 corresponding to bits whose values are 0 in the first bitmap part.

In FIG. 9A, assuming that a total quantity of bits included in at least one bit row corresponding to each Rx UE 130 is 8, as shown in the figure, in the second bitmap part in the first secondary carrier status indication information, each Rx UE 130 corresponds to one bit row (that is, a byte). Specifically, the third byte (Oct 3) may correspond to Rx UE 130 with the smallest index value in the plurality of Rx UEs 130, namely, Rx UE 130 corresponding to a bit when the first right-to-left value from the first byte to the second byte in the first bitmap part is 1, that is, when a value "1" of a bit indicates that the first secondary carrier status indication information indicates an activated state or a deactivated state of at least one secondary carrier of Rx UE 130 corresponding to the bit, or when the value is 0, that is, when a value "0" of a bit indicates that the first secondary carrier status indication information indicates an activated state or a deactivated state of at least one secondary carrier of Rx UE 130 corresponding to the bit; and the fourth byte (Oct 4) may correspond to Rx UE 130 with the second smallest index value in the plurality of Rx UEs 130, namely, Rx UE 130 corresponding to a bit when the second right-to-left value from the first byte to the second byte in the first bitmap part is 1, that is, when a value "1" of a bit indicates that the first secondary carrier status indication information indicates an activated state or a deactivated state of at least one secondary carrier of Rx UE 130 corresponding to the bit, or when the value is 0, that is, when a value "0" of a bit indicates that the first secondary carrier status indication information indicates an activated state or a deactivated state of at least one secondary carrier of Rx UE 130 corresponding to the bit. By analogy, the tenth byte (Oct 10) may correspond to Rx UE 130 whose index value ranks eighth (in ascending order) in the plurality of Rx UEs 130, namely, Rx UE 130 corresponding to a bit when the eighth right-to-left value from the first byte to the second byte in the first bitmap part is 1, that is, when a value "1" of a bit indicates that the first secondary carrier status indication information indicates an activated state or a deactivated state of at least one secondary carrier of Rx UE 130 corresponding to the bit, or when the value is 0, that is, when a value "0" of a bit indicates that the first secondary carrier status indication information indicates an activated state or a deactivated state of at least one secondary carrier of Rx UE 130 corresponding to the bit.

In addition, in the second bitmap part, for the byte corresponding to each of the plurality of Rx UEs 130, the $i^{th}$ bit from right to left may correspond to a secondary carrier SCell$_i$ ($1 \leq i \leq 8$). It should be noted that a quantity of secondary carriers corresponding to each of the plurality of Rx UEs 130 may alternatively be less than 8. In this case, the byte corresponding to each Rx UE 130 includes bits that do not correspond to any secondary carrier, and values of these bits may be N or values other than 0 and 1.

FIG. 9B is a schematic diagram of a structure of the first secondary carrier status indication information that indicates activated states or deactivated states of the secondary carriers corresponding to the Rx UE 130a, the Rx UE 130b, and the Rx UE 130n in FIG. 5 according to FIG. 9A. It is assumed that an index of the Rx UE 130a is 1, an index of the Rx UE 130b is 4, and an index of the Rx UE 130n is 9. In this case, as shown in FIG. 9B, in the first bitmap part, values of the first bit and the fourth bit from right to left in the first byte (Oct 1) and the first bit from right to left in the second byte (Oct 2) are 1, and values of the other bits are 0; and the second bitmap part includes the third byte (Oct 3), the fourth byte (Oct 4), and the fifth byte (Oct 5). Bits in the third byte may respectively correspond to the secondary carriers $F_1$, $F_2$, $F_5$, and $F_8$ corresponding to the Rx UE 130a. Specifically, the least significant bit corresponds to the secondary carrier $F_1$ ($SCell_1$) whose local number is "①", and a value of the bit is 1, indicating that the secondary carrier $F_1$ is in an activated state; the second bit from right corresponds to the secondary carrier $F_2$ ($SCell_2$) whose local number is "②", and a value of the bit is 0, indicating that the secondary carrier $F_2$ is in a deactivated state; the third bit from right corresponds to the secondary carrier $F_5$ ($SCell_3$) whose local number is "③", and a value of the bit is 1, indicating that the secondary carrier $F_1$ is in an activated state; the fourth bit from right corresponds to the secondary carrier $F_8$ ($SCell_4$) whose local number is "④", and a value of the bit is 0, indicating that the secondary carrier $F_8$ is in a deactivated state; and the other bits do not correspond to any secondary carrier, and values of the bits may be N. Bits in the fourth byte may respectively correspond to the secondary carriers $F_3$, $F_6$, and $F_7$ corresponding to the Rx UE 130b. Specifically, the least significant bit corresponds to the secondary carrier $F_3$ ($SCell_1$) whose local number is "①", and a value of the bit is 1, indicating that the secondary carrier $F_3$ is in a deactivated state; the second bit from right corresponds to the secondary carrier $F_6$ ($SCell_2$) whose local number is "②", and a value of the bit is 1, indicating that the secondary carrier $F_6$ is in a deactivated state; the third bit from right corresponds to the secondary carrier $F_7$ ($SCell_3$) whose local number is "③", and a value of the bit is 1, indicating that the secondary carrier $F_7$ is in an activated state; and the other bits do not correspond to any secondary carrier, and values of the bits may be N. Bits in the fifth byte may respectively correspond to the secondary carriers $F_1$, $F_4$, $F_6$, and $F_8$ corresponding to the Rx UE 130n. Specifically, the least significant bit corresponds to the secondary carrier $F_1$ ($SCell_1$) whose local number is "①", and a value of the bit is 1, indicating that the secondary carrier $F_1$ is in an activated state; the second bit from right corresponds to the secondary carrier $F_4$ ($SCell_2$) whose local number is "②", and a value of the bit is 1, indicating that the secondary carrier $F_4$ is in an activated state; the third bit from right corresponds to the secondary carrier $F_6$ ($SCell_3$) whose local number is "③", and a value of the bit is 0, indicating that the secondary carrier $F_6$ is in a deactivated state; the fourth bit from right corresponds to the secondary carrier $F_8$ ($SCell_4$) whose local number is "④", and a value of the bit is 0, indicating that the secondary carrier $F_8$ is in a deactivated state; and the other bits do not correspond to any secondary carrier, and values of the bits may be N.

In FIG. 9C, the first bitmap part in the first secondary carrier status indication information is the same as that in FIG. 9A. Assuming that a total quantity of bits included in at least one bit row corresponding to each Rx UE 130 is 16, as shown in the figure, in the second bitmap part, each Rx UE 130 corresponds to two bit rows (that is, bytes). Specifically, the third byte (Oct 3) and the fourth byte (Oct 4) may correspond to Rx UE 130 with the smallest index value in the plurality of Rx UEs 130, namely, Rx UE 130 corresponding to a bit when the first right-to-left value from the first byte to the second byte in the first bitmap part is 1, that is, when a value "1" of a bit indicates that the first secondary carrier status indication information indicates an activated state or a deactivated state of at least one secondary carrier of Rx UE 130 corresponding to the bit, or when the value is 0, that is, when a value "0" of a bit indicates that the first secondary carrier status indication information indicates an activated state or a deactivated state of at least one secondary carrier of Rx UE 130 corresponding to the bit; and the fifth byte (Oct 5) and the sixth byte (Oct 6) may correspond to Rx UE 130 with the second smallest index value in the plurality of Rx UEs 130, namely, Rx UE 130 corresponding to a bit when the second right-to-left value from the first byte to the second byte in the first bitmap part is 1, that is, when a value "1" of a bit indicates that the first secondary carrier status indication information indicates an activated state or a deactivated state of at least one secondary carrier of Rx UE 130 corresponding to the bit, or when the value is 0, that is, when a value "0" of a bit indicates that the first secondary carrier status indication information indicates an activated state or a deactivated state of at least one secondary carrier of Rx UE 130 corresponding to the bit. By analogy, the ninth byte (Oct 9) and the tenth byte (Oct 10) may correspond to Rx UE 130 whose index value ranks fourth in ascending order in the plurality of Rx UEs 130, namely, Rx UE 130 corresponding to a bit when the fourth right-to-left value from the first byte to the second byte in the first bitmap part is 1, that is, when a value "1" of a bit indicates that the first secondary carrier status indication information indicates an activated state or a deactivated state of at least one secondary carrier of Rx UE 130 corresponding to the bit, or when the value is 0, that is, when a value "0" of a bit indicates that the first secondary carrier status indication information indicates an activated state or a deactivated state of at least one secondary carrier of Rx UE 130 corresponding to the bit.

In addition, in the second bitmap part, for the two bytes corresponding to each of the plurality of Rx UEs 130, a correspondence between a bit in one byte and a secondary carrier is the same as that in FIG. 9A, and the $i^{th}$ bit from right to left in the other byte may correspond to a secondary carrier $SCell_{1+8}$ ($1 \leq i \leq 8$). It should be noted that a quantity of secondary carriers corresponding to each Rx UE 130 may alternatively be less than 16. In this case, the two bytes corresponding to each Rx UE 130 include bits that do not correspond to any secondary carrier, and values of these bits may be N or values other than 0 and 1.

In FIG. 9D, the first bitmap part in the first secondary carrier status indication information is the same as that in FIG. 9A, and a specific correspondence between each Rx UE 130 and a bit row (that is, a byte) in the second bitmap part is also the same as that in FIG. 9A. For the byte corresponding to each Rx UE 130, the least significant bit is used as a reserved bit R, and the $i^{th}$ bit from right to left may correspond to a secondary carrier $SCell_{i-1}$ ($2 \leq i \leq 8$). It should be noted that a quantity of secondary carriers corresponding to each Rx UE 130 may alternatively be less than 7. In this case, the byte corresponding to each Rx UE 130 includes bits that do not correspond to any secondary carrier, and values of these bits may be N or values other than 0 and 1.

It should be noted that the total quantity of bits in the first bitmap part and the total quantity of bits in the at least one bit row corresponding to each Rx UE 130 in the second bitmap part are not limited to those shown in FIG. 9A to FIG. 9D. In addition, the correspondence between a bit in the at least one bit row corresponding to each Rx UE 130 in the second bitmap part and a secondary carrier is not limited to that shown in FIG. 9A to FIG. 9D either, provided that local numbers of secondary carriers corresponding to all bits from right to left (or from left to right) in each bit row (or each byte) are arranged in order of size.

It should be noted that, for each byte (Oct) shown in FIG. 9A to FIG. 9D, it may alternatively be assumed that bits from right to left are arranged from the most significant bit to the least significant bit. In this case, the foregoing embodiment is still applicable.

In another example, the first bitmap part may include indexes or layer-2 identifiers of the plurality of Rx UEs 130. For example, the index of each of the plurality of Rx UEs 130 is an index of each Rx UE 130 included in the foregoing destination list indication information, an index of each Rx UE 130 included in the foregoing multi-carrier configuration request information, or an index of each Rx UE 130 having established a sidelink connection to the Tx UE 110. The index of each of the plurality of Rx UEs 130 is not specifically limited in this embodiment of this application. The second bitmap part may include a plurality of subparts that are in a one-to-one correspondence with the plurality of Rx UEs 130, each subpart includes at least one bit, the at least one bit is in a one-to-one correspondence with at least one secondary carrier, a value of each of the at least one bit may indicate an activated state or a deactivated state of each of the at least one secondary carrier, and the at least one secondary carrier corresponds to the Rx UE 130 corresponding to the subpart. For example, if a value of a bit in the at least one bit is 0, it indicates that a secondary carrier corresponding to the bit is in a deactivated state; or if a value of a bit in the at least one bit is 1, it indicates that a secondary carrier corresponding to the bit is in an activated state. For another example, if a value of a bit in the at least one bit is 1, it indicates that a secondary carrier corresponding to the bit is in a deactivated state; or if a value of a bit in the at least one bit is 0, it indicates that a secondary carrier corresponding to the bit is in an activated state.

In addition, in the second bitmap part, for each of the plurality of Rx UEs 130, the correspondence between the at least one bit and the at least one secondary carrier is related to a local number of the at least one secondary carrier at the network device 120.

In addition, a total quantity of bits included in each subpart in the second bitmap part may be related to one or more of the following: a maximum quantity of secondary carriers supported by the Rx UE 130 corresponding to the subpart, a maximum quantity of secondary carriers supported by the Tx UE 110, a quantity of secondary carriers corresponding to the Rx UE 110, a maximum quantity of secondary carriers that can be allocated by the network device 120 to the Tx UE 110, and a quantity of available carriers at the network device 120. In addition, the total quantity of bits included in the at least one bit row may alternatively be a fixed quantity, and the fixed quantity is related to a maximum quantity of secondary carriers supported by all user equipments (all Tx UEs 110 and Rx UEs 130).

FIG. 10A to FIG. 12B each are a schematic diagram of a structure of the first secondary carrier status indication information when the first secondary carrier status indication information indicates activated states or deactivated states of secondary carriers corresponding to a plurality of Rx UEs 130. It is assumed that bits from right to left are arranged from the least significant bit to the most significant bit. In addition, SCell$_j$ represents a secondary carrier whose local number is "$\bigcirc\!\!\!j$" at the network device 120.

In FIG. 10A, assuming that a total quantity of bits included in a subpart corresponding to each Rx UE 130 is 8, the four most significant bits in the first byte (Oct 1) may be used to indicate an index of the first Rx UE 130 (Rx UE$_1$) in the plurality of Rx UEs 130, the four least significant bits in the first byte (Oct 1) and the four most significant bits in the second byte (Oct 2) are a subpart corresponding to the Rx UE$_1$ in the second bitmap part, the $i^{th}$ bit from right to left in the four least significant bits in the first byte (Oct 1) may correspond to a secondary carrier SCell$_i$ ($1 \le i \le 4$), and the $i^{th}$ bit from right to left in the four most significant bits in the second byte (Oct 2) may correspond to a secondary carrier SCell$_i$ ($5 \le i \le 8$); the four least significant bits in the second byte (Oct 2) may be used to indicate an index of the second Rx UE 130 (Rx UE$_2$) in the plurality of Rx UEs 130, the third byte (Oct 3) is a subpart corresponding to the Rx UE$_2$ in the second bitmap part, and the $i^{th}$ bit from right to left in the third byte (Oct 3) may correspond to a secondary carrier SCell$_i$ ($1 \le i \le 8$); the four most significant bits in the fourth byte (Oct 4) may be used to indicate an index of the third Rx UE 130 (Rx UE$_3$) in the plurality of Rx UEs 130, the four least significant bits in the fourth byte (Oct 4) and the four most significant bits in the fifth byte (Oct 5) may be a subpart corresponding to the Rx UE$_3$ in the second bitmap part, the $i^{th}$ bit from right to left in the four least significant bits in the fourth byte (Oct 4) may correspond to a secondary carrier SCell$_i$ ($1 \le i \le 4$), and the $i^{th}$ bit from right to left in the four most significant bits in the fifth byte (Oct 5) may correspond to a secondary carrier SCell$_i$ ($5 \le i \le 8$); and so on, until the last Rx UE 130 in the plurality of Rx UEs 130. It should be noted that a quantity of secondary carriers corresponding to each of the plurality of Rx UEs 130 may alternatively be less than 8. In this case, the byte corresponding to each Rx UE 130 includes bits that do not correspond to any secondary carrier, and values of these bits may be N or values other than 0 and 1.

In addition, in FIG. 10A, the first bitmap part may include the four most significant bits in the first byte (Oct 1), the four least significant bits in the second byte (Oct 2), the four most significant bits in the fourth byte (Oct 4), and the like.

In FIG. 10B, assuming that a total quantity of bits included in a subpart corresponding to each Rx UE 130 is 16, the four most significant bits in the first byte (Oct 1) may be used to indicate an index of the first Rx UE 130 (Rx UE$_1$) in the plurality of Rx UEs 130, the four least significant bits in the first byte (Oct 1), the second byte (Oct 2), and the four most significant bits in the third byte (Oct 3) may be a subpart corresponding to the Rx UE$_1$ in the second bitmap part, the $i^{th}$ bit from right to left in the four least significant bits in the first byte (Oct 1) may correspond to a secondary carrier SCell$_i$ ($1 \le i \le 4$), the $i^{th}$ bit from right to left in the second byte (Oct 2) may correspond to a secondary carrier SCell$_{i+4}$ ($1 \le i \le 8$), and the $i^{th}$ bit from right to left in the four most significant bits in the third byte (Oct 3) may correspond to a secondary carrier SCell$_{i+8}$ ($5 \le i \le 8$); the four least significant bits in the third byte (Oct 3) may be used to indicate an index of the second Rx UE 130 (Rx UE$_2$) in the plurality of Rx UEs 130, the fourth byte (Oct 4) and the fifth byte (Oct 5) are a subpart corresponding to the Rx UE$_2$ in the second bitmap part, the $i^{th}$ bit from right to left in the fourth byte (Oct 4) may correspond to a secondary carrier SCell$_i$ ($1 \le i \le 8$), and the $i^{th}$ bit from right to left in the fifth byte (Oct 5) may correspond to a secondary carrier $SCell_{i+8}$ ($1 \leq i \leq 8$); and so on, until the last Rx UE 130 in the plurality of Rx UEs 130. It should be noted that a quantity of secondary carriers corresponding to each of the plurality of Rx UEs 130 may alternatively be less than 16. In this case, the byte corresponding to each Rx UE 130 includes bits that do not correspond to any secondary carrier, and values of these bits may be N or values other than 0 and 1.

In addition, in FIG. 10B, the first bitmap part may include the four most significant bits in the first byte (Oct 1), the four least significant bits in the third byte (Oct 3), and the like.

In FIG. 11A, assuming that a total quantity of bits included in a subpart corresponding to each Rx UE 130 is 8, the four least significant bits in the first byte (Oct 1) may be used to indicate an index of the first Rx UE 130 (Rx $UE_1$) in the plurality of Rx UEs 130, the four most significant bits in the first byte (Oct 1) may be used as reserved bits R, the second byte (Oct 2) may be a subpart corresponding to the Rx $UE_1$ in the second bitmap part, and the $i^{th}$ bit from right to left in the second byte (Oct 2) may correspond to a secondary carrier $SCell_i$ ($1 \leq i \leq 8$); the four least significant bits in the third byte (Oct 3) may be used to indicate an index of the second Rx UE 130 (Rx $UE_2$) in the plurality of Rx UEs 130, the four most significant bits in the third byte (Oct 3) may be used as reserved bits R, the fourth byte (Oct 4) is a subpart corresponding to the Rx $UE_2$ in the second bitmap part, a correspondence between each bit in the fourth byte and a secondary carrier is similar to a correspondence with the Rx $UE_1$, and details are not described herein again; the four least significant bits in the fifth byte (Oct 5) may be used to indicate an index of the third Rx UE 130 (Rx $UE_2$) in the plurality of Rx UEs 130, the four most significant bits in the fifth byte (Oct 5) may be used as reserved bits R, the sixth byte (Oct 6) is a subpart corresponding to the Rx $UE_3$ in the second bitmap part, a correspondence between each bit in the sixth byte and a secondary carrier is similar to a correspondence with the Rx $UE_1$, and details are not described herein again; and so on, until the last Rx UE 130 in the plurality of Rx UEs 130. It should be noted that a quantity of secondary carriers corresponding to each of the plurality of Rx UEs 130 may alternatively be less than 8. In this case, the byte corresponding to each Rx UE 130 includes bits that do not correspond to any secondary carrier, and values of these bits may be N or values other than 0 and 1. Alternatively, the foregoing bits used to indicate the index of the Rx UE 130 may be used as the reserved bits R, and the foregoing reserved bits R may be used to indicate the index of the Rx UE 130.

In addition, in FIG. 11A, the first bitmap part may include the four least significant bits in the first byte (Oct 1), the four least significant bits in the third byte (Oct 3), the four least significant bits in the fifth byte (Oct 5), and the like.

In FIG. 11B, assuming that a total quantity of bits included in a subpart corresponding to each Rx UE 130 is 16, the four least significant bits in the first byte (Oct 1) may be used to indicate an index of the first Rx UE 130 (Rx $UE_1$) in the plurality of Rx UEs 130, the four most significant bits in the first byte (Oct 1) may be used as reserved bits R, the second byte (Oct 2) and the third byte (Oct 3) are a subpart corresponding to the Rx $UE_1$ in the second bitmap part, the it bit from right to left in the second byte (Oct 2) may correspond to a secondary carrier $SCell_i$ ($1 \leq i \leq 8$), and the $i^{th}$ bit from right to left in the third byte (Oct 3) may correspond to a secondary carrier $SCell_{i+8}$ ($1 \leq i \leq 8$); the four least significant bits in the fourth byte (Oct 4) may be used to indicate an index of the second Rx UE 130 (Rx $UE_2$) in the plurality of Rx UEs 130, the four most significant bits in the fourth byte (Oct 4) may be used as reserved bits R, the fifth byte (Oct 5) and the sixth byte (Oct 6) are a subpart corresponding to the Rx $UE_2$ in the second bitmap part, a correspondence between each bit in the fifth byte and the sixth byte and a secondary carrier is similar to a correspondence with the Rx $UE_1$, and details are not described herein again; the four least significant bits in the seventh byte (Oct 7) may be used to indicate an index of the third Rx UE 130 (Rx $UE_3$) in the plurality of Rx UEs 130, the four most significant bits in the seventh byte (Oct 7) may be used as reserved bits R, the eighth byte (Oct 8) and the ninth byte (Oct 9) are a subpart corresponding to the Rx $UE_3$ in the second bitmap part, a correspondence between each bit in the eighth byte and the ninth byte and a secondary carrier is similar to a correspondence with the Rx $UE_1$, and details are not described herein again; and so on, until the last Rx UE 130 in the plurality of Rx UEs 130. It should be noted that a quantity of secondary carriers corresponding to each of the plurality of Rx UEs 130 may alternatively be less than 16. In this case, the byte corresponding to each Rx UE 130 includes bits that do not correspond to any secondary carrier, and values of these bits may be N or values other than 0 and 1. Alternatively, the foregoing bits used to indicate the index of the Rx UE 130 may be used as the reserved bits R, and the foregoing reserved bits R may be used to indicate the index of the Rx UE 130.

In addition, in FIG. 11B, the first bitmap part may include the four least significant bits in the first byte (Oct 1), the four least significant bits in the fourth byte (Oct 4), the four least significant bits in the seventh byte (Oct 7), and the like.

In FIG. 12A, assuming that a total quantity of bits included in a subpart corresponding to each Rx UE 130 is 8, the first byte (Oct 1) to the third byte (Oct 3) may be used to indicate a destination layer-2 identifier of the first Rx UE 130 (Rx $UE_1$) in the plurality of Rx UEs 130, the fourth byte (Oct 4) is a subpart corresponding to the Rx $UE_1$ in the second bitmap part, and the $i^{th}$ bit from right to left in the fourth byte (Oct 4) may correspond to a secondary carrier $SCell_i$ ($1 \leq i \leq 8$); the fifth byte (Oct 5) to the seventh byte (Oct 7) may be used to indicate a destination layer-2 identifier of the second Rx UE 130 (Rx $UE_2$) in the plurality of Rx UEs 130, the eighth byte (Oct 8) is a subpart corresponding to the Rx $UE_2$ in the second bitmap part, a correspondence between each bit in the eight byte and a secondary carrier is similar to a correspondence with the Rx $UE_1$, and details are not described herein again; and so on, until the last Rx UE 130 in the plurality of Rx UEs 130. It should be noted that a quantity of secondary carriers corresponding to each of the plurality of Rx UEs 130 may alternatively be less than 8. In this case, the byte corresponding to each Rx UE 130 includes bits that do not correspond to any secondary carrier, and values of these bits may be N or values other than 0 and 1.

In addition, in FIG. 12A, the first bitmap part may include the first byte (Oct 1) to the third byte (Oct 3), the fifth byte (Oct 5) to the seventh byte (Oct 7), and the like.

In FIG. 12B, assuming that a total quantity of bits included in a subpart corresponding to each Rx UE 130 is 16, the first byte (Oct 1) to the third byte (Oct 3) may be used to indicate a destination layer-2 identifier of the first Rx UE 130 (Rx $UE_1$) in the plurality of Rx UEs 130, the fourth byte (Oct 4) and the fifth byte (Oct 5) are a subpart corresponding to the Rx $UE_1$ in the second bitmap part, the $i^{th}$ bit from right to left in the fourth byte (Oct 4) may correspond to a secondary carrier $SCell_i$ ($1 \leq i \leq 8$), and the $i^{th}$ bit from right to left in the fifth byte (Oct 5) may correspond to a secondary carrier $SCell_{i+8}$ ($1 \leq i \leq 8$); the sixth byte (Oct 6) to the eighth byte (Oct 8) may be used to indicate a destination layer-2 identifier of the second Rx UE 130 (Rx UE$_2$) in the plurality of Rx UEs 130, the ninth byte (Oct 9) and the tenth byte (Oct 10) are a subpart corresponding to the Rx UE$_2$ in the second bitmap part, a correspondence between each bit in the ninth byte and the tenth byte and a secondary carrier is similar to a correspondence with the Rx UE$_1$, and details are not described herein again; and so on, until the last Rx UE 130 in the plurality of Rx UEs 130. It should be noted that a quantity of secondary carriers corresponding to each of the plurality of Rx UEs 130 may alternatively be less than 16. In this case, the byte corresponding to each Rx UE 130 includes bits that do not correspond to any secondary carrier, and values of these bits may be N or values other than 0 and 1.

In addition, in FIG. 12B, the first bitmap part may include the first byte (Oct 1) to the third byte (Oct 3), the sixth byte (Oct 6) to the eighth byte (Oct 8), and the like.

It should be noted that, in the first bitmap part in the first secondary carrier status indication information, the identifier of each of the plurality of Rx UEs 130 may occupy any quantity of bits, and the quantity is not limited to that shown in FIG. 10A to FIG. 12B; and in the second bitmap part, the total quantity of bits in each subpart corresponding to each of the plurality of Rx UEs 130 is not limited to that shown in FIG. 10A to FIG. 12B either. In addition, the correspondence between each bit in each subpart and a secondary carrier is not limited to that shown in FIG. 10A to FIG. 12B either, provided that local numbers of secondary carriers corresponding to all bits from right to left (or from left to right) are arranged in order of size.

It should be noted that, for each byte (Oct) shown in FIG. 10A to FIG. 12B, it may alternatively be assumed that bits from right to left are arranged from the most significant bit to the least significant bit. In this case, the foregoing embodiment is still applicable.

It should be noted that the second bitmap part in Embodiment 1 may be further used to indicate an activated state or a deactivated state of a primary carrier. In this case, the primary carrier may be considered as a secondary carrier with a special local number.

It should be noted that the first secondary carrier status indication information having the foregoing structure in this embodiment may be used in S313 in FIG. 3A and FIG. 3B.

Second Secondary Carrier Status Indication Information

When the Tx UE 110 separately sends the second secondary carrier status indication information to one or more Rx UEs 130 in a unicast manner, although local numbers cannot uniquely determine secondary carriers, the Rx UE 130 can determine, in another manner, that the second secondary carrier status indication information is sent to the Rx UE 130. In this case, the second secondary carrier status indication information may not include an identifier of the Rx UE 130. For example, the another determining manner may be performing determining by using an identifier of target Rx UE included in a MAC PDU subheader. The determining manner is not specifically limited in this embodiment of this application. It should be noted that the one or more Rx UEs 130 include Rx UEs 130 whose corresponding secondary carriers are indicated to be in activated states or deactivated states in the first secondary carrier status indication information. In addition, by using the first secondary carrier status indication information, the network device 120 may indicate activated states or deactivated states of secondary carriers corresponding to the one or more Rx UEs 130 at a time, or in several times, to be specific, indicate an activated state or a deactivated state of a secondary carrier corresponding to at least one Rx UE each time. When the activated states or the deactivated states are indicated in several times, the Tx UE 110 may receive the first secondary carrier status indication information related to different Rx UEs 130 at different moments.

In an example, for each of the one or more Rx UEs 130, the second secondary carrier status indication information may include a third bitmap part, at least one bit in the third bitmap part is in a one-to-one correspondence with at least one secondary carrier corresponding to the Rx UE 130, and a value of each of the at least one bit may indicate an activated state or a deactivated state of each of the at least one secondary carrier. For example, if a value of a bit in the at least one bit is 0, it indicates that a secondary carrier corresponding to the bit is in a deactivated state; or if a value of a bit in the at least one bit is 1, it indicates that a secondary carrier corresponding to the bit is in an activated state. For another example, if a value of a bit in the at least one bit is 1, it indicates that a secondary carrier corresponding to the bit is in a deactivated state; or if a value of a bit in the at least one bit is 0, it indicates that a secondary carrier corresponding to the bit is in an activated state.

In an example, a total quantity of bits in the third bitmap part may be related to one or more of the following: a maximum quantity of secondary carriers supported by the Rx UE 130 corresponding to the subpart, a maximum quantity of secondary carriers supported by the Tx UE 110, a quantity of secondary carriers corresponding to the Rx UE 110, a maximum quantity of secondary carriers that can be allocated by the network device 120 to the Tx UE 110, and a quantity of available carriers at the network device 120. In addition, the total quantity of bits in the third bitmap part may alternatively be a fixed quantity, and the fixed quantity is related to a maximum quantity of secondary carriers supported by all user equipments (all Tx UEs 110 and Rx UEs 130).

In an example, the correspondence between the at least one bit in the third bitmap part and the at least one secondary carrier is related to a local number of the at least one secondary carrier at the Tx UE 110.

In an example, when the first secondary carrier status indication information indicates an activated state or a deactivated state of at least one secondary carrier corresponding to only one Rx UE 130, if a local number of the at least one secondary carrier corresponding to the Rx UE 130 at the Tx UE 110 is the same as that of the at least one secondary carrier at the network device 120, the third bitmap part is the same as the second bitmap part; or when the first secondary carrier status indication information indicates activated states or deactivated states of secondary carriers corresponding to a plurality of Rx UEs 130, if local numbers of the secondary carriers corresponding to the plurality of Rx UEs 130 at the Tx UE 110 are the same as those of the secondary carriers at the network device 120, the third bitmap part may include a bitmap part related to each Rx UE 130 in the second bitmap part.

FIG. 13A to FIG. 13C each are a schematic diagram of a structure of the second secondary carrier status indication information sent in a unicast manner. For each byte (Oct) shown in FIG. 13A to FIG. 13C, it is assumed that bits from right to left are arranged from the least significant bit to the most significant bit. In addition, SCell$_j$ represents a secondary carrier whose local number is "$\textcircled{j}$".

In FIG. 13A, for each of the one or more Rx UEs 130, assuming that the total quantity of bits in the third bitmap part is 8, as shown in the figure, the third bitmap part may include the first byte (Oct 1). In addition, the it bit from right to left in the first byte may correspond to a secondary carrier $SCell_i$ (1≤i≤8). It should be noted that a quantity of secondary carriers corresponding to the Rx UE 130 may alternatively be less than 8. In this case, the third bitmap part includes bits that do not correspond to any secondary carrier, and values of these bits may be N or values other than 0 and 1.

In FIG. 13B, for each of the one or more Rx UEs 130, assuming that the total quantity of bits in the third bitmap part is 16, as shown in the figure, the third bitmap part may include the first byte (Oct 1) and the second byte (Oct 2). In addition, the $i^{th}$ bit from right to left in the first byte may correspond to a secondary carrier $SCell_i$ (1≤i≤8), and the $i^{th}$ bit from right to left in the second byte may correspond to a secondary carrier $SCell_{i+8}$ (1≤i≤8). It should be noted that a quantity of secondary carriers corresponding to the Rx UE 130 may alternatively be less than 16. In this case, the third bitmap part includes bits that do not correspond to any secondary carrier, and values of these bits may be N or values other than 0 and 1.

In FIG. 13C, for each of the one or more Rx UEs 130, assuming that the total quantity of bits in the third bitmap part is 8, as shown in the figure, the third bitmap part may include the first byte (Oct 1). In addition, the least significant bit in the first byte may be used as a reserved bit R, and the $i^{th}$ bit from right to left may correspond to a secondary carrier $SCell_{i-1}$ (2≤i≤8). It should be noted that a quantity of secondary carriers corresponding to the Rx UE 130 may alternatively be less than 7. In this case, the third bitmap part includes bits that do not correspond to any secondary carrier, and values of these bits may be N or values other than 0 and 1.

It should be noted that the total quantity of bits in the third bitmap part is not limited to that shown in FIG. 13A to FIG. 13C. In addition, the correspondence between a bit in the third bitmap part and a secondary carrier is not limited to that shown in FIG. 13A to FIG. 13C either, provided that local numbers of secondary carriers corresponding to all bits from right to left (or from left to right) in each byte in the third bitmap part are arranged in order of size.

When the second secondary carrier status indication information indicates statuses of secondary carriers corresponding to a plurality of Rx UEs 130, because local numbers cannot uniquely determine the secondary carriers, the second secondary carrier status indication information needs to carry identifiers of the Rx UEs 130. It should be noted that the plurality of Rx UEs 130 include Rx UEs 130 whose corresponding secondary carriers are indicated to be in activated states or deactivated states in the first secondary carrier status indication information. In addition, by using the first secondary carrier status indication information, the network device 120 may indicate activated states or deactivated states of secondary carriers corresponding to the plurality of Rx UEs 130 at a time, or in several times, to be specific, indicate an activated state or a deactivated state of at least one secondary carrier each time. When the activated states or the deactivated states are indicated in several times, the Tx UE 110 may receive the first secondary carrier status indication information related to different Rx UEs 130 at different moments.

In an example, the second secondary carrier status indication information may include a secondary carrier status bitmap, and the secondary carrier status bitmap may include a third bitmap part and a fourth bitmap part. The fourth bitmap part may be used to indicate an identifier of each of the plurality of Rx UEs 130, for example but not limited to, an index of each Rx UE 130 or a destination layer-2 identifier of each Rx UE 130. The index of each Rx UE 130 may include but is not limited to an index of each Rx UE 130 included in the foregoing destination list indication information, an index of each Rx UE 130 included in the foregoing multi-carrier configuration request information, an index of each Rx UE 130 having established a sidelink connection to the Tx UE 110, and the like. The third bitmap part may be used to indicate an activated state or a deactivated state of each of at least one secondary carrier corresponding to each of the plurality of Rx UEs 130.

In an example, a total quantity of bits in the fourth bitmap part is related to a maximum quantity of Rx UEs supported by the Tx UE 110 (that is, a maximum quantity of Rx UEs that simultaneously perform sidelink communication with the Tx UE 110), a plurality of bits in the third bitmap are in a one-to-one correspondence with the plurality of Rx UEs 130, and the specific correspondence between the plurality of bits and the plurality of Rx UEs 130 is related to the index of each Rx UE 130.

In an example, the third bitmap part may include a plurality of bit rows corresponding to the plurality of Rx UEs 130. For example, quantities of bits included in all the bit rows may be the same or may be different. For example, the bit row may include but is not limited to a byte. The bit row is not specifically limited in this embodiment of this application. Each of the plurality of Rx UEs 130 corresponds to at least one bit row, the at least one bit row includes at least one bit that is in a one-to-one correspondence with at least one secondary carrier, a value of each bit indicates an activated state or a deactivated state of a secondary carrier corresponding to the bit, and the at least one secondary carrier corresponds to the Rx UE 130. For example, if a value of a bit in the at least one bit is 0, it indicates that a secondary carrier corresponding to the bit is in a deactivated state; or if a value of a bit in the at least one bit is 1, it indicates that a secondary carrier corresponding to the bit is in an activated state. For another example, if a value of a bit in the at least one bit is 1, it indicates that a secondary carrier corresponding to the bit is in a deactivated state; or if a value of a bit in the at least one bit is 0, it indicates that a secondary carrier corresponding to the bit is in an activated state.

In addition, a total quantity of bits included in the at least one bit row is related to one or more of the following: a maximum quantity of secondary carriers supported by the Tx UE 110, a maximum quantity of secondary carriers that can be allocated by the network device 120 to the Tx UE 110, and a quantity of available carriers at the network device 120. In addition, the total quantity of bits included in the at least one bit row may alternatively be a fixed quantity, and the fixed quantity is related to a maximum quantity of secondary carriers supported by all user equipments (all Tx UEs 110 and Rx UEs 130).

In addition, the correspondence between the at least one bit in the at least one bit row and the at least one secondary carrier is related to a local number of the at least one secondary carrier at the Tx UE 110.

In an example, when the first secondary carrier status indication information indicates activated states or deactivated states of secondary carriers corresponding to a plurality of Rx UEs 130, the fourth bitmap part may be the same as the first bitmap part. In addition, if local numbers of the secondary carriers corresponding to the plurality of Rx UEs 130 at the Tx UE 110 are the same as those of the secondary carriers at the network device 120, the third bitmap part is also the same the second bitmap part.

FIG. 14A to FIG. 14D each are a schematic diagram of a structure of the second secondary carrier status indication information when the second secondary carrier status indication information indicates statuses of secondary carriers corresponding to a plurality of Rx UEs 130. Each byte (Oct) shown in FIG. 14A to FIG. 14D is equivalent to the foregoing one bit row. For each byte (Oct), it is assumed that bits from right to left are arranged from the least significant bit to the most significant bit. In addition, SCell$_j$ represents a secondary carrier whose local number is "$j$" at the Tx UE 110, and Rx UE$_k$ represents Rx UE 130 whose index is "k", where j and k are positive integers.

In FIG. 14A, assuming that the maximum quantity of Rx UEs supported by the Tx UE 110 is 16, the fourth bitmap part in the second secondary carrier status indication information may include the first byte (Oct 1) and the second byte (Oct 2). In addition, bits from right to left in the first byte sequentially correspond to Rx UE$_1$ to Rx UE$_8$, and bits from right to left in the second byte sequentially correspond to Rx UE$_9$ to Rx UE$_{16}$. In addition, for each bit in the fourth bitmap part, when a value of the bit is 1, it may indicate that the second secondary carrier status indication information indicates an activated state or a deactivated state of at least one secondary carrier of Rx UE 130 corresponding to the bit; or when a value of the bit is 0, it may indicate that the second secondary carrier status indication information does not indicate an activated state or a deactivated state of at least one secondary carrier of Rx UE 130 corresponding to the bit. In this case, the plurality of Rx UEs 130 are a set of Rx UEs 130 corresponding to bits whose values are 1 in the fourth bitmap part. Alternatively, when a value of the bit is 0, it may indicate that the second secondary carrier status indication information indicates an activated state or a deactivated state of at least one secondary carrier of Rx UE 130 corresponding to the bit; or when a value of the bit is 1, it may indicate that the second secondary carrier status indication information does not indicate an activated state or a deactivated state of at least one secondary carrier of Rx UE 130 corresponding to the bit. In this case, the plurality of Rx UEs 130 are a set of Rx UEs 130 corresponding to bits whose values are 0 in the fourth bitmap part.

In FIG. 14A, assuming that a total quantity of bits included in the subpart corresponding to each Rx UE 130 is 8, as shown in the figure, in the third bitmap part in the second secondary carrier status indication information, each Rx UE 130 corresponds to one bit row (that is, a byte). Specifically, the third byte (Oct 3) may correspond to Rx UE 130 with the smallest index value in the plurality of Rx UEs 130, namely, Rx UE 130 corresponding to a bit when the first right-to-left value from the first byte to the second byte in the fourth bitmap part is 1, that is, when a value "1" of a bit indicates that the second secondary carrier status indication information indicates an activated state or a deactivated state of at least one secondary carrier of Rx UE 130 corresponding to the bit, or when the value is 0, that is, when a value "0" of a bit indicates that the second secondary carrier status indication information indicates an activated state or a deactivated state of at least one secondary carrier of Rx UE 130 corresponding to the bit; and the fourth byte (Oct 4) may correspond to Rx UE 130 with the second smallest index value in the plurality of Rx UEs 130, namely, Rx UE 130 corresponding to a bit when the second right-to-left value from the first byte to the second byte in the fourth bitmap part is 1, that is, when a value "1" of a bit indicates that the second secondary carrier status indication information indicates an activated state or a deactivated state of at least one secondary carrier of Rx UE 130 corresponding to the bit, or when the value is 0, that is, when a value "0" of a bit indicates that the second secondary carrier status indication information indicates an activated state or a deactivated state of at least one secondary carrier of Rx UE 130 corresponding to the bit. By analogy, the tenth byte (Oct 10) may correspond to Rx UE 130 whose index value ranks eighth (in ascending order) in the plurality of Rx UEs 130, namely, Rx UE 130 corresponding to a bit when the eighth right-to-left value from the first byte to the second byte in the fourth bitmap part is 1, that is, when a value "1" of a bit indicates that the second secondary carrier status indication information indicates an activated state or a deactivated state of at least one secondary carrier of Rx UE 130 corresponding to the bit, or when the value is 0, that is, when a value "0" of a bit indicates that the second secondary carrier status indication information indicates an activated state or a deactivated state of at least one secondary carrier of Rx UE 130 corresponding to the bit.

In addition, in the third bitmap part, for the byte corresponding to each of the plurality of Rx UEs 130, the $i^{th}$ bit from right to left may correspond to a secondary carrier SCell$_i$ ($1 \le i \le 8$). It should be noted that a quantity of secondary carriers corresponding to each of the plurality of Rx UEs 130 may alternatively be less than 8. In this case, the byte corresponding to each Rx UE 130 includes bits that do not correspond to any secondary carrier, and values of these bits may be N or values other than 0 and 1.

FIG. 14B is a schematic diagram of a structure of the second secondary carrier status indication information that indicates activated states or deactivated states of the secondary carriers corresponding to the Rx UE 130a, the Rx UE 130b, and the Rx UE 130n in FIG. 5 according to FIG. 14A. It is assumed that an index of the Rx UE 130a is 1, an index of the Rx UE 130b is 4, and an index of the Rx UE 130n is 9. In this case, as shown in FIG. 14B, in the fourth bitmap part, values of the first bit and the fourth bit from right to left in the first byte (Oct 1) and the first bit from right to left in the second byte (Oct 2) are 1, and values of the other bits are 0. In addition, the third bitmap part includes the third byte (Oct 3), the fourth byte (Oct 4), and the fifth byte (Oct 5). Because the local numbers of the secondary carriers corresponding to the Rx UE 130a, the Rx UE 130b, and the Rx UE 130n at the Tx UE 110 are the same as those of the secondary carriers at the network device 120 in FIG. 5, the third bitmap part is the same as the second bitmap part in FIG. 9B. For details, refer to the descriptions of FIG. 9B. Details are not described herein again.

In FIG. 14C, the fourth bitmap part in the second secondary carrier status indication information is the same as that in FIG. 14A. Assuming that a total quantity of bits included in the subpart corresponding to each Rx UE 130 is 16, as shown in the figure, in the third bitmap part, each Rx UE 130 corresponds to two bit rows (that is, bytes). Specifically, the third byte (Oct 3) and the fourth byte (Oct 4) may correspond to Rx UE 130 with the smallest index value in the plurality of Rx UEs 130, namely, Rx UE 130 corresponding to a bit when the first right-to-left value from the first byte to the second byte in the fourth bitmap part is 1, that is, when a value "1" of a bit indicates that the first secondary carrier status indication information indicates an activated state or a deactivated state of at least one secondary carrier of Rx UE 130 corresponding to the bit, or when the value is 0, that is, when a value "0" of a bit indicates that the first secondary carrier status indication information indicates an activated state or a deactivated state of at least one secondary carrier of Rx UE 130 corresponding to the bit; and the fifth byte (Oct 5) and the sixth byte (Oct 6) may correspond to Rx UE 130 with the second smallest index value in the plurality of Rx UEs 130, namely, Rx UE 130 corresponding to a bit when the second right-to-left value from the first byte to the second byte in the fourth bitmap part is 1, that is, when a value "1" of a bit indicates that the first secondary carrier status indication information indicates an activated state or a deactivated state of at least one secondary carrier of Rx UE 130 corresponding to the bit, or when the value is 0, that is, when a value "0" of a bit indicates that the first secondary carrier status indication information indicates an activated state or a deactivated state of at least one secondary carrier of Rx UE 130 corresponding to the bit. By analogy, the ninth byte (Oct 9) and the tenth byte (Oct 10) may correspond to Rx UE 130 whose index value ranks fourth (in ascending order) in the plurality of Rx UEs 130, namely, Rx UE 130 corresponding to a bit when the fourth right-to-left value from the first byte to the second byte in the fourth bitmap part is 1, that is, when a value "1" of a bit indicates that the first secondary carrier status indication information indicates an activated state or a deactivated state of at least one secondary carrier of Rx UE 130 corresponding to the bit, or when the value is 0, that is, when a value "0" of a bit indicates that the first secondary carrier status indication information indicates an activated state or a deactivated state of at least one secondary carrier of Rx UE 130 corresponding to the bit.

In addition, in the third bitmap part, for the two bytes corresponding to each of the plurality of Rx UEs 130, a correspondence between a bit in one byte and a secondary carrier is the same as that in FIG. 14A, and the $i^{th}$ bit from right to left in the other byte may correspond to a secondary carrier $SCell_{i+8}$ ($1 \le i \le 8$). It should be noted that a quantity of secondary carriers corresponding to each Rx UE 130 may alternatively be less than 16. In this case, the two bytes corresponding to each Rx UE 130 include bits that do not correspond to any secondary carrier, and values of these bits may be N or values other than 0 and 1.

In FIG. 14D, the fourth bitmap part in the second secondary carrier status indication information is the same as that in FIG. 14A, and a specific correspondence between each Rx UE 130 and a bit row (that is, a byte) in the third bitmap part is also the same as that in FIG. 14A. For the byte corresponding to each Rx UE 130, the least significant bit may be used as a reserved bit R, and the $i^{th}$ bit from right to left may correspond to a secondary carrier $SCell_{i-1}$ ($2 \le i \le 8$). It should be noted that a quantity of secondary carriers corresponding to each Rx UE 130 may alternatively be less than 7. In this case, the byte corresponding to each Rx UE 130 includes bits that do not correspond to any secondary carrier, and values of these bits may be N or values other than 0 and 1.

It should be noted that the total quantity of bits in the fourth bitmap part and the total quantity of bits in the at least one bit row corresponding to each Rx UE 130 in the third bitmap part are not limited to those shown in FIG. 14A to FIG. 14D. In addition, the correspondence between a bit in the at least one bit row corresponding to each Rx UE 130 in the second bitmap part and a secondary carrier is not limited to that shown in FIG. 14A to FIG. 14D either, provided that local numbers of secondary carriers corresponding to all bits from right to left (or from left to right) in each bit row (or each byte) are arranged in order of size.

It should be noted that, for each byte (Oct) shown in FIG. 14A to FIG. 14D, it may alternatively be assumed that bits from right to left are arranged from the most significant bit to the least significant bit. In this case, the foregoing embodiment is still applicable.

In another example, the fourth bitmap part may include indexes or layer-2 identifiers of the plurality of Rx UEs 130. For example, the index of each of the plurality of Rx UEs 130 is an index of each Rx UE 130 included in the foregoing destination list indication information, an index of each Rx UE 130 included in the foregoing multi-carrier configuration request information, or an index of each Rx UE 130 having established a sidelink connection to the Tx UE 110. The index of the Rx UE 130 is not specifically limited in this embodiment of this application. The third bitmap part may include a plurality of subparts that are in a one-to-one correspondence with the plurality of Rx UEs 130, each subpart includes at least one bit, the at least one bit is in a one-to-one correspondence with at least one secondary carrier, a value of each of the at least one bit may indicate an activated state or a deactivated state of each of the at least one secondary carrier, and the at least one secondary carrier corresponds to the Rx UE 130 corresponding to the subpart. For example, if a value of a bit in the at least one bit is 0, it indicates that a secondary carrier corresponding to the bit is in a deactivated state; or if a value of a bit in the at least one bit is 1, it indicates that a secondary carrier corresponding to the bit is in an activated state. For another example, if a value of a bit in the at least one bit is 1, it indicates that a secondary carrier corresponding to the bit is in a deactivated state; or if a value of a bit in the at least one bit is 0, it indicates that a secondary carrier corresponding to the bit is in an activated state.

In addition, the correspondence between the at least one bit in the third bitmap part and the at least one secondary carrier is related to a local number of the at least one secondary carrier at the Tx UE 110.

In addition, a total quantity of bits included in each subpart in the third bitmap part may be related to one or more of the following: a maximum quantity of secondary carriers supported by the Tx UE 110, a maximum quantity of secondary carriers that can be allocated by the network device 120 to the Tx UE 110, and a quantity of available carriers at the network device 120. In addition, the total quantity of bits included in each subpart may alternatively be a same fixed quantity, and the fixed quantity is related to a maximum quantity of secondary carriers supported by all user equipments (all Tx UEs 110 and Rx UEs 130).

FIG. 15A to FIG. 17B each are a schematic diagram of a structure of the second secondary carrier status indication information when the second secondary carrier status indication information indicates statuses of secondary carriers corresponding to a plurality of Rx UEs 130. Each byte (Oct) shown in FIG. 15A to FIG. 17B is equivalent to the foregoing one bit row. For each byte (Oct), it is assumed that bits from right to left are arranged from the least significant bit to the most significant bit. In addition, $SCell_j$ represents a secondary carrier whose local number is "ⓙ" at the Tx UE 110, and Rx UE$_k$ represents Rx UE 130 whose index is "k", where j and k are positive integers.

The structure of the second secondary carrier status indication information in FIG. 15A is basically the same as that of the first secondary carrier status indication information in FIG. 10A. A difference is that, in FIG. 15A, $SCell_j$ represents the secondary carrier whose local number is "ⓙ" at the Tx UE 110, while in FIG. 10A, $SCell_j$ represents the secondary carrier whose local number is "ⓙ" at the network device 120. Therefore, for FIG. 15A, refer to the descriptions of FIG. 10A. Details are not described herein again.

In addition, in FIG. 15A, the fourth bitmap part may include the four most significant bits in the first byte (Oct 1), the four least significant bits in the second byte (Oct 2), the four most significant bits in the fourth byte (Oct 4), and the like. The third bitmap part may include the four least significant bits in the first byte (Oct 1), the four most significant bits in the second byte (Oct 2), the third byte (Oct 3), the four least significant bits in the fourth byte (Oct 4), the four most significant bits in the fifth byte (Oct 5), and the like.

The structure of the second secondary carrier status indication information in FIG. 15B is basically the same as that of the first secondary carrier status indication information in FIG. 10B. A difference is that, in FIG. 15B, SCell$_j$ represents the secondary carrier whose local number is "$(j)$" at the Tx UE 110, while in FIG. 10B, SCell$_j$ represents the secondary carrier whose local number is "$(j)$" at the network device 120. Therefore, for FIG. 15B, refer to the descriptions of FIG. 10B. Details are not described herein again.

In addition, in FIG. 15B, the fourth bitmap part may include the four most significant bits in the first byte (Oct 1), the four least significant bits in the third byte (Oct 3), and the like. The third bitmap part may include the four least significant bits in the first byte (Oct 1), the second byte (Oct 2), the four most significant bits in the third byte (Oct 3), the fourth byte, the fifth byte (Oct 5), and the like.

The structure of the second secondary carrier status indication information in FIG. 16A is basically the same as that of the first secondary carrier status indication information in FIG. 11A. A difference is that, in FIG. 16A, SCell$_j$ represents the secondary carrier whose local number is "$(j)$" at the Tx UE 110, while in FIG. 11A, SCell$_j$ represents the secondary carrier $(j)$ whose local number is "$(j)$" at the network device 120. Therefore, for FIG. 16A, refer to the descriptions of FIG. 11A. Details are not described herein again.

In FIG. 16A, the fourth bitmap part may include the four least significant bits in the first byte (Oct 1), the four least significant bits in the third byte (Oct 3), the four least significant bits in the fifth byte (Oct 5), and the like. The third bitmap part may include the second byte (Oct 2), the fourth byte (Oct 4), the sixth byte (Oct 6), and the like.

The structure of the second secondary carrier status indication information in FIG. 16B is basically the same as that of the first secondary carrier status indication information in FIG. 11B. A difference is that, in FIG. 16B, SCell$_j$ represents the secondary carrier whose local number is "$(j)$" at the Tx UE 110, while in FIG. 11B, SCell$_j$ represents the secondary carrier whose local number is "$(j)$" at the network device 120. Therefore, for FIG. 16B, refer to the descriptions of FIG. 11B. Details are not described herein again.

In addition, in FIG. 16B, the fourth bitmap part may include the four least significant bits in the first byte (Oct 1), the four least significant bits in the fourth byte (Oct 4), the four least significant bits in the seventh byte (Oct 7), and the like. The third bitmap part may include the second byte (Oct 2), the third byte (Oct 4), the fifth byte (Oct 5), the sixth byte (Oct 6), the eighth byte (Oct 8), the ninth byte (Oct 9), and the like.

The structure of the second secondary carrier status indication information in FIG. 17A is basically the same as that of the first secondary carrier status indication information in FIG. 12A. A difference is that, in FIG. 17A, SCell$_j$ represents the secondary carrier whose local number is "$(j)$" at the Tx UE 110, while in FIG. 12A, SCell$_j$ represents the secondary carrier $(j)$ whose local number is "$(j)$" at the network device 120. Therefore, for FIG. 17A, refer to the descriptions of FIG. 12A. Details are not described herein again.

In addition, in FIG. 17A, the fourth bitmap part may include the first byte (Oct 1) to the third byte (Oct 3), the fifth byte (Oct 5) to the seventh byte (Oct 7), and the like. The third bitmap part may include the fourth byte (Oct 4), the eighth byte (Oct 8), and the like.

The structure of the second secondary carrier status indication information in FIG. 17B is basically the same as that of the first secondary carrier status indication information in FIG. 12B. A difference is that, in FIG. 17B, SCell$_j$ represents the secondary carrier whose local number is "$(j)$" at the Tx UE 110, while in FIG. 12B, SCell$_j$ represents the secondary carrier whose local number is "$(j)$" at the network device 120. Therefore, for FIG. 17B, refer to the descriptions of FIG. 12B. Details are not described herein again.

In addition, in FIG. 17B, the fourth bitmap part may include the first byte (Oct 1) to the third byte (Oct 3), the sixth byte (Oct 6) to the eighth byte (Oct 8), and the like. The third bitmap part may include the fourth byte (Oct 4), the fifth byte (Oct 5), the ninth byte (Oct 9), the tenth byte (Oct 10), and the like.

It should be noted that, in the fourth bitmap part in the second secondary carrier status indication information, the identifier of each of the plurality of Rx UEs 130 may occupy any quantity of bits, and the quantity is not limited to that shown in FIG. 15A to FIG. 17B; and in the third bitmap part, the total quantity of the at least one bit corresponding to each of the plurality of Rx UEs 130 is not limited to that shown in FIG. 15A to FIG. 17B either. In addition, the correspondence between each of the at least one bit and a secondary carrier is not limited to that shown in FIG. 15A to FIG. 17B either, provided that local numbers of secondary carriers corresponding to all bits from right to left (or from left to right) in the at least one bit are arranged in order of size.

It should be noted that, for each byte (Oct) shown in FIG. 15A to FIG. 17B, it may alternatively be assumed that bits from right to left are arranged from the most significant bit to the least significant bit. In this case, the foregoing embodiment is still applicable.

It should be noted that the second secondary carrier status indication information having the foregoing structure in this embodiment may be used in S314 in FIG. 3A and FIG. 3B.

Embodiment 2

In this embodiment, the network device 120 performs globally unique numbering on the plurality of secondary carriers indicated in the first multi-carrier configuration information. The globally unique numbering means that the network device 120 performs global numbering on the plurality of secondary carriers or available carriers at the network device 120, and each of the plurality of secondary carriers has only one number.

In this case, because the network device 120 may configure a same secondary carrier for sidelink communication between the Tx UE 110 and different Rx UEs 130, the Tx UE 110 cannot determine, based on a globally unique number of a secondary carrier, Rx UE 130 corresponding to the secondary carrier. Therefore, the network device 120 needs to add an identifier of the Rx UE 130 to the first secondary carrier status indication information.

In this embodiment, the Tx UE 110 separately performs local numbering on the at least one secondary carrier that corresponds to each Rx UE 130 and that is indicated in the first multi-carrier configuration information. In addition, the secondary carriers corresponding to all the Rx UEs 130 may have a same local number. In this case, the local numbers cannot uniquely determine the secondary carriers. Because the second secondary carrier status indication information is related to the local numbers of the secondary carriers, when the second secondary carrier status indication information indicates statuses of the secondary carriers corresponding to the plurality of Rx UEs 130, the identifiers of the Rx UEs 130 need to be added.

It should be noted that, in this embodiment, that the network device 120 performs globally unique numbering on the plurality of secondary carriers indicated in the first multi-carrier configuration information is related to S308 in FIG. 3A and FIG. 3B, that the Tx UE 110 separately performs local numbering on the at least one secondary carrier that corresponds to each Rx UE 130 and that is indicated in the first multi-carrier configuration information is related to S309 in FIG. 3A and FIG. 3B, the first secondary carrier status indication information is related to S313 in FIG. 3A and FIG. 3B, and the second secondary carrier status indication information is related to S314 in FIG. 3A and FIG. 3B.

Numbering Performed by the Network Device 120 and the Tx UE 110 on the Secondary Carriers FIG. 18 shows an example of carrier allocation at the network device 120 and an example of performing globally unique numbering by the network device 120 on the carriers and performing local numbering by the Tx UE 110 on the carriers. As shown in FIG. 18, it is assumed that the plurality of secondary carriers allocated to the Tx UE 110 at the network device 120 include $F_1$, $F_2$, $F_3$, $F_4$, $F_5$, $F_6$, $F_7$, and $F_8$. Specifically, $F_1$, $F_2$, $F_5$, and $F_8$ are used by the Tx UE 110 to perform sidelink communication with the Rx UE 130*a*; $F_3$, $F_6$, and $F_7$ are used by the Tx UE 110 to perform sidelink communication with the Rx UE 130*b*; and $F_1$, $F_4$, $F_6$, and $F_8$ are used by the Tx UE 110 to perform sidelink communication with the Rx UE 130*n*.

The network device 120 may perform globally unique numbering on the plurality of secondary carriers, to indicate the activated states or the deactivated states of the plurality of secondary carriers in the first secondary carrier status indication information. In an example, the network device 120 may perform globally unique numbering in an arrangement order of the identifiers of the plurality of secondary carriers in the first multi-carrier configuration information. For example, assuming that the arrangement order of the secondary carriers in the first multi-carrier configuration information is $F_1$, $F_2$, $F_3$, $F_4$, $F_5$, $F_6$, $F_7$, and $F_8$, as shown in FIG. 18, globally unique numbers of the secondary carriers $F_1$ to $F_8$ at the network device 120 may be respectively "①", "②", "③", "④", "⑤", "⑥", "⑦", and "⑧".

In another example, the network device 120 may perform globally unique numbering in a size arrangement order of the identifiers of the plurality of secondary carriers or the available carriers at the network device 120. For example, assuming that the arrangement order of the secondary carriers in ascending order is $F_1$, $F_2$, $F_3$, $F_4$, $F_5$, $F_6$, $F_7$, and $F_8$, as shown in FIG. 18, globally unique numbers of the secondary carriers $F_1$ to $F_8$ at the network device 120 may be respectively "①", "②", "③", "④", "⑤", "⑥", "⑦", and "⑧".

It should be noted that carrier allocation at the network device 120 is not limited to that shown in FIG. 18, and the network device 120 may alternatively perform globally unique numbering on the plurality of secondary carriers according to any other appropriate rule.

In addition, globally unique numbering performed by the network device 120 on the plurality of secondary carriers may be used in S308 in FIG. 3A and FIG. 3B, and the network device 120 may indicate the globally unique numbers of the plurality of secondary carriers in the first multi-carrier configuration information. However, when there is a default rule such as the globally unique numbering rule in the foregoing example between the Tx UE 110 and the network device 120, the network device 120 may alternatively not indicate the globally unique numbers of the plurality of secondary carriers in the first multi-carrier configuration information.

After receiving the first multi-carrier configuration information from the network device 120, the Tx UE 110 may also perform local numbering on the plurality of secondary carriers indicated in the first multi-carrier configuration information, to indicate activated states or deactivated states of the plurality of secondary carriers in the second secondary carrier status indication information. For details, refer to the related descriptions in Embodiment 1. Details are not described herein again. In addition, local numbering performed by the Tx UE 110 on the plurality of secondary carriers may be used in S309 in FIG. 3A and FIG. 3B.

First Secondary Carrier Status Indication Information

When the first secondary carrier status indication information indicates an activated state or a deactivated state of at least one secondary carrier corresponding to only one Rx UE 130, the first secondary carrier status indication information may include a secondary carrier status bitmap, and the secondary carrier status bitmap may include a first bitmap part and a second bitmap part. The first bitmap part may be used to indicate an identifier of the Rx UE 130, and the second bitmap part may be used to indicate the activated state or the deactivated state of each of the at least one secondary carrier corresponding to the Rx UE 130.

In an example, a type of the identifier of the Rx UE 130 used in the first bitmap part may be the same as or different from that of the identifier of the Rx UE 130 used in the first multi-carrier configuration information. In an example, at least one bit in the second bitmap part is in a one-to-one correspondence with at least one secondary carrier, a value of each of the at least one bit may indicate an activated state or a deactivated state of each of the at least one secondary carrier, and the at least one secondary carrier corresponds to the Rx UE 130. For example, if a value of a bit in the at least one bit is 0, it indicates that a secondary carrier corresponding to the bit is in a deactivated state; or if a value of a bit in the at least one bit is 1, it indicates that a secondary carrier corresponding to the bit is in an activated state. For another example, if a value of a bit in the at least one bit is 1, it indicates that a secondary carrier corresponding to the bit is in a deactivated state; or if a value of a bit in the at least one bit is 0, it indicates that a secondary carrier corresponding to the bit is in an activated state.

In an example, a total quantity of bits in the second bitmap part may be related to a maximum quantity of secondary carriers that can be allocated by the network device 120 to the Tx UE 110 or a quantity of available carriers at the network device 120. For example, when the maximum quantity of secondary carriers that can be allocated by the network device 120 to the Tx UE 110 is 8, the total quantity of bits in the second bitmap part may be 8; or when the maximum quantity of secondary carriers that can be allocated by the network device 120 to the Tx UE 110 is 16, the total quantity of bits in the second bitmap part may be 16.

In an example, the correspondence between the at least one bit in the second bitmap part and the at least one secondary carrier is related to a globally unique number (that is, an index) of each of the at least one secondary carrier in the plurality of secondary carriers or the available carriers at the network device 120.

FIG. 19A to FIG. 21B each are a schematic diagram of a structure of the first secondary carrier status indication information when the first secondary carrier status indication information indicates an activated state or a deactivated state of at least one secondary carrier corresponding to only one Rx UE 130. For each byte (Oct) shown in FIG. 19A to FIG. 21B, it is assumed that bits from right to left are arranged from the least significant bit to the most significant bit. In addition, $SCell_j$ represents a secondary carrier whose globally unique number is "ⓙ".

In FIG. 19A, the first bitmap part in the first secondary carrier status indication information includes the four most significant bits in the first byte (Oct 1), to indicate an index of the Rx UE 130. Assuming that the maximum quantity of secondary carriers that can be allocated by the network device 120 to the Tx UE 110 is 8, the second bitmap part may include 8 bits, that is, the four least significant bits in the first byte (Oct 1) and the four most significant bits in the second byte (Oct 2). In addition, the $i^{th}$ bit from right to left in the four least significant bits in the first byte may correspond to a secondary carrier $SCell_i$ ($1 \le i \le 4$), and the $i^{th}$ bit from right to left in the four most significant bits in the second byte may correspond to a secondary carrier $SCell_i$ ($5 \le i \le 8$). In addition, in the second bitmap part, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

FIG. 19B is a schematic diagram of a structure of the first secondary carrier status indication information that indicates activated states or deactivated states of the secondary carriers corresponding to the Rx UE 130*a* in FIG. 18 according to FIG. 19A. As shown in the figure, the first bitmap part in the first secondary carrier status indication information may include an index of the Rx UE 130*a*. In 8 bits in the second bitmap part, the least significant bit in the first byte (Oct 1) corresponds to the secondary carrier $F_1$ ($SCell_1$), and a value of the bit is 1, indicating that the secondary carrier $F_1$ is in an activated state; the second bit from right corresponds to the secondary carrier $F_2$ ($SCell_2$), and a value of the bit is 0, indicating that the secondary carrier $F_2$ is in a deactivated state; the fifth bit from right in the second byte (Oct 2) corresponds to the secondary carrier $F_5$ ($SCell_5$), and a value of the bit is 0, indicating that the secondary carrier $F_5$ is in a deactivated state; and the eighth bit from right in the second byte (Oct 2) corresponds to the secondary carrier $F_8$ ($SCell_8$), and a value of the bit is 0, indicating that the secondary carrier $F_8$ is in a deactivated state. The other bits in the second bitmap part do not correspond to the secondary carriers corresponding to the Rx UE 130*a*, and values of the bits may be N.

In FIG. 19C, the first bitmap part in the first secondary carrier status indication information is the same as that in FIG. 19A. Assuming that the maximum quantity of secondary carriers that can be allocated by the network device 120 to the Tx UE 110 is 16, the second bitmap part may include 16 bits, that is, the four least significant bits in the first byte (Oct 1), the second byte (Oct 2), and the four most significant bits in the third byte (Oct 3). In addition, the correspondence between the four least significant bits in the first byte and secondary carriers is the same as that in FIG. 19A, the $i^{th}$ bit from right to left in the bits in the second byte may correspond to a secondary carrier $SCell_{i+4}$ ($1 \le i \le 8$), and the $i^{th}$ bit from right to left in the four most significant bits in the third byte may correspond to a secondary carrier $SCell_{i+8}$ ($5 \le i \le 8$). In addition, in the second bitmap part, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

In FIG. 20A, the first bitmap part in the first secondary carrier status indication information includes the four least significant bits in the first byte (Oct 1), to indicate an index of the Rx UE 130. In addition, the four most significant bits in the first byte (Oct 1) are used as reserved bits R. Assuming that the maximum quantity of secondary carriers that can be allocated by the network device 120 to the Tx UE 110 is 8, the second bitmap part may include 8 bits, that is, the second byte (Oct 2). In addition, the $i^{th}$ bit from right to left in the second byte (Oct 2) may correspond to a secondary carrier $SCell_i$ ($1 \le i \le 8$). In addition, in the second bitmap part, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1. Alternatively, in the first bitmap part, the four most significant bits in the first byte (Oct 1) may be used to indicate the index of the Rx UE 130, and the four least significant bits may be used as the reserved bits R.

In FIG. 20B, the first bitmap part in the first secondary carrier status indication information is the same as that in FIG. 20A. Assuming that the maximum quantity of secondary carriers that can be allocated by the network device 120 to the Tx UE 110 is 16, the second bitmap part may include 16 bits, that is, the second byte (Oct 2) and the third byte (Oct 3). In addition, the correspondence between a bit in the second byte and a secondary carrier is the same as that in FIG. 20A, and the $i^{th}$ bit from right to left in the third byte may correspond to a secondary carrier $SCell_{i+8}$ ($1 \le i \le 8$). In addition, in the second bitmap part, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

In FIG. 20C, the first bitmap part in the first secondary carrier status indication information is the same as that in FIG. 20A. Assuming that the maximum quantity of secondary carriers that can be allocated by the network device 120 to the Tx UE 110 is 8, the second bitmap part may include 8 bits, that is, the second byte (Oct 2). In addition, the least significant bit in the second byte (Oct 2) is used as a reserved bit R, and the it bit from right to left may correspond to a secondary carrier $SCell_{i-1}$ ($2 \le i \le 8$). It should be noted that a quantity of secondary carriers corresponding to the Rx UE 130 may alternatively be less than 7. In this case, the second bitmap part includes bits that do not correspond to any secondary carrier, and values of these bits may be N or values other than 0 and 1. Alternatively, in the first bitmap part, the four most significant bits in the first byte (Oct 1) may be used to indicate the index of the Rx UE 130, and the four least significant bits may be used as the reserved bits R.

In FIG. 21A, the first bitmap part in the first secondary carrier status indication information includes the first byte (Oct 1), the second byte (Oct 2), and the third byte (Oct 3), to indicate a destination layer-2 identifier of the Rx UE 130. Assuming that the maximum quantity of secondary carriers that can be allocated by the network device 120 to the Tx UE 110 is 8, the second bitmap part may include 8 bits, that is, the fourth byte (Oct 4). In addition, the correspondence between a bit in the fourth byte and a secondary carrier is the same as that in FIG. 20A, and details are not described herein again. In addition, in the second bitmap part, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

In FIG. 21B, the first bitmap part in the first secondary carrier status indication information is the same as that in FIG. 21A. Assuming that the maximum quantity of secondary carriers that can be allocated by the network device 120 to the Tx UE 110 is 16, the second bitmap part may include 16 bits, that is, the fourth byte (Oct 4) and the fifth byte (Oct 5). In addition, the correspondence between a bit in the fourth byte and the fifth byte and a secondary carrier is the same as that in FIG. 20B, and details are not described herein again. In addition, in the second bitmap part, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

It should be noted that the total quantity of bits in the first bitmap part and the total quantity of bits in the second bitmap part in the first secondary carrier status indication information are not limited to those shown in FIG. 19A to FIG. 21B, that is, the identifier of the Rx UE 130 in the first bitmap part may occupy any quantity of bits, and the total quantity of bits in the second bitmap part may depend on the maximum quantity of secondary carriers that can be allocated by the network device 120 to the Tx UE 110 or the quantity of available carriers at the network device 120. In addition, the correspondence between a bit in the second bitmap part and a secondary carrier is not limited to that shown in FIG. 19A to FIG. 21B either.

It should be noted that, for each byte (Oct) shown in FIG. 19A to FIG. 21B, it may alternatively be assumed that bits from right to left are arranged from the most significant bit to the least significant bit. In this case, the foregoing embodiment is still applicable.

When the first secondary carrier status indication information indicates activated states or deactivated states of secondary carriers corresponding to a plurality of Rx UEs 130, the first secondary carrier status indication information may include a secondary carrier status bitmap, and the secondary carrier status bitmap may include a first bitmap part and a second bitmap part. The first bitmap part may be used to indicate an identifier of each of the plurality of Rx UEs 130, for example but not limited to, an index or a destination layer-2 identifier of each Rx UE 130. The index of each Rx UE 130 may include but is not limited to an index of each Rx UE 130 included in the foregoing destination list indication information, an index of each Rx UE 130 included in the foregoing multi-carrier configuration request information, an index of each Rx UE 130 having established a sidelink connection to the Tx UE 110, and the like. The second bitmap part may be used to indicate an activated state or a deactivated state of each of at least one secondary carrier corresponding to each of the plurality of Rx UEs 130.

In an example, a total quantity of bits in the first bitmap part is related to a maximum quantity of Rx UEs supported by the Tx UE 110 (that is, a maximum quantity of Rx UEs that simultaneously perform sidelink communication with the Tx UE 110), a plurality of bits in the first bitmap are in a one-to-one correspondence with the plurality of Rx UEs 130, and the specific correspondence between the plurality of bits and the plurality of Rx UEs 130 is related to the index of each Rx UE 130.

In an example, the second bitmap part may include a plurality of bit rows ( ) corresponding to the plurality of Rx UEs 130. For example, quantities of bits included in all the bit rows may be the same or may be different. For example, the bit row may include but is not limited to a byte. The bit row is not specifically limited in this embodiment of this application. Each of the plurality of Rx UEs 130 corresponds to at least one bit row, the at least one bit row includes at least one bit that is in a one-to-one correspondence with at least one secondary carrier, a value of each bit indicates an activated state or a deactivated state of a secondary carrier corresponding to the bit, and the at least one secondary carrier corresponds to the Rx UE 130. For example, if a value of a bit in the at least one bit is 0, it indicates that a secondary carrier corresponding to the bit is in a deactivated state; or if a value of a bit in the at least one bit is 1, it indicates that a secondary carrier corresponding to the bit is in an activated state. For another example, if a value of a bit in the at least one bit is 1, it indicates that a secondary carrier corresponding to the bit is in a deactivated state; or if a value of a bit in the at least one bit is 0, it indicates that a secondary carrier corresponding to the bit is in an activated state.

In addition, a total quantity of bits included in the at least one bit row may be related to a maximum quantity of secondary carriers that can be allocated by the network device 120 to the Tx UE 110 or a quantity of available carriers at the network device 120, and the correspondence between the at least one bit and the at least one secondary carrier is related to a globally unique number (that is, an index) of each of the at least one secondary carrier in the plurality of secondary carriers or the available carriers at the network device 120.

FIG. 22A to FIG. 22C each are a schematic diagram of a structure of the first secondary carrier status indication information when the first secondary carrier status indication information indicates activated states or deactivated states of secondary carriers corresponding to a plurality of Rx UEs 130. Each byte (Oct) shown in FIG. 22A to FIG. 22C is equivalent to the foregoing one bit row. For each byte (Oct), it is assumed that bits from right to left are arranged from the least significant bit to the most significant bit. In addition, SCell$_j$ represents a secondary carrier whose globally unique number is "$j$" at the network device 120, and Rx UE$_k$ represents Rx UE 130 whose index is "k", where j and k are positive integers.

In FIG. 22A, assuming that the maximum quantity of Rx UEs supported by the Tx UE 110 is 16, the first bitmap part in the first secondary carrier status indication information may include the first byte (Oct 1) and the second byte (Oct 2), and has a same structure as the first bitmap part in the first secondary carrier status indication information in FIG. 9A. Refer to the related descriptions of FIG. 9A. Details are not described herein again.

In FIG. 22A, assuming that the maximum quantity of secondary carriers that can be allocated by the network device 120 to the Tx UE 110 is 8, in the second bitmap part in the first secondary carrier status indication information, each of the plurality of Rx UEs 130 corresponds to one bit row (that is, a byte), and the specific correspondence is the same as that in the second bitmap part in the first secondary carrier status indication information in FIG. 9A. Refer to the related descriptions of FIG. 9A. Details are not described herein again.

In addition, in the second bitmap part, for the byte corresponding to each of the plurality of Rx UEs 130, the $i^{th}$ bit from right to left may correspond to a secondary carrier SCell$_i$ (1≤i≤8). In addition, in the byte, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

FIG. 22B is a schematic diagram of a structure of the first secondary carrier status indication information that indicates activated states or deactivated states of the secondary carriers corresponding to the Rx UE 130a, the Rx UE 130b, and the Rx UE 130n in FIG. 18 according to FIG. 22A. It is assumed that an index of the Rx UE 130a is 1, an index of the Rx UE 130b is 4, and an index of the Rx UE 130n is 9. In this case, as shown in FIG. 22B, in the first bitmap part, values of the first bit and the fourth bit from right to left in the first byte (Oct 1) and the first bit from right to left in the second byte (Oct 2) are 1, and values of the other bits are 0. The second bitmap part includes the third byte (Oct 3), the fourth byte (Oct 4), and the fifth byte (Oct 5). For the third byte, the least significant bit corresponds to the secondary carrier $F_1$ (SCell$_1$) corresponding to the Rx UE 130a, and a value of the bit is 1, indicating that the secondary carrier $F_1$ is in an activated state; the second bit from right corresponds to the secondary carrier $F_2$ (SCell$_2$), and a value of the bit is 0, indicating that the secondary carrier $F_2$ is in a deactivated state; the fifth bit from right corresponds to the secondary carrier $F_5$ (SCell$_5$), and a value of the bit is 0, indicating that the secondary carrier $F_5$ is in a deactivated state; the eighth bit from right corresponds to the secondary carrier $F_8$ (SCell$_8$), and a value of the bit is 0, indicating that the secondary carrier $F_8$ is in a deactivated state; and the other bits do not correspond to the Rx UE 130a, and values of the bits may be N. For the fourth byte, the third bit from right corresponds to the secondary carrier $F_3$ (SCell$_3$) corresponding to the Rx UE 130b, and a value of the bit is 0, indicating that the secondary carrier $F_3$ is in a deactivated state; the sixth bit from right corresponds to the secondary carrier $F_6$ (SCell$_6$), and a value of the bit is 1, indicating that the secondary carrier $F_6$ is in an activated state; the seventh bit from right corresponds to the secondary carrier $F_7$ (SCell), and a value of the bit is 1, indicating that the secondary carrier $F_7$ is in an activated state; and the other bits do not correspond to the Rx UE 130b, and values of the bits may be N. For the fifth byte, the least significant bit corresponds to the secondary carrier $F_1$ (SCell$_1$) corresponding to the Rx UE 130n, and a value of the bit is 1, indicating that the secondary carrier $F_1$ is in an activated state; the fourth bit from right corresponds to the secondary carrier $F_4$ (SCell$_4$), and a value of the bit is 1, indicating that the secondary carrier $F_4$ is in an activated state; the sixth bit from right corresponds to the secondary carrier $F_6$ (SCell$_6$), and a value of the bit is 0, indicating that the secondary carrier $F_6$ is in a deactivated state; the eighth bit from right corresponds to the secondary carrier $F_8$ (SCell$_8$), and a value of the bit is 0, indicating that the secondary carrier $F_8$ is in a deactivated state; and the other bits do not correspond to the Rx UE 130n, and values of the bits may be N.

In FIG. 22C, the first bitmap part in the first secondary carrier status indication information is the same as that in FIG. 22A. Assuming that the maximum quantity of secondary carriers that can be allocated by the network device 120 to the Tx UE 110 is 16, in the second bitmap part, each Rx UE 130 corresponds to two bit rows (that is, bytes), and the specific correspondence is the same as that in the second bitmap part in the first secondary carrier status indication information in FIG. 9C. Refer to the related descriptions of FIG. 9C. Details are not described herein again.

In addition, in the second bitmap part, for the two bytes corresponding to each of the plurality of Rx UEs 130, the correspondence between a bit in one byte and a secondary carrier is the same as that in FIG. 22A, and the $i^{th}$ bit from right to left in the bits in the other bit may correspond to a secondary carrier SCell$_{i+8}$ (1≤i≤8). In addition, in the byte, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

It should be noted that the total quantity of bits in the first bitmap part and the total quantity of bits in the at least one bit row corresponding to each Rx UE 130 in the second bitmap part are not limited to those shown in FIG. 22A to FIG. 22C. In addition, the correspondence between a bit in the at least one bit row corresponding to each Rx UE 130 in the second bitmap part and a secondary carrier is not limited to that shown in FIG. 22A to FIG. 22C either.

It should be noted that, for each byte (Oct) shown in FIG. 22A to FIG. 22C, it may alternatively be assumed that bits from right to left are arranged from the most significant bit to the least significant bit. In this case, the foregoing embodiment is still applicable.

In another example, the first bitmap part may include indexes or layer-2 identifiers of the plurality of Rx UEs 130. For example, the index of each of the plurality of Rx UEs 130 is an index of each Rx UE 130 included in the foregoing destination list indication information, an index of each Rx UE 130 included in the foregoing multi-carrier configuration request information, or an index of each Rx UE 130 having established a sidelink connection to the Tx UE 110. The index of each of the plurality of Rx UEs 130 is not specifically limited in this embodiment of this application. The second bitmap part may include a plurality of subparts that are in a one-to-one correspondence with the plurality of Rx UEs 130, each subpart includes at least one bit, the at least one bit is in a one-to-one correspondence with at least one secondary carrier, a value of each of the at least one bit may indicate an activated state or a deactivated state of each of the at least one secondary carrier, and the at least one secondary carrier corresponds to the Rx UE 130 corresponding to the subpart. For example, if a value of a bit in the at least one bit is 0, it indicates that a secondary carrier corresponding to the bit is in a deactivated state; or if a value of a bit in the at least one bit is 1, it indicates that a secondary carrier corresponding to the bit is in an activated state. For another example, if a value of a bit in the at least one bit is 1, it indicates that a secondary carrier corresponding to the bit is in a deactivated state; or if a value of a bit in the at least one bit is 0, it indicates that a secondary carrier corresponding to the bit is in an activated state.

In addition, in the second bitmap part, for each of the plurality of Rx UEs 130, the correspondence between the at least one bit and the at least one secondary carrier is related to a globally unique number (that is, an index) of each of the at least one secondary carrier in the plurality of secondary carriers or the available carriers at the network device 120.

In addition, a total quantity of bits in the second bitmap part may be related to a maximum quantity of secondary carriers that can be allocated by the network device 120 to the Tx UE 110 or a product of a quantity of available carriers at the network device 120 and a quantity of the plurality of Rx UEs 130. For example, when the maximum quantity of secondary carriers that can be allocated by the network device 120 to the Tx UE 110 is 8, and the quantity of the plurality of Rx UEs 130 is 3, the total quantity of bits in the second bitmap part may be 24; or when the maximum quantity of secondary carriers that can be allocated by the network device 120 to the Tx UE 110 is 16, and the quantity of the plurality of Rx UEs 130 is 2, the total quantity of bits in the second bitmap part may be 32.

FIG. 23A to FIG. 25B each are a schematic diagram of a structure of the first secondary carrier status indication information when the first secondary carrier status indication information indicates activated states or deactivated states of secondary carriers corresponding to a plurality of Rx UEs 130. It is assumed that bits from right to left are arranged from the least significant bit to the most significant bit. In addition, SCell$_j$ represents a secondary carrier whose globally unique number is "$j$" at the network device 120, and Rx UE$_k$ represents Rx UE 130 whose index is "k", where j and k are positive integers.

In FIG. 23A, assuming that the maximum quantity of secondary carriers that can be allocated by the network device 120 to the Tx UE 110 is 8, the four most significant bits in the first byte (Oct 1) may be used to indicate an index of the first Rx UE 130 (Rx UE$_1$) in the plurality of Rx UEs 130, the four least significant bits in the first byte (Oct 1) and the four most significant bits in the second byte (Oct 2) are a subpart corresponding to the Rx UE$_1$ in the second bitmap part, the $i^{th}$ bit from right to left in the four least significant bits in the first byte (Oct 1) may correspond to a secondary carrier SCell$_i$ (1≤i≤4), and the $i^{th}$ bit from right to left in the four most significant bits in the second byte (Oct 2) may correspond to a secondary carrier SCell$_i$ (5≤i≤8); the four least significant bits in the second byte (Oct 2) may be used to indicate an index of the second Rx UE 130 (Rx UE$_2$) in the plurality of Rx UEs 130, the third byte (Oct 3) is a subpart corresponding to the Rx UE$_2$ in the second bitmap part, and the $i^{th}$ bit from right to left in the bits in the third byte (Oct 3) may correspond to a secondary carrier SCell$_i$ (1≤i≤8); the four most significant bits in the fourth byte (Oct 4) may be used to indicate an index of the third Rx UE 130 (Rx UE$_3$) in the plurality of Rx UEs 130, the four least significant bits in the fourth byte (Oct 4) and the four most significant bits in the fifth byte (Oct 5) are a subpart corresponding to the Rx UE$_3$ in the second bitmap part, the $i^{th}$ bit from right to left in the four least significant bits in the fourth byte (Oct 4) may correspond to a secondary carrier SCell$_i$ (1≤i≤4), and the $i^{th}$ bit from right to left in the four most significant bits in the fifth byte (Oct 5) may correspond to a secondary carrier SCell$_i$ (5≤i≤8); and so on, until the last Rx UE 130 in the plurality of Rx UEs 130. It should be noted that, in each subpart corresponding to each Rx UE 130, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

In addition, in FIG. 23A, the first bitmap part may include the four most significant bits in the first byte (Oct 1), the four least significant bits in the second byte (Oct 2), the four most significant bits in the fourth byte (Oct 4), and the like.

In FIG. 23B, assuming that the maximum quantity of secondary carriers that can be allocated by the network device 120 to the Tx UE 110 is 16, the four most significant bits in the first byte (Oct 1) may be used to indicate an index of the first Rx UE 130 (Rx UE$_1$) in the plurality of Rx UEs 130, the four least significant bits in the first byte (Oct 1), the second byte (Oct 2), and the four most significant bits in the third byte (Oct 3) may be a subpart corresponding to the Rx UE$_1$ in the second bitmap part, the $i^{th}$ bit from right to left in the four least significant bits in the first byte (Oct 1) may correspond to a secondary carrier SCell$_i$ (1≤i≤4), the $i^{th}$ bit from right to left in the second byte (Oct 2) may correspond to a secondary carrier SCell$_{i+4}$ (1≤i≤8), and the $i^{th}$ bit from right to left in the four most significant bits in the third byte (Oct 3) may correspond to a secondary carrier SCell$_{i+8}$ (5≤i≤8); the four least significant bits in the third byte (Oct 3) may be used to indicate an index of the second Rx UE 130 (Rx UE$_2$) in the plurality of Rx UEs 130, the fourth byte (Oct 4) and the fifth byte (Oct 5) are a subpart corresponding to the Rx UE$_2$ in the second bitmap part, the $i^{th}$ bit from right to left in the bits in the fourth byte (Oct 4) may correspond to a secondary carrier SCell$_i$ (1≤i≤8), and the $i^{th}$ bit from right to left in the bits in the fifth byte (Oct 5) may correspond to a secondary carrier SCell$_{i+8}$ (1≤i≤8); and so on, until the last Rx UE 130 in the plurality of Rx UEs 130. It should be noted that, in each subpart corresponding to each Rx UE 130, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

In addition, in FIG. 23B, the first bitmap part may include the four most significant bits in the first byte (Oct 1), the four least significant bits in the third byte (Oct 3), and the like.

In FIG. 24A, assuming that the maximum quantity of secondary carriers that can be allocated by the network device 120 to the Tx UE 110 is 8, the four least significant bits in the first byte (Oct 1) may be used to indicate an index of the first Rx UE 130 (Rx UE$_1$) in the plurality of Rx UEs 130, the four most significant bits in the first byte (Oct 1) may be used as reserved bits R, the second byte (Oct 2) may be a subpart corresponding to the Rx UE$_1$ in the second bitmap part, and the $i^{th}$ bit from right to left in the second byte (Oct 2) may correspond to a secondary carrier SCell$_i$ (1≤i≤8); the four least significant bits in the third byte (Oct 3) may be used to indicate an index of the second Rx UE 130 (Rx UE$_2$) in the plurality of Rx UEs 130, the four most significant bits in the third byte (Oct 3) may be used as reserved bits R, the fourth byte (Oct 4) is a subpart corresponding to the Rx UE$_2$ in the second bitmap part, a correspondence between each bit in the fourth byte and a secondary carrier is similar to a correspondence with the Rx UE$_1$, and details are not described herein again; the four least significant bits in the fifth byte (Oct 5) may be used to indicate an index of the third Rx UE 130 (Rx UE$_2$) in the plurality of Rx UEs 130, the four most significant bits in the fifth byte (Oct 5) may be used as reserved bits R, the sixth byte (Oct 6) is a subpart corresponding to the Rx UE$_3$ in the second bitmap part, a correspondence between each bit in the sixth byte and a secondary carrier is similar to a correspondence with the Rx $UE_1$, and details are not described herein again; and so on, until the last Rx UE 130 in the plurality of Rx UEs 130. It should be noted that, in each subpart corresponding to each Rx UE 130, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1. Alternatively, the foregoing bits used to indicate the index of the Rx UE 130 may be used as the reserved bits R, and the foregoing reserved bits R may be used to indicate the index of the Rx UE 130.

In addition, in FIG. 24A, the first bitmap part may include the four least significant bits in the first byte (Oct 1), the four least significant bits in the third byte (Oct 3), the four least significant bits in the fifth byte (Oct 5), and the like.

In FIG. 24B, assuming that the maximum quantity of secondary carriers that can be allocated by the network device 120 to the Tx UE 110 is 8, the four least significant bits in the first byte (Oct 1) may be used to indicate an index of the first Rx UE 130 (Rx $UE_1$) in the plurality of Rx UEs 130, the four most significant bits in the first byte (Oct 1) may be used as reserved bits R, the second byte (Oct 2) and the third byte (Oct 3) are a subpart corresponding to the Rx $UE_1$ in the second bitmap part, the $i^{th}$ bit from right to left in the second byte (Oct 2) may correspond to a secondary carrier $SCell_i$ ($1 \leq i \leq 8$), and the $i^{th}$ bit from right to left in the bits in the third byte (Oct 3) may correspond to a secondary carrier $SCell_{i+8}$ ($1 \leq i \leq 8$); the four least significant bits in the fourth byte (Oct 4) may be used to indicate an index of the second Rx UE 130 (Rx $UE_2$) in the plurality of Rx UEs 130, the four most significant bits in the fourth byte (Oct 4) may be used as reserved bits R, the fifth byte (Oct 5) and the sixth byte (Oct 6) are a subpart corresponding to the Rx $UE_2$ in the second bitmap part, a correspondence between each bit in the fifth byte and the sixth byte and a secondary carrier is similar to a correspondence with the Rx $UE_1$, and details are not described herein again; the four least significant bits in the seventh byte (Oct 7) may be used to indicate an index of the third Rx UE 130 (Rx $UE_3$) in the plurality of Rx UEs 130, the four most significant bits in the seventh byte (Oct 7) may be used as reserved bits R, the eighth byte (Oct 8) and the ninth byte (Oct 9) are a subpart corresponding to the Rx $UE_3$ in the second bitmap part, a correspondence between each bit in the eighth byte and the ninth byte and a secondary carrier is similar to a correspondence with the Rx $UE_1$, and details are not described herein again; and so on, until the last Rx UE 130 in the plurality of Rx UEs 130. It should be noted that, in each subpart corresponding to each Rx UE 130, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1. Alternatively, the foregoing bits used to indicate the index of the Rx UE 130 may be used as the reserved bits R, and the foregoing reserved bits R may be used to indicate the index of the Rx UE 130.

In addition, in FIG. 24B, the first bitmap part may include the four least significant bits in the first byte (Oct 1), the four least significant bits in the fourth byte (Oct 4), the four least significant bits in the seventh byte (Oct 7), and the like.

In FIG. 25A, assuming that the maximum quantity of secondary carriers that can be allocated by the network device 120 to the Tx UE 110 is 8, the first byte (Oct 1) to the third byte (Oct 3) may be used to indicate a destination layer-2 identifier of the first Rx UE 130 (Rx $UE_1$) in the plurality of Rx UEs 130, the fourth byte (Oct 4) is a subpart corresponding to the Rx $UE_1$ in the second bitmap part, and the it bit from right to left in the fourth byte (Oct 4) may correspond to a secondary carrier $SCell_i$ ($1 \leq i \leq 8$); the fifth byte (Oct 5) to the seventh byte (Oct 7) may be used to indicate a destination layer-2 identifier of the second Rx UE 130 (Rx $UE_2$) in the plurality of Rx UEs 130, the eighth byte (Oct 8) is a subpart corresponding to the Rx $UE_2$ in the second bitmap part, a correspondence between each bit in the eight byte and a secondary carrier is similar to a correspondence with the Rx $UE_1$, and details are not described herein again; and so on, until the last Rx UE 130 in the plurality of Rx UEs 130. It should be noted that, in each subpart corresponding to each Rx UE 130, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

In addition, in FIG. 25A, the first bitmap part may include the first byte (Oct 1) to the third byte (Oct 3), the fifth byte (Oct 5) to the seventh byte (Oct 7), and the like.

In FIG. 25B, assuming that the maximum quantity of secondary carriers that can be allocated by the network device 120 to the Tx UE 110 is 16, the first byte (Oct 1) to the third byte (Oct 3) may be used to indicate a destination layer-2 identifier of the first Rx UE 130 (Rx $UE_1$) in the plurality of Rx UEs 130, the fourth byte (Oct 4) and the fifth byte (Oct 5) are a subpart corresponding to the Rx $UE_1$ in the second bitmap part, the $i^{th}$ bit from right to left in the fourth byte (Oct 4) may correspond to a secondary carrier $SCell_i$ ($1 \leq i \leq 8$), and the $i^{th}$ bit from right to left in the fifth byte (Oct 5) may correspond to a secondary carrier $SCell_{i+8}$ ($1 \leq i \leq 8$); the sixth byte (Oct 6) to the eighth byte (Oct 8) may be used to indicate a destination layer-2 identifier of the second Rx UE 130 (Rx $UE_2$) in the plurality of Rx UEs 130, the ninth byte (Oct 9) and the tenth byte (Oct 10) are a subpart corresponding to the Rx $UE_2$ in the second bitmap part, a correspondence between each bit in the ninth byte and the tenth byte and a secondary carrier is similar to a correspondence with the Rx $UE_1$, and details are not described herein again; and so on, until the last Rx UE 130 in the plurality of Rx UEs 130. It should be noted that, in each subpart corresponding to each Rx UE 130, a value of a bit that corresponds to a secondary carrier corresponding to the Rx UE 130 may be 0 or 1, and a value of a bit that does not correspond to a secondary carrier corresponding to the Rx UE 130 may be N or a value other than 0 and 1.

In addition, in FIG. 25B, the first bitmap part may include the first byte (Oct 1) to the third byte (Oct 3), the sixth byte (Oct 6) to the eighth byte (Oct 8), and the like.

It should be noted that, in the first bitmap part in the first secondary carrier status indication information, the identifier of each of the plurality of Rx UEs 130 may occupy any quantity of bits, and the quantity is not limited to that shown in FIG. 10A to FIG. 12B; and in the second bitmap part, the total quantity of bits in each subpart corresponding to each of the plurality of Rx UEs 130 is not limited to that shown in FIG. 23A to FIG. 25B either. In addition, the correspondence between each bit in each subpart and a secondary carrier is not limited to that shown in FIG. 23A to FIG. 25B either.

It should be noted that, for each byte (Oct) shown in FIG. 23A to FIG. 25B, it may alternatively be assumed that bits from right to left are arranged from the most significant bit to the least significant bit. In this case, the foregoing embodiment is still applicable.

It should be noted that the second bitmap part in Embodiment 2 may be further used to indicate an activated state or a deactivated state of a primary carrier. In this case, the primary carrier may be considered as a secondary carrier with a globally unique and special number.

It should be noted that the first secondary carrier status indication information having the foregoing structure in this embodiment may be used in S313 in FIG. 3A and FIG. 3B.

Second Secondary Carrier Status Indication Information

In this embodiment, the Tx UE 110 performs local numbering on the plurality of secondary carriers. Therefore, a structure of the second secondary carrier status indication information is the same as that in Embodiment 1. Details are not described herein again.

It should be noted that the second secondary carrier status indication information in this embodiment may be used in S314 in FIG. 3A and FIG. 3B.

Embodiment 3

In this embodiment, the network device 120 performs globally non-unique numbering on the plurality of secondary carriers indicated in the first multi-carrier configuration information. The globally non-unique numbering means that the network device 120 performs global numbering on the plurality of secondary carriers, and each of the plurality of secondary carriers may have at least one number. In this case, the Tx UE 110 can determine, based on a globally non-unique number of a secondary carrier, Rx UE 130 corresponding to the secondary carrier. Therefore, the network device 120 does not need to add an identifier of the Rx UE 130 to the first secondary carrier status indication information.

In this case, the Tx UE 110 may separately perform local numbering on the at least one secondary carrier that corresponds to each Rx UE 130 and that is indicated in the first multi-carrier configuration information. Because the local numbers cannot uniquely determine the secondary carriers, and the second secondary carrier status indication information is related to the local numbers of the secondary carriers, when the second secondary carrier status indication information indicates statuses of the secondary carriers corresponding to the plurality of Rx UEs 130, the identifiers of the Rx UEs 130 need to be added.

The Tx UE 110 may also perform globally non-unique numbering on the plurality of secondary carriers indicated in the first multi-carrier configuration information. In this case, the Rx UE 130 can determine, based on a globally non-unique number of a secondary carrier, that the secondary carrier corresponds to the Rx UE 130. Therefore, the Tx UE 110 does not need to add the identifier of the Rx UE 130 to the second secondary carrier status indication information.

It should be noted that, in this embodiment, that the network device 120 performs globally non-unique numbering on the plurality of secondary carriers indicated in the first multi-carrier configuration information is related to S308 in FIG. 3A and FIG. 3B, that the Tx UE 110 separately performs local numbering or globally non-unique numbering on the at least one secondary carrier that corresponds to each Rx UE 130 and that is indicated in the first multi-carrier configuration information is related to S309 in FIG. 3A and FIG. 3B, the first secondary carrier status indication information is related to S313 in FIG. 3A and FIG. 3B, and the second secondary carrier status indication information is related to S314 in FIG. 3A and FIG. 3B.

Numbering Performed by the Network Device 120 and the Tx UE 110 on the Secondary Carriers FIG. 26 shows an example of carrier allocation at the network device 120 and an example of performing globally non-unique numbering by the network device 120 on the carriers and performing local numbering or globally non-unique numbering by the Tx UE 110 on the carriers. As shown in FIG. 26, it is assumed that the plurality of secondary carriers allocated to the Tx UE 110 at the network device 120 include $F_1$, $F_2$, $F_3$, $F_4$, $F_5$, $F_6$, $F_7$, and $F_8$. Specifically, $F_1$, $F_2$, $F_5$, and $F_8$ are used by the Tx UE 110 to perform sidelink communication with the Rx UE 130a; $F_3$, $F_6$, and $F_7$ are used by the Tx UE 110 to perform sidelink communication with the Rx UE 130b; and $F_1$, $F_4$, $F_6$, and $F_8$ are used by the Tx UE 110 to perform sidelink communication with the Rx UE 130n.

The network device 120 may perform globally non-unique numbering on the plurality of secondary carriers, to indicate the activated states or the deactivated states of the plurality of secondary carriers in the first secondary carrier status indication information. In an example, the network device 120 may perform globally non-unique numbering in an arrangement order of the identifiers of the plurality of secondary carriers in the first multi-carrier configuration information. For example, assuming that the arrangement order of the secondary carriers corresponding to the Rx UE 130a, the Rx UE 130b, and the Rx UE 130n in the first multi-carrier configuration information is $F_1$, $F_2$, $F_5$, $F_8$, $F_3$, $F_6$, $F_7$, $F_1$, $F_4$, $F_6$, and $F_8$, as shown in FIG. 26, globally non-unique numbers of $F_1$, $F_2$, $F_5$, $F_8$, $F_3$, $F_6$, $F_7$, $F_1$, $F_4$, $F_6$, and $F_8$ that are sequentially arranged by the network device 120 may be respectively "①", "②", "③", "④", "⑤", "⑥", "⑦", "⑧", "⑨", "⑩", and "⑪".

It should be noted that carrier allocation at the network device 120 is not limited to that shown in FIG. 26, and the network device 120 may alternatively perform globally non-unique numbering on the plurality of secondary carriers according to any other appropriate rule.

In addition, globally non-unique numbering performed by the network device 120 on the plurality of secondary carriers may be used in S308 in FIG. 3A and FIG. 3B, and the network device 120 may indicate the globally non-unique numbers of the plurality of secondary carriers in the first multi-carrier configuration information. However, when there is a default rule such as the globally non-unique numbering rule in the foregoing example between the Tx UE 110 and the network device 120, the network device 120 may alternatively not indicate the globally non-unique numbers of the plurality of secondary carriers in the first multi-carrier configuration information.

After receiving the first multi-carrier configuration information from the network device 120, the Tx UE 110 may also perform globally non-unique numbering on the plurality of secondary carriers indicated in the first multi-carrier configuration information, to indicate activated states or deactivated states of the plurality of secondary carriers in the second secondary carrier status indication information. In an example, the Tx UE 110 may perform globally non-unique numbering in an arrangement order of the identifiers of the plurality of secondary carriers in the second multi-carrier configuration information. For example, assuming that the arrangement order of the secondary carriers corresponding to the Rx UE 130a, the Rx UE 130b, and the Rx UE 130n in the second multi-carrier configuration information is $F_1$, $F_2$, $F_5$, $F_8$, $F_3$, $F_6$, $F_7$, $F_1$, $F_4$, $F_6$, and $F_8$, as shown in FIG. 26, globally non-unique numbers of $F_1$, $F_2$, $F_5$, $F_8$, $F_3$, $F_6$, $F_7$, $F_1$, $F_4$, $F_6$, and $F_8$ that are sequentially arranged by the Tx UE 110 may be respectively "①", "②", "③", "④", "⑤", "⑥", "⑦", "⑧", "⑨", "⑩", and "⑪". It should be noted that the arrangement order of the identifiers of the plurality of secondary carriers in the second multi-carrier configuration information may be the same as or different from that of the identifiers of the plurality of secondary carriers in the first multi-carrier configuration information.

It should be noted that the Tx UE 110 may alternatively perform, according to any other appropriate rule, globally non-unique numbering on the plurality of secondary carriers indicated in the first multi-carrier configuration information.

In addition, globally non-unique numbering performed by the Tx UE 110 on the plurality of secondary carriers may be used in S309 in FIG. 3A and FIG. 3B, and the Tx UE 110 may indicate the globally non-unique numbers of the plurality of secondary carriers in the second multi-carrier configuration information. However, when there is a default rule such as the globally non-unique numbering rule in the foregoing example between the Tx UE 110 and the Rx UE 130, the Tx UE 110 may alternatively not indicate the globally non-unique numbers of the plurality of secondary carriers in the second multi-carrier configuration information.

In another example, the Tx UE 110 may perform local numbering on the plurality of secondary carriers indicated in the first multi-carrier configuration information, to indicate activated states or deactivated states of the plurality of secondary carriers in the second secondary carrier status indication information. For details, refer to the descriptions of the related part in Embodiment 1. In addition, local numbering performed by the Tx UE 110 on the plurality of secondary carriers may be used in S309 in FIG. 3A and FIG. 3B.

First Secondary Carrier Status Indication Information

The first secondary carrier status indication information may include a secondary carrier status bitmap, to indicate an activated state or a deactivated state of each of at least one secondary carrier corresponding to each of at least one Rx UE 130.

In an example, the secondary carrier status bitmap includes at least one bitmap part, the at least one bitmap part is in a one-to-one correspondence with the at least one Rx UE 130, each of the at least one bitmap part includes at least one bit, the at least one bit is in a one-to-one correspondence with the at least one secondary carrier, and a value of each of the at least one bit indicates the activated state or the deactivated state of each of the at least one secondary carrier.

In an example, a total quantity of bits in the at least one bit part is related to a total quantity of secondary carriers corresponding to the at least one Rx UE 130, and the total quantity of secondary carriers corresponding to the at least one Rx UE 130 is equal to a sum of quantities of the at least one secondary carrier corresponding to all the Rx UEs 130.

In an example, an arrangement order of each bitmap part in the secondary carrier status bitmap is related to an index of each Rx UE 130, and the correspondence between the at least one bit in each bitmap part and the at least one secondary carrier is related to a globally non-unique number of the at least one secondary carrier at the network device 120.

FIG. 27A to FIG. 27C each are a schematic diagram of a structure of the first secondary carrier status indication information. For each byte (Oct) shown in FIG. 27A to FIG. 27C, it is assumed that bits from right to left are arranged from the least significant bit to the most significant bit. In addition, $SCell_j$ represents a secondary carrier whose globally non-unique number is "Ⓙ" at the network device 120, and $Rx\ UE_k$ represents Rx UE 130 whose index is "k", where j and k are positive integers.

In FIG. 27A, the four least significant bits in the first byte (Oct 1) may be a bitmap part corresponding to $Rx\ UE_1$, and the four least significant bits in the first byte (Oct 1) are arranged from right to left; the fifth to seventh bits from right to left in the first byte (Oct 1) may be a bitmap part corresponding to $Rx\ UE_2$, and the fifth to seventh bits from right to left in the first byte (Oct 1) may respectively correspond to secondary carriers $SCell_5$ to $SCell_7$ corresponding to the $Rx\ UE_2$; and the most significant bit in the first byte (Oct 1) and the three least significant bits in the second byte (Oct 2) may be a bitmap part corresponding to $Rx\ UE_3$, the most significant bit in the first byte (Oct 1) may correspond to a secondary carrier $SCell_8$ corresponding to the $Rx\ UE_3$, and the three least significant bits in the second byte (Oct 2) may respectively correspond to secondary carriers $SCell_9$ to $SCell_h$ corresponding to the $Rx\ UE_3$. It should be noted that division of each bitmap part in the secondary carrier status bitmap is not limited to that shown in FIG. 27A.

FIG. 27B is a schematic diagram of a structure of the first secondary carrier status indication information that indicates activated states or deactivated states of the secondary carriers corresponding to the Rx UE 130a, the Rx UE 130b, and the Rx UE 130n in FIG. 26 according to FIG. 27A. It is assumed that an index of the Rx UE 130a is 1, an index of the Rx UE 130b is 2, and an index of the Rx UE 130n is 3. In this case, the four least significant bits in the first byte (Oct 1) correspond to the Rx UE 130a. Specifically, the least significant bit in the first byte (Oct 1) corresponds to a secondary carrier $F_1$ ($SCell_1$) whose globally non-unique number is "①", and a value of the bit is 1, indicating that the secondary carrier $F_1$ is in an activated state; the second bit from right corresponds to a secondary carrier $F_2$ ($SCell_2$) whose globally non-unique number is "②", and a value of the bit is 0, indicating that the secondary carrier $F_2$ is in a deactivated state; the third bit from right corresponds to a secondary carrier $F_5$ ($SCell_3$) whose globally non-unique number is "③", and a value of the bit is 1, indicating that the secondary carrier $F_1$ is in an activated state; and the fourth bit from right corresponds to a secondary carrier $F_8$ ($SCell_4$) whose globally non-unique number is "④", and a value of the bit is 0, indicating that the secondary carrier $F_8$ is in a deactivated state. The fifth to seventh bits from right to left in the first byte (Oct 1) correspond to the Rx UE 130b. Specifically, the fifth bit from right to left in the first byte (Oct 1) corresponds to a secondary carrier $F_3$ ($SCell_5$) whose globally non-unique number is "⑤", and a value of the bit is 0, indicating that the secondary carrier $F_3$ is in a deactivated state; the sixth bit from right corresponds to a secondary carrier $F_6$ ($SCell_6$) whose globally non-unique number is "⑥", and a value of the bit is 1, indicating that the secondary carrier $F_6$ is in a deactivated state; and the seventh bit from right corresponds to a secondary carrier $F_7$ ($SCell_7$) whose globally non-unique number is "⑦", and a value of the bit is 1, indicating that the secondary carrier $F_7$ is in an activated state. The most significant bit in the first byte (Oct 1) and the three least significant bits in the second byte (Oct 2) may correspond to the Rx UE 130n. Specifically, the most significant bit in the first byte (Oct 1) may correspond to a secondary carrier $F_1$ ($SCell_8$) whose globally non-unique number is "⑧", and a value of the bit is 1, indicating that the secondary carrier $F_1$ is in an activated state; the least significant bit in the second byte (Oct 2) corresponds to a secondary carrier $F_4$ ($SCell_9$) whose globally non-unique number is "G", and a value of the bit is 1, indicating that the secondary carrier $F_4$ is in an activated state; the second bit from right corresponds to a secondary carrier $F_6$ ($SCell_{10}$)

whose globally non-unique number is "⑪", and a value of the bit is 0, indicating that the secondary carrier $F_6$ is in a deactivated state; and the third bit from right corresponds to a secondary carrier $F_8$ ($SCell_{11}$) whose globally non-unique number is "⑪", and a value of the bit is 0, indicating that the secondary carrier $F_8$ is in a deactivated state.

FIG. 27C is a schematic diagram of a structure of the first secondary carrier status indication information that indicates activated states or deactivated states of the secondary carriers corresponding to the Rx UE 130a and the Rx UE 130n in FIG. 26 according to FIG. 27A. It is assumed that an index of the Rx UE 130a is 1, an index of the Rx UE 130b is 2, and an index of the Rx UE 130n is 3. In this case, the four least significant bits in the first byte (Oct 1) correspond to the Rx UE 130a. For a specific correspondence, refer to the related descriptions in FIG. 27B. The fifth to seventh bits from right to left in the first byte (Oct 1) correspond to the Rx UE 130b. When the first secondary carrier status indication information does not indicate activated states or deactivated states of the secondary carriers corresponding to the Rx UE 130b at the network device 120, values of the fifth to seventh bits from right to left in the first byte (Oct 1) may be N or values other than 0 and 1. The most significant bit in the first byte (Oct 1) and the three least significant bits in the second byte (Oct 2) may correspond to the Rx UE 130n. For a specific correspondence, refer to the related descriptions in FIG. 27B.

It should be noted that, for each byte (Oct) shown in FIG. 27A to FIG. 27C, it may alternatively be assumed that bits from right to left are arranged from the most significant bit to the least significant bit. In this case, the foregoing embodiment is still applicable.

It should be noted that the first secondary carrier status indication information having the foregoing structure in this embodiment may be used in S313 in FIG. 3A and FIG. 3B. Second Secondary Carrier Status Indication Information When the Tx UE 110 performs globally non-unique numbering on the plurality of secondary carriers indicated in the first multi-carrier configuration information, the second secondary carrier status indication information may include a secondary carrier status bitmap, to indicate an activated state or a deactivated state of each of at least one secondary carrier corresponding to each of at least one Rx UE 130.

In an example, the secondary carrier status bitmap includes at least one bitmap part, the at least one bitmap part is in a one-to-one correspondence with the at least one Rx UE 130, each of the at least one bitmap part includes at least one bit, the at least one bit is in a one-to-one correspondence with the at least one secondary carrier, and a value of each of the at least one bit indicates the activated state or the deactivated state of each of the at least one secondary carrier.

In an example, a total quantity of bits in the at least one bit part is related to a total quantity of secondary carriers corresponding to the at least one Rx UE 130, and the total quantity of secondary carriers corresponding to the at least one Rx UE 130 is equal to a sum of quantities of the at least one secondary carrier corresponding to all the Rx UEs 130.

In an example, an arrangement order of each bitmap part in the secondary carrier status bitmap is related to an index of each Rx UE 130, and the correspondence between the at least one bit in each bitmap part and the at least one secondary carrier is related to a globally non-unique number of the at least one secondary carrier at the Tx UE 110.

FIG. 28A to FIG. 28C each are a schematic diagram of a structure of the second secondary carrier status indication information. For each byte (Oct) shown in FIG. 28A to FIG. 28C, it is assumed that bits from right to left are arranged from the least significant bit to the most significant bit. In addition, $SCell_j$ represents a secondary carrier whose globally non-unique number is "ⓙ" at the Tx UE 110, and Rx $UE_k$ represents Rx UE 130 whose index is "k", where j and k are positive integers.

In FIG. 28A, the four least significant bits in the first byte (Oct 1) may be a bitmap part corresponding to Rx $UE_1$, and the four least significant bits from right to left in the first byte (Oct 1) may respectively correspond to secondary carriers $SCell_1$ to $SCell_4$ corresponding to the Rx $UE_1$; the fifth to seventh bits from right to left in the first byte (Oct 1) may be a bitmap part corresponding to Rx $UE_2$, and the fifth to seventh bits from right to left in the first byte (Oct 1) may respectively correspond to secondary carriers $SCell_5$ to $SCell_7$ corresponding to the Rx $UE_2$; and the most significant bit in the first byte (Oct 1) and the three least significant bits in the second byte (Oct 2) may be a bitmap part corresponding to Rx $UE_3$, the most significant bit in the first byte (Oct 1) may correspond to a secondary carrier $SCell_8$ corresponding to the Rx $UE_3$, and the three least significant bits in the second byte (Oct 2) may respectively correspond to secondary carriers $SCell_9$ to $SCell_h$ corresponding to the Rx $UE_1$. It should be noted that division of each bitmap part in the secondary carrier status bitmap is not limited to that shown in FIG. 28A.

FIG. 28B is a schematic diagram of a structure of the second secondary carrier status indication information that indicates activated states or deactivated states of the secondary carriers corresponding to the Rx UE 130a, the Rx UE 130b, and the Rx UE 130n in FIG. 26 according to FIG. 28A. It is assumed that an index of the Rx UE 130a is 1, an index of the Rx UE 130b is 2, and an index of the Rx UE 130n is 3. In this case, the four least significant bits in the first byte (Oct 1) correspond to the Rx UE 130a. Specifically, the least significant bit in the first byte (Oct 1) corresponds to a secondary carrier $F_1$ ($SCell_1$) whose globally non-unique number is "①", and a value of the bit is 1, indicating that the secondary carrier $F_1$ is in an activated state; the second bit from right corresponds to a secondary carrier $F_2$ ($SCell_2$) whose globally non-unique number is "②", and a value of the bit is 0, indicating that the secondary carrier $F_2$ is in a deactivated state; the third bit from right corresponds to a secondary carrier $F_5$ ($SCell_3$) whose globally non-unique number is "③", and a value of the bit is 1, indicating that the secondary carrier $F_1$ is in an activated state; and the fourth bit from right corresponds to a secondary carrier $F_8$ ($SCell_4$) whose globally non-unique number is "④", and a value of the bit is 0, indicating that the secondary carrier $F_8$ is in a deactivated state. The fifth to seventh bits from right to left in the first byte (Oct 1) correspond to the Rx UE 130b. Specifically, the fifth bit from right to left in the first byte (Oct 1) corresponds to a secondary carrier $F_3$ ($SCell_5$) whose globally non-unique number is "⑤", and a value of the bit is 0, indicating that the secondary carrier $F_3$ is in a deactivated state; the sixth bit from right corresponds to a secondary carrier $F_6$ ($SCell_6$) whose globally non-unique number is "⑥", and a value of the bit is 1, indicating that the secondary carrier $F_6$ is in a deactivated state; and the seventh bit from right corresponds to a secondary carrier $F_7$ ($SCell_7$) whose globally non-unique number is "⑦", and a value of the bit is 1, indicating that the secondary carrier $F_7$ is in an activated state. The most significant bit in the first byte (Oct 1) and the three least significant bits in the second byte (Oct 2) may correspond to the Rx UE 130n. Specifically, the most significant bit in the first byte (Oct 1) may correspond to a secondary carrier $F_1$ ($SCell_8$) whose globally non-unique number is "⑧", and a value of the bit is 1, indicating that the secondary carrier $F_1$ is in an activated state; the least significant bit in the second byte (Oct 2) corresponds to a secondary carrier $F_4$ (SCell$_9$) whose globally non-unique number is "G", and a value of the bit is 1, indicating that the secondary carrier $F_4$ is in an activated state; the second bit from right corresponds to a secondary carrier $F_6$ (SCell$_{10}$) whose globally non-unique number is "⑩", and a value of the bit is 0, indicating that the secondary carrier $F_6$ is in a deactivated state; and the third bit from right corresponds to a secondary carrier $F_8$ (SCell$_{11}$) whose globally non-unique number is "⑪", and a value of the bit is 0, indicating that the secondary carrier $F_8$ is in a deactivated state.

FIG. 28C is a schematic diagram of a structure of the first secondary carrier status indication information that indicates activated states or deactivated states of the secondary carriers corresponding to the Rx UE 130*a* and the Rx UE 130*n* in FIG. 26 according to FIG. 28A. It is assumed that an index of the Rx UE 130*a* is 1, an index of the Rx UE 130*b* is 2, and an index of the Rx UE 130*n* is 3. In this case, the four least significant bits in the first byte (Oct 1) correspond to the Rx UE 130*a*. For a specific correspondence, refer to the related descriptions in FIG. 27B. The fifth to seventh bits from right to left in the first byte (Oct 1) correspond to the Rx UE 130*b*. When the first secondary carrier status indication information does not indicate activated states or deactivated states of the secondary carriers corresponding to the Rx UE 130*b* at the network device 120, values of the fifth to seventh bits from right to left in the first byte (Oct 1) may be N or values other than 0 and 1. The most significant bit in the first byte (Oct 1) and the three least significant bits in the second byte (Oct 2) may correspond to the Rx UE 130*n*. For a specific correspondence, refer to the related descriptions in FIG. 28B.

It should be noted that, for each byte (Oct) shown in FIG. 28A to FIG. 28C, it may alternatively be assumed that bits from right to left are arranged from the most significant bit to the least significant bit. In this case, the foregoing embodiment is still applicable.

When the Tx UE 110 performs local numbering on the plurality of secondary carriers indicated in the first multi-carrier configuration information, for the structure of the second secondary carrier status indication information, refer to the corresponding descriptions in Embodiment 1. Details are not described herein again.

It should be noted that the second secondary carrier status indication information having the foregoing structure in this embodiment may be used in S314 in FIG. 3A and FIG. 3B.

Embodiment 4

First Secondary Carrier Status Indication Information

When corresponding Rx UE 130 can be uniquely determined by using an identifier of a secondary carrier, the first secondary carrier status indication information may include an identifier of an activated-state secondary carrier corresponding to each of one or more Rx UEs 130, or an identifier of a deactivated-state secondary carrier corresponding to each Rx UE 130. The identifier of the secondary carrier may include but is not limited to an ID, a cell index, a number, and the like of the secondary carrier. For example, the number may be the foregoing globally non-unique number at the network device 120. The number is not specifically limited in this application.

For example, assuming that the network device 120 configures SCell$_1$, SCell$_2$, and SCell$_3$ for the Rx UE 130*a*, where SCell$_1$ and SCell$_2$ each are configured to be in an activated state, and SCell$_3$ is configured to be in a deactivated state, the first secondary carrier status indication information may include globally non-unique numbers of SCell$_1$ and SCell$_2$ at the network device 120. Therefore, the Tx UE 110 can learn that SCell$_1$ and SCell$_2$ corresponding to the Rx UE 130*a* each are configured to be in an activated state, and SCell$_3$ is configured to be in a deactivated state.

When corresponding Rx UE 130 cannot be uniquely determined by using an identifier of a secondary carrier, the first secondary carrier status indication information may include identifiers of one or more Rx UEs 130, and an identifier of an activated-state secondary carrier or an identifier of a deactivated-state secondary carrier corresponding to each Rx UE 130. The identifier of the secondary carrier may include but is not limited to an ID, a cell index, a number, and the like of the secondary carrier. For example, the identifier of each Rx UE 130 may be an index of the Rx UE 130 or a destination layer-2 identifier of the Rx UE 130. The number included in the identifier of the secondary carrier may be the foregoing local number, the foregoing globally unique number, or the like at the network device 120. The identifier of the Rx UE 130 or the number included in the identifier of the secondary carrier is not specifically limited in this embodiment of this application.

For example, assuming that the network device 120 configures SCell$_1$, SCell$_2$, and SCell$_3$ for the Rx UE 130*a*, where SCell$_1$ and SCell$_2$ each are configured to be in an activated state, and SCell$_3$ is configured to be in a deactivated state, the first secondary carrier status indication information may include a destination layer-2 identifier of the Rx UE 130*a* and a local number of SCell$_3$ at the network device 120. Therefore, the Tx UE 110 can learn that SCell$_3$ corresponding to the Rx UE 130*a* is configured to be in a deactivated state, and SCell$_1$ and SCell$_2$ each are configured to be in an activated state.

It should be noted that the first secondary carrier status indication information having the foregoing structure in this embodiment may be used in S313 in FIG. 3A and FIG. 3B.

Second Secondary Carrier Status Indication Information

When corresponding Rx UE 130 can be uniquely determined by using an identifier of a secondary carrier, the second secondary carrier status indication information may include an identifier of an activated-state secondary carrier corresponding to each of one or more Rx UEs 130, or an identifier of a deactivated-state secondary carrier corresponding to each Rx UE 130. The identifier of the secondary carrier may include but is not limited to an ID, a cell index, a number, and the like of the secondary carrier. For example, the number included in the identifier of the secondary carrier may be the foregoing globally non-unique number at the Tx UE 110. The number is not specifically limited in this embodiment of this application.

For example, assuming that the first secondary carrier status indication information indicates that SCell$_1$ and SCell$_2$ corresponding to the Rx UE 130*a* each are configured to be in an activated state, and SCell$_3$ is configured to be in a deactivated state, the second secondary carrier status indication information may include globally non-unique numbers of SCell$_1$ and SCell$_2$ at the Tx UE 110. Therefore, the Rx UE 130*a* can learn that SCell$_1$ and SCell$_2$ each are configured to be in an activated state, and SCell$_3$ is configured to be in a deactivated state.

When corresponding Rx UE 130 cannot be uniquely determined by using an identifier of a secondary carrier, the second secondary carrier status indication information may include identifiers of one or more Rx UEs 130, and an identifier of an activated-state secondary carrier or an identifier of a deactivated-state secondary carrier corresponding to each Rx UE 130. The identifier of the secondary carrier may include but is not limited to an ID, a cell index, a number, and the like of the secondary carrier. For example, the identifier of the Rx UE 130 may be an index of the Rx UE 130 or a destination layer-2 identifier of each Rx UE 130. The number included in the identifier of the secondary carrier may be the foregoing local number, the foregoing globally unique number, or the like at the Tx UE 110. The identifier of the Rx UE 130 or the number is not specifically limited in this embodiment of this application.

For example, assuming that the first secondary carrier status indication information indicates that $SCell_1$ and $SCell_2$ corresponding to the Rx UE 130a each are configured to be in an activated state, and $SCell_3$ is configured to be in a deactivated state, the second secondary carrier status indication information may include a destination layer-2 identifier of the Rx UE 130a and a local number of the $SCell_3$ at the Tx UE 110. Therefore, the Rx UE 130a can learn that corresponding $SCell_3$ is configured to be in a deactivated state, and $SCell_1$ and $SCell_2$ each are configured to be in an activated state.

It should be noted that the second secondary carrier status indication information having the foregoing structure in this embodiment may be used in S314 in FIG. 3A and FIG. 3B.

Figure 29A:
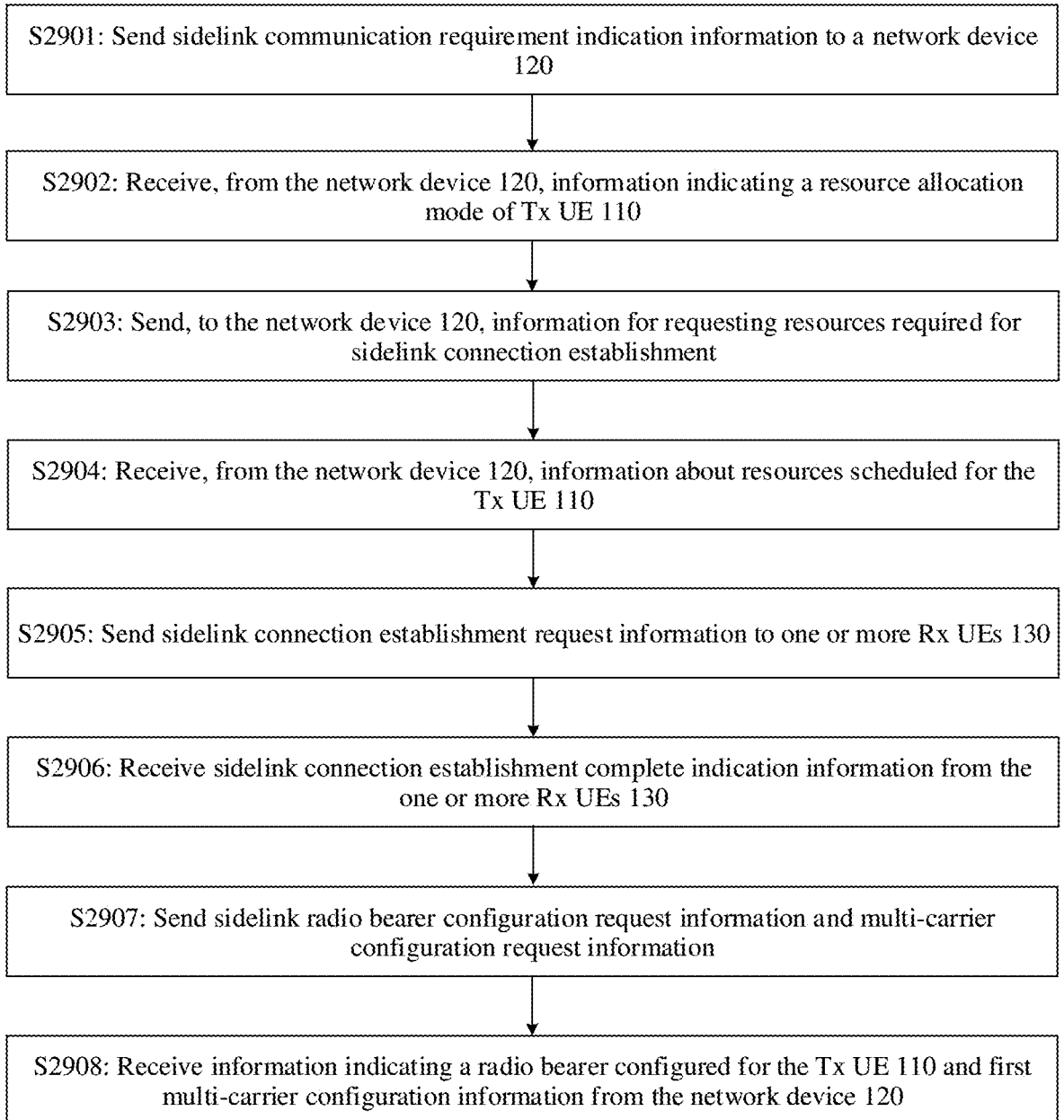
FIG. 29A and FIG. 29B are a schematic flowchart of a wireless communication method 2900 applied to Tx UE 110 according to an embodiment of this application.
Figure 29B:
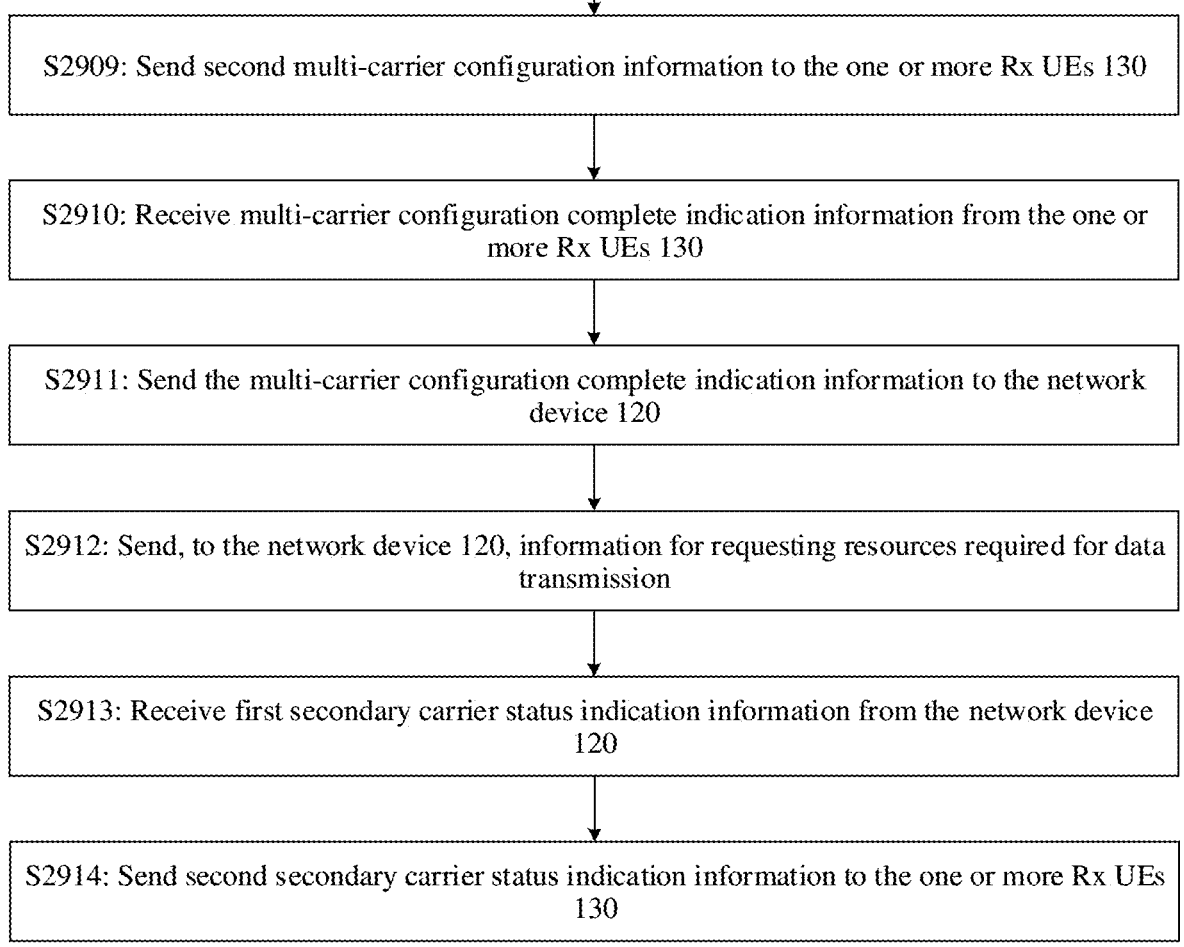

FIG. 29A and FIG. 29B are a schematic flowchart of a wireless communication method 2900 applied to Tx UE 110 according to an embodiment of this application. In the method 2900, steps performed by the Tx UE 110 include the steps related to the Tx UE 110 in FIG. 3A and FIG. 3B.

It should be noted that, although steps of the method are presented in a particular order in this embodiment of this application, the order of the steps may be changed in different embodiments. As shown in FIG. 29A and FIG. 29B, the wireless communication method 2900 may include the following steps:

S2901: The Tx UE 110 sends sidelink communication requirement indication information to a network device 120. For this step, refer to the descriptions of S301 in FIG. 3A and FIG. 3B. Details are not described herein again.

S2902: Receive, from the network device 120, information indicating that a resource allocation mode of the Tx UE 110 is a base station scheduled resource allocation mode. For this step, refer to the descriptions of S302 in FIG. 3A and FIG. 3B. Details are not described herein again.

S2903: Send, to the network device 120, information for requesting resources required for sidelink connection establishment. For this step, refer to the descriptions of S303 in FIG. 3A and FIG. 3B. Details are not described herein again.

S2904: Receive, from the network device 120, information indicating resources scheduled by the network device 120 for the Tx UE 110. For this step, refer to the descriptions of S304 in FIG. 3A and FIG. 3B. Details are not described herein again.

S2905: Send sidelink connection establishment request information to one or more Rx UEs 130 based on the resources allocated by the network device 120. For this step, refer to the descriptions of S305 in FIG. 3A and FIG. 3B. Details are not described herein again.

S2906: Receive sidelink connection establishment complete indication information from the one or more Rx UEs 130. For this step, refer to the descriptions of S306 in FIG. 3A and FIG. 3B. Details are not described herein again.

S2907: When there is data to be transmitted to the Rx UE 130, send sidelink radio bearer establishment request information and multi-carrier configuration request information to the network device 120 by using a third message. For this step, refer to the descriptions of S307 in FIG. 3A and FIG. 3B. Details are not described herein again.

S2908: Receive information indicating a radio bearer configured by the network device 120 for the Tx UE 110 and first multi-carrier configuration information from the network device 120. For this step, refer to the descriptions of S308 in FIG. 3A and FIG. 3B. Details are not described herein again.

S2909: Send second multi-carrier configuration information to the one or more Rx UEs 130. For this step, refer to the descriptions of S309 in FIG. 3A and FIG. 3B. Details are not described herein again.

S2910: Receive multi-carrier configuration complete indication information from the one or more Rx UEs 130. For this step, refer to the descriptions of S310 in FIG. 3A and FIG. 3B. Details are not described herein again.

S2911: Send the multi-carrier configuration complete indication information to the network device 120. For this step, refer to the descriptions of S311 in FIG. 3A and FIG. 3B. Details are not described herein again.

S2912: Send, to the network device 120, information for requesting resources required for data transmission. For this step, refer to the descriptions of S312 in FIG. 3A and FIG. 3B. Details are not described herein again.

S2913: Receive first secondary carrier status indication information from the network device 120. For this step, refer to the descriptions of S313 in FIG. 3A and FIG. 3B. Details are not described herein again.

S2914: Send second secondary carrier status indication information to the one or more Rx UEs 130. For this step, refer to the descriptions of S314 in FIG. 3A and FIG. 3B. Details are not described herein again.

Figure 30:
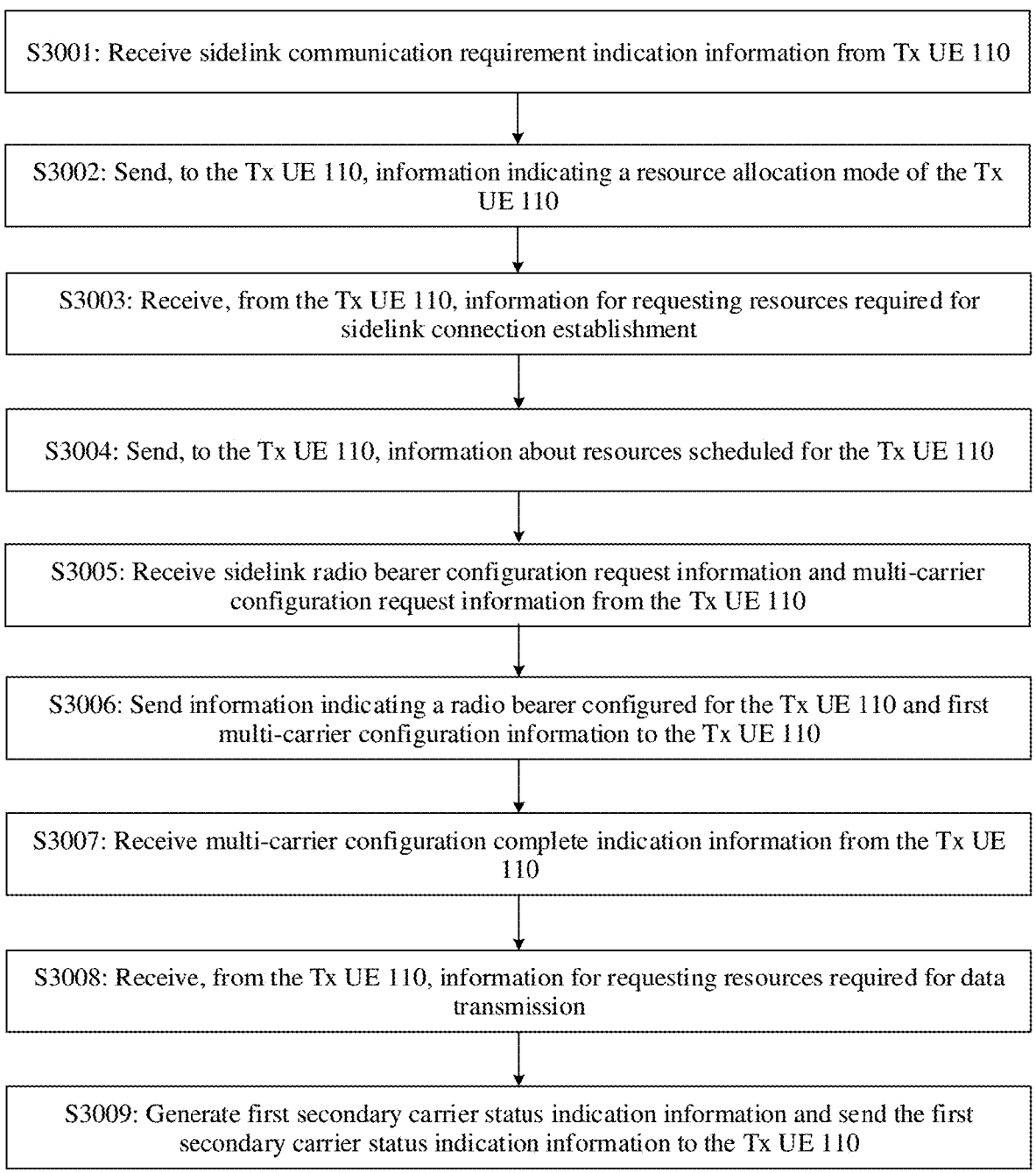
FIG. 30 is a schematic flowchart of a wireless communication method 3000 applied to a network device 120 according to an embodiment of this application.

FIG. 30 is a schematic flowchart of a wireless communication method 3000 applied to a network device 120 according to an embodiment of this application. In the method 3000, steps performed by the network device 120 include the steps related to the network device 120 in FIG. 3A and FIG. 3B.

It should be noted that, although steps of the method are presented in a particular order in this embodiment of this application, the order of the steps may be changed in different embodiments. As shown in FIG. 30, the wireless communication method 3000 may include the following steps:

S3001: Receive sidelink communication requirement indication information from Tx UE 110. For this step, refer to the descriptions of S301 in FIG. 3A and FIG. 3B. Details are not described herein again.

S3002: Send, to the Tx UE 110, information indicating that a resource allocation mode of the Tx UE 110 is a base station scheduled resource allocation mode. For this step, refer to the descriptions of S302 in FIG. 3A and FIG. 3B. Details are not described herein again.

S3003: Receive, from the Tx UE 110, information for requesting resources required for sidelink connection establishment. For this step, refer to the descriptions of S303 in FIG. 3A and FIG. 3B. Details are not described herein again.

S3004: Send, to the Tx UE 110, information indicating resources scheduled by the network device 120 for the Tx UE 110. For this step, refer to the descriptions of S304 in FIG. 3A and FIG. 3B. Details are not described herein again.

S3005: Receive sidelink radio bearer establishment request information and multi-carrier configuration request information from the Tx UE 110. For this step, refer to the descriptions of S307 in FIG. 3A and FIG. 3B. Details are not described herein again.

S3006: Send information indicating a radio bearer configured by the network device 120 for the Tx UE 110 and first multi-carrier configuration information to the Tx UE 110. For this step, refer to the descriptions of S308 in FIG. 3A and FIG. 3B. Details are not described herein again.

S3007: Receive multi-carrier configuration complete indication information from the Tx UE 110. For this step, refer to the descriptions of S311 in FIG. 3A and FIG. 3B. Details are not described herein again.

S3008: Receive, from the Tx UE 110, information for requesting resources required for data transmission. For this step, refer to the descriptions of S312 in FIG. 3A and FIG. 3B. Details are not described herein again.

S3009: Generate first secondary carrier status indication information and send the first secondary carrier status indication information to the Tx UE 110. For this step, refer to the descriptions of S313 in FIG. 3A and FIG. 3B. Details are not described herein again.

Figure 31:
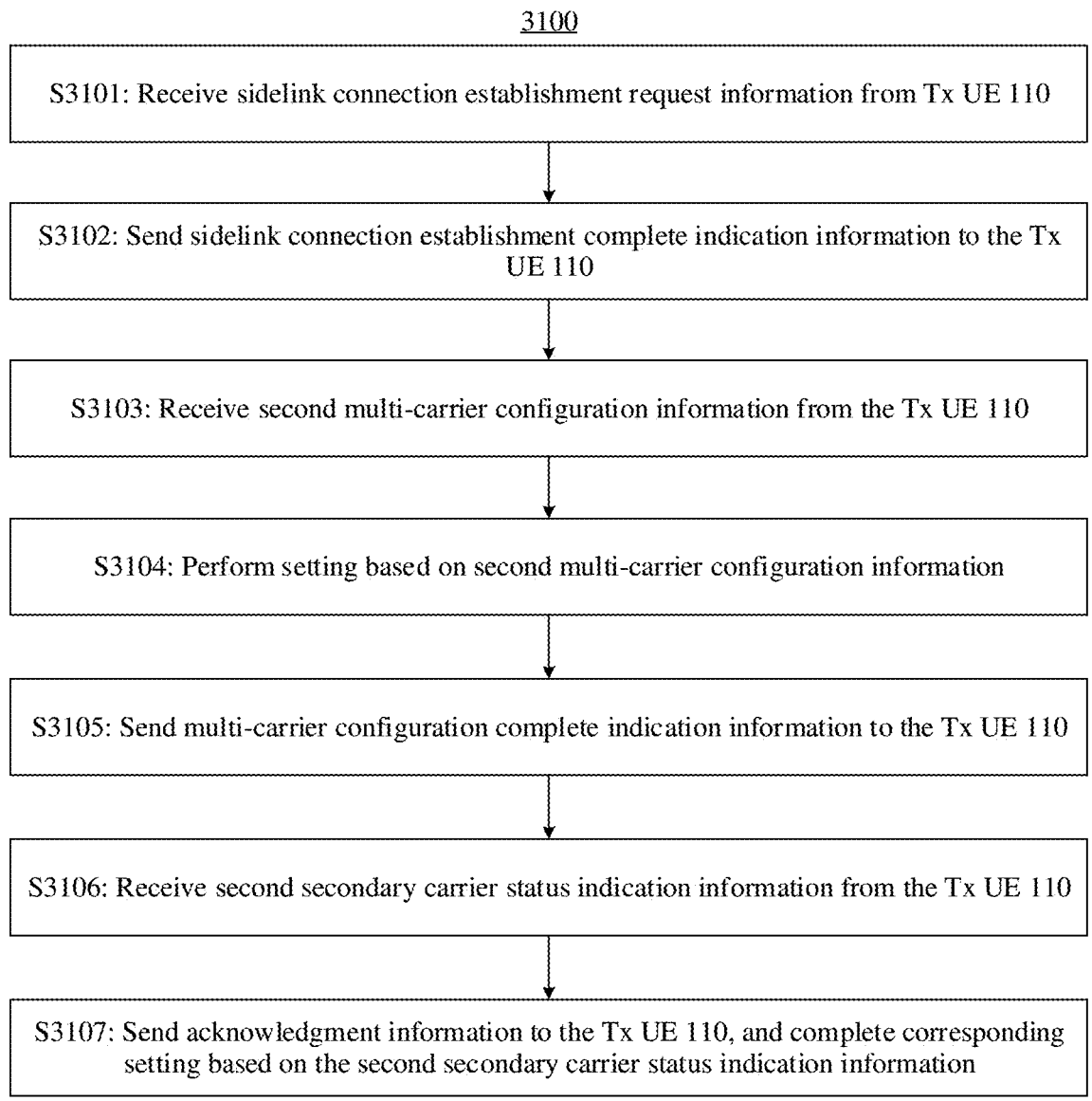
FIG. 31 is a schematic flowchart of a wireless communication method 3100 applied to Rx UE 130 according to an embodiment of this application.

FIG. 31 is a schematic flowchart of a wireless communication method 3100 applied to Rx UE 130 according to an embodiment of this application. In the method 3100, steps performed by the Rx UE 130 include the steps related to the Rx UE 130 in FIG. 3A and FIG. 3B.

It should be noted that, although steps of the method are presented in a particular order in this embodiment of this application, the order of the steps may be changed in different embodiments. As shown in FIG. 31, the wireless communication method 3100 may include the following steps:

S3101: Receive sidelink connection establishment request information from Tx UE 110. For this step, refer to the descriptions of S305 in FIG. 3A and FIG. 3B. Details are not described herein again.

S3102: Send sidelink connection establishment complete indication information to the Tx UE 110. For this step, refer to the descriptions of S306 in FIG. 3A and FIG. 3B. Details are not described herein again.

S3103: Receive second multi-carrier configuration information from the Tx UE 110. For this step, refer to the descriptions of S309 in FIG. 3A and FIG. 3B. Details are not described herein again.

S3104: Perform setting based on the second multi-carrier configuration information from the Tx UE 110, to perform sidelink communication on at least one corresponding secondary carrier. For this step, refer to the descriptions of S310 in FIG. 3A and FIG. 3B. Details are not described herein again.

S3105: Send multi-carrier configuration complete indication information to the Tx UE 110. For this step, refer to the descriptions of S310 in FIG. 3A and FIG. 3B. Details are not described herein again.

S3106: Receive second secondary carrier status indication information from the Tx UE 110. For this step, refer to the descriptions of S314 in FIG. 3A and FIG. 3B. Details are not described herein again.

S3107: Send acknowledgment information to the Tx UE 110 to acknowledge that the second secondary carrier status indication information is received from the Tx UE 110; and complete corresponding setting based on the second secondary carrier status indication information.

In an example, the corresponding setting may include: setting a lower layer to consider an activated state or a deactivated state of the at least one secondary carrier corresponding to the Rx UE 130. For example, the lower layer may be an RLC layer, a MAC layer, or a PHY layer. The lower layer is not specifically limited in this embodiment of this application. The corresponding setting may include, for example but not limited to, monitoring setting on a secondary carrier that is indicated to be in an activated state in the second secondary carrier status indication information, and/or de-monitoring setting on a secondary carrier that is indicated to be in a deactivated state in the second secondary carrier status indication information.

In this embodiment of this application, a procedure required for multi-carrier sidelink communication between the Tx UE 110 and the Rx UE 130 is defined. In addition, the Tx UE 110 performs sidelink communication by using a plurality of carriers, and resources for data transmission increase. Even if the Tx UE 110 has a large data communication requirement, communication quality of the Tx UE 110 can be ensured.

Further, concepts of a primary carrier and a secondary carrier are introduced in this embodiment of this application. The primary carrier is used to establish a sidelink connection between the Tx UE 110 and the Rx UE 130, and the secondary carrier is used to provide an additional radio resource. Division of the primary carrier and the secondary carrier helps control sidelink communication between the Tx UE 110 and the Rx UE 130.

Further, the network device 120 may indicate an activated state or a deactivated state of each secondary carrier to the Tx UE 110, and a secondary carrier activation or deactivation mechanism can better manage battery consumption of the Rx UE 130.

Figure 32:
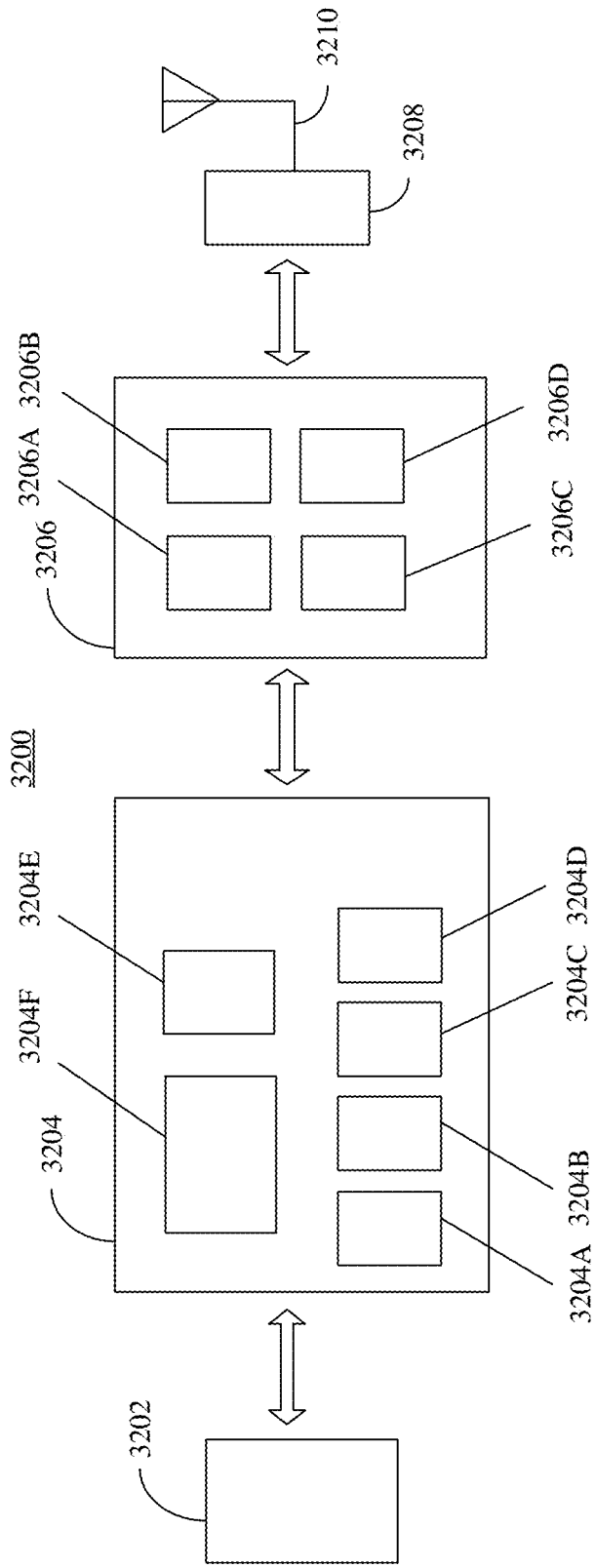
FIG. 32 is a schematic diagram of a structure of a device 3200 according to an embodiment of this application.

FIG. 32 is a schematic module diagram of a device 3200 according to an embodiment of this application. The device 3200 may include the Tx UE 110, the network device 120, and the Rx UE 130 in the foregoing embodiments.

In some embodiments, the device 3200 may include at least an application circuit 3202, a baseband circuit 3204, a radio frequency (RF) circuit 3206, a front end module (FEM) circuit 3208, and one or more antennas 3210 that coupled together, as shown in the figure. The components of the device 3200 may be included in UE. For example, the application circuit 3202 may be included in a processor 102 of UE 10, and the baseband circuit 3204, the radio frequency (RF) circuit 3206, the front end module (FEM) circuit 3208, and the one or more antennas 3210 may be included in a communications module 104 of the UE 10. In some embodiments, the device 3200 may include fewer elements. In some embodiments, the device 3200 may include additional elements, such as a memory/storage device, a display, a camera, a sensor, or an input/output (I/O) interface.

The application circuit 3202 may include one or more application processors. For example, the application circuit 3202 may include a circuit, for example but not limited to, one or more single-core or multi-core processors. The (one or more) processors may include any combination of a general-purpose processor and a special-purpose processor (for example, a graphics processing unit or an application processor). The processor may be coupled to the memory/storage apparatus or may include the memory/storage apparatus, and may be configured to run instructions stored in the memory/storage apparatus, so that the device 3200 can implement any one or more methods described with reference to FIG. 29A and FIG. 29B to FIG. 31. The instructions stored in the memory/storage apparatus may include: when the instructions are run by the processor, the device 3200 is enabled to implement any one or more methods described with reference to FIG. 29A and FIG. 29B to FIG. 31.

The baseband circuit 3204 may include a circuit, for example but not limited to, one or more single-core or multi-core processors. The baseband circuit 3204 may include one or more baseband processors or control logic, to process a baseband signal received from a signal receiving path of the RF circuit 3206 and generate a baseband signal used for a signal sending path of the RF circuit 3206. The baseband processing circuit 3204 may interface with the application circuit 3202 to generate and process a baseband signal and control an operation of the RF circuit 3206. For example, in some embodiments, the baseband circuit 3204 may include a third generation (3G) baseband processor 3204A, a fourth generation (4G) baseband processor 3204B, a fifth generation (5G) baseband processor 3204C, or (one or more) other baseband processors 3204D used in another existing generation, in development, or in a to-be-developed generation in the future (for example, a sixth generation (6G)). The baseband circuit 3204 (for example, one or more of the baseband processors 3204A to D) may process various radio control functions that support communication with one or more radio networks through the RF circuit 3206. In another embodiment, some or all functions of the baseband processors 3204A to D may be included in a module stored in the memory 3204G, and these functions may be performed by using a central processing unit (CPU) 3204E. The radio control functions may include but are not limited to signal modulation/demodulation, encoding/decoding, radio frequency shift, and the like. In some embodiments, the modulation/demodulation circuit of the baseband circuit 3204 may include fast Fourier transform (FIT), precoding, and/or constellation mapping/demapping functions. In some embodiments, the encoding/decoding circuit of the baseband circuit 3204 may include convolution, tail biting (tail biting) convolution, turbo, Viterbi (Viterbi), and/or low-density parity-check (LDPC) encoder/decoder functions. Embodiments of the modulation/demodulation and encoder/decoder functions are not limited to these examples, and other appropriate functions may be included in other embodiments.

In some embodiments, the baseband circuit 3204 may include one or more audio digital signal processors (DSP) 3204F. The (one or more) audio DSPs 3204F may include elements for compression/decompression and echo cancellation, and may include other appropriate processing elements in other embodiments. In some embodiments, the components of the baseband circuit may be appropriately combined in a single chip, a single chip set, or arranged on a same circuit board. In some embodiments, some or all of the components of the baseband circuit 3204 and the application circuit 3202 may be implemented together, for example, on a system-on-a-chip (SOC).

In some embodiments, the baseband circuit 3204 may provide communication compatible with one or more radio technologies. For example, in some embodiments, the baseband circuit 3204 may support communication with an evolved universal terrestrial radio access network (E-UTRAN) or another wireless metropolitan area network (WMAN), a wireless local area network (WLAN), or a wireless personal area network (WPAN). An embodiment in which the baseband circuit 3204 is configured to support radio communication of more than one wireless protocol may be referred to as a multi-mode baseband circuit.

The RF circuit 3206 may support communication with a wireless network through modulated electromagnetic radiation by using a non-solid medium. In various embodiments, the RF circuit 3206 may include a switch, a filter, an amplifier, and the like to assist in communication with the wireless network. The RF circuit 3206 may include a signal receiving path. The signal receiving path may include a circuit that performs down-conversion on an RF signal received from the FEM circuit 3208 and provides a baseband signal for the baseband circuit 3204. The RF circuit 3206 may further include a signal sending path. The signal sending path may include a circuit that performs up-conversion on a baseband signal provided by the baseband circuit 3204 and provides an RF output signal for the FEM circuit 3208 for transmission.

In some embodiments, the signal receiving path of the RF circuit 3206 may include a mixer circuit 3206*a*, an amplifier circuit 3206*b*, and a filter circuit 3206*c*. In some embodiments, the signal sending path of the RF circuit 3206 may include a filter circuit 3206*c* and a mixer circuit 3206*a*. The RF circuit 3206 may further include a synthesizer circuit 3206*d*. The synthesizer circuit is configured to synthesize frequencies for use by the mixer circuits 3206*a* of the signal receiving path and the signal sending path. In some embodiments, the mixer circuit 3206*a* of the signal receiving path may be configured to perform, based on a synthesized frequency provided by the synthesizer circuit 3206*d*, down-conversion on an RF signal received from the FEM circuit 3208. The amplifier circuit 3206*b* may be configured to amplify a down-converted signal, and the filter circuit 3206*c* may be a low-pass filter (LPF) or a bandpass filter (BPF) configured to remove an unwanted signal from the down-converted signal to generate an output baseband signal. The output baseband signal may be provided for the baseband circuit 3204 for further processing. In some embodiments, the output baseband signal may be a zero-frequency baseband signal, but this is not required. In some embodiments, the mixer circuit 3206*a* of the signal receiving path may include a passive mixer, but the scope of the embodiment is not limited in this regard.

In some embodiments, the mixer circuit 3206*a* of the signal sending path may be configured to perform up-conversion on an input baseband signal based on a synthesized frequency provided by the synthesizer circuit 3206*d*, to generate an RF output signal for the FEM circuit 3208. The baseband signal may be provided by the baseband circuit 3204, and the filter circuit 3206*c* may perform filtering on the baseband signal.

In some embodiments, the mixer circuit 3206*a* of the signal receiving path and the mixer circuit 3206*a* of the signal sending path may include two or more mixers, and may be arranged for orthogonal down-conversion and/or up-conversion respectively.

In some embodiments, the mixer circuit 3206*a* of the signal receiving path and the mixer circuit 3206*a* of the signal sending path may include two or more mixers, and may be arranged for image rejection (for example, Hartley image rejection). In some embodiments, the mixer circuit 3206*a* of the signal receiving path and the mixer circuit 3206*a* of the signal sending path may be arranged for direct down-conversion and/or direct up-conversion respectively. In some embodiments, the mixer circuit 3206*a* of the signal receiving path and the mixer circuit 3206*a* of the signal sending path may be configured to perform a superheterodyne operation.

In some embodiments, the output baseband signal and the input baseband signal may be analog baseband signals, but the scope of the embodiment is not limited in this regard. In some alternative embodiments, the output baseband signal and the input baseband signal may be digital baseband signals. In these alternative embodiments, the RF circuit 3206 may include an analog-to-digital converter (ADC) circuit and a digital-to-analog converter (DAC) circuit, and the baseband circuit 3204 may include a digital baseband interface to communicate with the RF circuit 3206.

In some dual-mode embodiments, a separate radio IC circuit may be provided to process a signal of each spectrum, but the scope of the embodiment is not limited in this regard.

In some embodiments, the synthesizer circuit 3206*d* may be a fractional N-type synthesizer or a fractional N/N+1 type synthesizer, but the scope of the embodiment is not limited in this regard because other types of frequency synthesizers may be appropriate. For example, the synthesizer circuit 3206*d* may be a delta-sigma synthesizer, a frequency multiplier, or a synthesizer that includes a phase-locked loop with a frequency divider.

The synthesizer circuit 3206*d* may be configured to synthesize, based on a frequency input and a frequency divider control input, an output frequency for use by the mixer circuit 3206*a* of the RF circuit 3206. In some embodiments, the synthesizer circuit 3206*d* may be a fractional N/N+1 type synthesizer.

In some embodiments, the frequency input may be provided by a voltage-controlled oscillator (VCO), but this is not required. The frequency divider control input may be provided by the baseband circuit 3204 or the application processor 3202 based on a required output frequency. In some embodiments, the frequency divider control input (for example, N) may be determined from a lookup table based on a channel indicated by the application processor 3202.

The synthesizer circuit 3206*d* of the RF circuit 3206 may include a frequency divider, a delay-locked loop (DLL), a multiplexer, and a phase accumulator. In some embodiments, the frequency divider may be a dual-mode frequency divider (DMD), and the phase accumulator may be a digital phase accumulator (DPA). In some embodiments, the DMD may be configured to divide an input signal by N or N+1 (for example, based on a carry output) to provide a fractional division ratio. In some example embodiments, the DLL may include a cascaded set of tunable delay elements, a phase detector, a charge pump, and a D-type flip-flop. In these embodiments, the delay elements may be configured to decompose a VCO cycle into a maximum of Nd equal phase groups, where Nd is a quantity of delay elements in a delay line. In this way, the DLL provides negative feedback to help ensure that a total delay through the delay line is one VCO cycle.

In some embodiments, the synthesizer circuit 3206*d* may be configured to generate a carrier frequency as an output frequency. However, in other embodiments, the output frequency may be a multiple of the carrier frequency (for example, twice the carrier frequency or four times the carrier frequency) and used with a quadrature generator and a frequency divider circuit to generate a plurality of signals with different phases at the carrier frequency. In some embodiments, the output frequency may be an LO frequency (fLO). In some embodiments, the RF circuit 3206 may include an IQ/polarity converter.

The FEM circuit 3208 may include a signal receiving path, and the signal receiving path may include a circuit configured to: operate an RF signal received from the one or more antennas 3210, amplify the received signal, and provide an amplified version of the received signal for the RF circuit 3206 for further processing. The FEM circuit 3208 may further include a signal sending path, and the signal sending path may include a circuit configured to amplify a signal that is provided by the RF circuit 3206 and that is used for transmission, so that the signal is transmitted by one or more of the one or more antennas 3210. In various embodiments, amplification through the signal sending path or the signal receiving path may be completed only in the RF circuit 3206, only in the FEM 3208, or in both the RF circuit 3206 and the FEM 3208.

In some embodiments, the FEM circuit 3208 may include a TX/RX switch, to switch between transmit mode and receive mode operations. The FEM circuit may include a signal receiving path and a signal sending path. The signal receiving path of the FEM circuit may include a low noise amplifier (LNA) to amplify the received RF signal and provide the amplified received RF signal as an output (for example, to the RF circuit 3206). The signal sending path of the FEM circuit 3208 may include a power amplifier (PA) configured to amplify an input RF signal (for example, provided by the RF circuit 3206) and one or more filters configured to generate an RF signal for subsequent transmission (for example, through one or more of the one or more antennas 3210).

Although this application is described with reference to example embodiments, this does not mean that features of the present invention are limited only to the implementations. On the contrary, a purpose of describing the present invention with reference to the implementations is to cover other selections or modifications that may be derived based on the claims of this application. To provide an in-depth understanding of this application, the following descriptions include a plurality of specific details. This application may be alternatively implemented without using these details. In addition, to avoid confusion or blurring the focus of this application, some specific details are omitted from the descriptions. It should be noted that embodiments in this application and the features in embodiments may be mutually combined in a case of no conflict.

In addition, various operations are described as a plurality of discrete operations in a manner that is most conducive to understanding illustrative embodiments. However, an order described should not be construed as implying that these operations need to depend on the order. In particular, these operations do not need to be performed in the rendered order.

As used herein, a term "module" or "unit" may mean, be, or include: an application-specific integrated circuit (ASIC), an electronic circuit, a (shared, special-purpose, or group) processor and/or a memory that executes one or more software or firmware programs, a composite logic circuit, and/or another appropriate component that provides the described functions.

In the accompanying drawings, some structure or method features may be shown in a particular arrangement and/or order. However, it should be understood that such a particular arrangement and/or order may not be required. In some embodiments, these features may be arranged in a manner and/or order different from that shown in the illustrative accompanying drawings. In addition, inclusion of the structure or method features in a particular figure does not imply that such features are required in all embodiments. In some embodiments, these features may not be included or may be combined with other features.

Embodiments of a mechanism disclosed in this application may be implemented by hardware, software, firmware, or a combination of these implementations. Embodiments of this application may be implemented as a computer program or program code executed in a programmable system. The programmable system includes a plurality of processors, a storage system (including a volatile memory, a nonvolatile memory, and/or a storage element), a plurality of input devices, and a plurality of output devices.

The program code may be used to input instructions, to perform functions described in this application and generate output information. The output information may be applied to one or more output devices in a known manner. For a purpose of this application, a processing system includes any system having a processor such as a digital signal processor (DSP), a microcontroller, an application-specific integrated circuit (ASIC), or a microprocessor.

The program code may be implemented by using a high-level programming language or an object-oriented programming language, to communicate with the processing system. The program code may also be implemented by using an assembly language or a machine language when needed. Actually, the mechanism described in this application is not limited to a scope of any particular programming language. In any case, the language may be a compiled language or an interpretive language.

In some cases, the disclosed embodiments may be implemented by hardware, firmware, software, or any combination thereof. In some cases, one or more aspects of at least some embodiments may be implemented by expressive instructions stored in a computer-readable storage medium. The instructions represent various types of logic in a processor, and when the instructions are read by a machine, the machine is enabled to manufacture logic for performing the technologies described in this application. These representations referred to as "IP cores" may be stored in a tangible computer-readable storage medium, and provided for a plurality of customers or production facilities for loading into a manufacturing machine that actually manufactures the logic or the processor.

Such a computer-readable storage medium may include but is not limited to non-transient tangible arrangements of articles manufactured or formed by machines or devices. The computer-readable storage medium includes a storage medium, for example, a hard disk or any other type of disk including a floppy disk, a compact disc, a compact disc read-only memory (CD-ROM), a compact disc rewritable (CD-RW), or a magneto-optical disc; a semiconductor device, for example, a read-only memory (ROM) such as a random access memory (RAM) including a dynamic random access memory (DRAM) or a static random access memory (SRAM), an erasable programmable read-only memory (EPROM), a flash memory, or an electrically erasable programmable read-only memory (EEPROM); a phase change memory (PCM); a magnetic card or an optical card; or any other type of appropriate medium for storing electronic instructions.

Therefore, embodiments of this application further include a non-transient computer-readable storage medium. The medium includes instructions or design data, for example, a hardware description language (HDL), and defines a structure, a circuit, an apparatus, a processor, and/or a system feature described in this application.

With reference to the foregoing descriptions, this application further provides the following embodiments:

Embodiment 1: A wireless communication method applied to transmission user equipment (Tx UE) is provided, and the method includes:

receiving first secondary carrier (SCell) status indication information from a network device, where the first secondary carrier status indication information indicates that each of a plurality of secondary carriers is in an activated state or a deactivated state, the plurality of secondary carriers are used for multi-carrier sidelink communication between the transmission user equipment and at least one reception user equipment, and each of the at least one reception user equipment corresponds to at least one of the plurality of secondary carriers; and sending second secondary carrier status indication information to each reception user equipment, where the second secondary carrier status indication information indicates that each of the at least one secondary carrier is in an activated state or a deactivated state.

Embodiment 2: According to the method in Embodiment 1, the method further includes:

receiving first multi-carrier configuration information from the network device, where the first multi-carrier configuration information is used to indicate information related to the plurality of secondary carriers configured by the network device, and the first multi-carrier configuration information includes an identifier of each reception user equipment and an identifier of the at least one secondary carrier corresponding to each reception user equipment in the plurality of secondary carriers; and sending second multi-carrier configuration information to each reception user equipment based on the first multi-carrier configuration information, where the second multi-carrier configuration information includes the identifier of the at least one secondary carrier corresponding to each reception user equipment.

Embodiment 3: According to the method in Embodiment 1 or 2, when the at least one reception user equipment includes first reception user equipment, the first secondary carrier status indication information includes a secondary carrier status bitmap, and the secondary carrier status bitmap includes a first bitmap part that is used to indicate an identifier of the first reception user equipment and a second bitmap part that is used to indicate an activated state or a deactivated state of each of at least one secondary carrier corresponding to the first reception user equipment.

Embodiment 4: According to the method in Embodiment 3, the identifier of the first reception user equipment includes a destination layer-2 identifier (destination layer-2 ID) of the first reception user equipment or an index of the first reception user equipment.

Embodiment 5: According to the method in Embodiment 3 or 4, at least one bit in the second bitmap part is in a one-to-one correspondence with the at least one secondary carrier, and a value of each of the at least one bit indicates the activated state or the deactivated state of each of the at least one secondary carrier.

Embodiment 6: According to the method in any one of Embodiments 3 to 5, a total quantity of bits in the second bitmap part is related to a maximum quantity of secondary carriers supported by the first reception user equipment or the transmission user equipment.

Embodiment 7: According to the method in Embodiment 5 or 6, the correspondence between the at least one bit in the second bitmap part and the at least one secondary carrier is related to an arrangement order of the identifier of the at least one secondary carrier in the first multi-carrier configuration information.

Embodiment 8: According to the method in Embodiment 5 or 6, the correspondence between the at least one bit in the second bitmap part and the at least one secondary carrier is related to an index of each of the at least one secondary carrier in the plurality of secondary carriers.

Embodiment 9: According to the method in any one of Embodiments 3 to 8, the second secondary carrier status indication information includes the second bitmap part, or includes the first bitmap part and the second bitmap part.

Embodiment 10: According to the method in Embodiment 1 or 2, the receiving first secondary carrier status indication information from a network device includes:

respectively receiving a plurality of parts of the first secondary carrier status indication information at different moments, where the plurality of parts of the first secondary carrier status indication information respectively indicate activated states or deactivated states of secondary carriers corresponding to different reception user equipments in the at least one reception user equipment; and the sending second secondary carrier status indication information to each reception user equipment includes:

after the plurality of parts of the first secondary carrier status indication information are received, sending the second secondary carrier status indication information to each reception user equipment.

Embodiment 11: A wireless communication method applied to a network device is provided, and the method includes:

generating first secondary carrier status indication information, where the first secondary carrier status indication information indicates that each of a plurality of secondary carriers is in an activated state or a deactivated state, the plurality of secondary carriers are used for multi-carrier sidelink communication between transmission user equipment and at least one reception user equipment, and each of the at least one reception user equipment corresponds to at least one of the plurality of secondary carriers; and sending the first secondary carrier status indication information to the transmission user equipment (Tx UE).

Embodiment 12: According to the method in Embodiment 11, the method further includes:

sending first multi-carrier configuration information to the transmission user equipment, where the first multi-carrier configuration information is used to indicate information related to the plurality of secondary carriers configured by the network device, and the first multi-carrier configuration information includes an identifier of each reception user equipment and an identifier of the at least one secondary carrier corresponding to each reception user equipment in the plurality of secondary carriers.

Embodiment 13: According to the method in Embodiment 10 or 11, when the at least one reception user equipment includes one reception user equipment, the first secondary carrier status indication information includes a secondary carrier status bitmap, and the secondary carrier status bitmap includes a first bitmap part that is used to indicate an identifier of the first reception user equipment and a second bitmap part that is used to indicate an activated state or a deactivated state of each of at least one secondary carrier corresponding to the first reception user equipment.

Embodiment 14: According to the method in Embodiment 3, the identifier of the first reception user equipment includes a destination layer-2 identifier (destination layer-2 ID) of the first reception user equipment or an index of the first reception user equipment.

Embodiment 15: According to the method in Embodiment 13 or 14, at least one bit in the second bitmap part is in a one-to-one correspondence with the at least one secondary carrier, and a value of each of the at least one bit indicates the activated state or the deactivated state of each of the at least one secondary carrier.

Embodiment 16: According to the method in Embodiment 15, the correspondence between the at least one bit in the second bitmap part and the at least one secondary carrier is related to an arrangement order of the identifier of the at least one secondary carrier in the first multi-carrier configuration information.

Embodiment 17: According to the method in Embodiment 15 or 16, a total quantity of bits in the second bitmap part is related to a maximum quantity of secondary carriers supported by the first reception user equipment or the transmission user equipment.

Embodiment 18: According to the method in Embodiment 15 or 16, the correspondence between the at least one bit in the second bitmap part and the at least one secondary carrier is related to an index of each of the at least one secondary carrier corresponding to the first reception user equipment in the plurality of secondary carriers.

Embodiment 19: A wireless communication method applied to reception user equipment (Rx UE) is provided, and the method includes:

receiving second secondary carrier status indication information from transmission user equipment (Tx UE), where the second secondary carrier status indication information indicates an activated state or a deactivated state of at least one secondary carrier corresponding to the reception user equipment, and the at least one secondary carrier is used for multi-carrier sidelink communication between the transmission user equipment and the reception user equipment;

sending acknowledgment information to the transmission user equipment to acknowledge that the second secondary carrier status indication information is received; and completing corresponding setting based on the second secondary carrier status indication information.

Embodiment 20: According to the wireless communication method in Embodiment 19, the method further includes:

receiving second multi-carrier configuration information from the transmission user equipment, where the second multi-carrier configuration information is used to indicate the at least one secondary carrier that is configured by a network device for multi-carrier sidelink communication between the transmission user equipment and the reception user equipment, and the second multi-carrier configuration information includes an identifier of the at least one secondary carrier.

Embodiment 21: According to the wireless communication method in Embodiment 19 or 20, the second secondary carrier status indication information includes an activated bitmap or a deactivated bitmap, and the activated bitmap or the deactivated bitmap includes a third bitmap part that is used to indicate the activated state or the deactivated state of each of the at least one secondary carrier.

Embodiment 22: According to the wireless communication method in any one of Embodiments 19 to 21, the second secondary carrier status indication information further includes a fourth bitmap part that is used to indicate an identifier of the reception user equipment.

Embodiment 23: According to the wireless communication method in Embodiment 22, the identifier of the reception user equipment includes a destination layer-2 identifier (destination layer-2 ID) of the reception user equipment or an index of the reception user equipment.

Embodiment 24: According to the wireless communication method in any one of Embodiments 21 to 23, at least one bit in the third bitmap part is in a one-to-one correspondence with the at least one secondary carrier, and a value of each of the at least one bit indicates the activated state or the deactivated state of each of the at least one secondary carrier.

Embodiment 25: According to the wireless communication method in any one of Embodiments 21 to 24, a total quantity of bits in the third bitmap part is related to a maximum quantity of secondary carriers supported by the reception user equipment or the transmission user equipment.

Embodiment 26: According to the wireless communication method in Embodiment 24 or 25, the correspondence between the at least one bit in the third bitmap part and the at least one secondary carrier is related to an arrangement order of the identifier of the at least one secondary carrier in the second multi-carrier configuration information.

Embodiment 27: According to the wireless communication method in Embodiment 24 or 25, the correspondence between the at least one bit in the third bitmap part and the at least one secondary carrier is related to an index of each of the at least one secondary carrier in the plurality of secondary carriers, the plurality of secondary carriers are used for sidelink communication between the transmission user equipment and at least one reception user equipment, and the at least one reception user equipment includes the reception user equipment.

Embodiment 28: According to the wireless communication method in any one of Embodiments 19 to 27, the corresponding setting includes monitoring setting on a secondary carrier, in the at least one secondary carrier, that is indicated to be in an activated state in the second secondary carrier status indication information, and/or de-monitoring setting on a secondary carrier, in the at least one secondary carrier, that is indicated to be in a deactivated state in the second secondary carrier activation or deactivation information.

Embodiment 29: A wireless communication method applied to reception user equipment (Rx UE) is provided, and the method includes:
receiving second secondary carrier status indication information from transmission user equipment (Tx UE), where the second secondary carrier status indication information indicates an activated state or a deactivated state of at least one secondary carrier corresponding to each of a plurality of reception user equipments, the plurality of reception user equipments include the reception user equipment, and the at least one secondary carrier is used for multi-carrier sidelink communication between the transmission user equipment and each reception user equipment;
sending acknowledgment information to the transmission user equipment to acknowledge that the second secondary carrier status indication information is received; and
completing corresponding setting based on the second secondary carrier status indication information.

Embodiment 30: According to the wireless communication method in Embodiment 29, the method further includes:
receiving second multi-carrier configuration information from the transmission user equipment, where the second multi-carrier configuration information includes an identifier of the at least one secondary carrier corresponding to each reception user equipment.

Embodiment 31: According to the wireless communication method in Embodiment 29 or 31, the second secondary carrier status indication information includes an activated bitmap or a deactivated bitmap, and the activated bitmap or the deactivated bitmap includes a third bitmap part that is used to indicate the activated state or the deactivated state of each of the at least one secondary carrier corresponding to each reception user equipment and a fourth bitmap part that is used to indicate an index or a destination layer-2 identifier of each reception user equipment.

Embodiment 32: According to the wireless communication method in Embodiment 31, a total quantity of bits in the third bitmap part is related to a maximum quantity of reception user equipments supported by the transmission user equipment, a plurality of bits in the third bitmap are in a one-to-one correspondence with the plurality of reception user equipments, and the correspondence between the plurality of bits and the plurality of reception user equipments is related to the index of each reception user equipment.

Embodiment 33: According to the wireless communication method in Embodiment 31 or 32, the fourth bitmap part includes a plurality of bit rows, the plurality of bit rows correspond to the plurality of reception user equipments, at least one bit row corresponding to each reception user equipment in the plurality of bit rows includes at least one bit, the at least one bit is in a one-to-one correspondence with the at least one secondary carrier, and a value of each of the at least one bit indicates the activated state or the deactivated state of each of the at least one secondary carrier.

Embodiment 34: According to the wireless communication method in any one of Embodiments 31 to 33, a total quantity of bits included in the at least one bit row is related to a maximum quantity of secondary carriers supported by each reception user equipment or the transmission user equipment.

Embodiment 35: According to the wireless communication method in Embodiment 33 or 34, the correspondence between the at least one bit in the at least one bit row and the at least one secondary carrier is related to an arrangement order of the identifier of the at least one secondary carrier in the second multi-carrier configuration information.

Embodiment 36: According to the wireless communication method in Embodiment 33 or 34, the correspondence between the at least one bit in the at least one bit row and the at least one secondary carrier is related to an index of each of the at least one secondary carrier in the plurality of secondary carriers, and the plurality of secondary carriers are used for sidelink communication between the transmission user equipment and at least one reception user equipment.

Embodiment 37: According to the wireless communication method in any one of Embodiments 29 to 36, the corresponding setting includes monitoring setting on a secondary carrier, in the at least one secondary carrier, that is indicated to be in an activated state in the second secondary carrier status indication information, and/or de-monitoring setting on a secondary carrier, in the at least one secondary carrier, that is indicated to be in a deactivated state in the second secondary carrier activation or deactivation information.

Embodiment 38: A wireless communication method applied to reception user equipment (Rx UE) is provided, and the method includes:

receiving second secondary carrier status indication information from transmission user equipment (Tx UE), where the second secondary carrier status indication information indicates an activated state or a deactivated state of at least one secondary carrier corresponding to each of at least one reception user equipment, the at least one reception user equipment includes the reception user equipment, and the at least one secondary carrier is used for multi-carrier sidelink communication between the transmission user equipment and each reception user equipment; and sending acknowledgment information to the transmission user equipment to acknowledge that the second secondary carrier status indication information is received.

Embodiment 39: According to the wireless communication method in Embodiment 38, the method further includes:

receiving second multi-carrier configuration information from the transmission user equipment, where the second multi-carrier configuration information includes an identifier of the at least one secondary carrier corresponding to each reception user equipment.

Embodiment 40: According to the wireless communication method in Embodiment 38 or 39, the second secondary carrier status indication information includes an activated bitmap or a deactivated bitmap that is used to indicate the activated state or the deactivated state of each of the at least one secondary carrier corresponding to each reception user equipment.

Embodiment 41: According to the wireless communication method in Embodiment 40, the activated bitmap or the deactivated bitmap includes at least one bitmap part, the at least one bitmap part is in a one-to-one correspondence with the at least one reception user equipment, each of the at least one bitmap part includes at least one bit, the at least one bit is in a one-to-one correspondence with the at least one secondary carrier, and a value of each of the at least one bit indicates the activated state or the deactivated state of each of the at least one secondary carrier.

Embodiment 42: According to the wireless communication method in Embodiment 41, a total quantity of bits in the at least one bit part is related to a total quantity of secondary carriers corresponding to the at least one reception user equipment, and the total quantity of secondary carriers corresponding to the at least one reception user equipment is equal to a sum of quantities of the at least one secondary carrier corresponding to all the reception user equipments.

Embodiment 43: According to the wireless communication method in Embodiment 41 or 42, an arrangement order of each bitmap part in the activated bitmap or the deactivated bitmap is related to an arrangement order of an identifier of each reception user equipment in the second multi-carrier configuration information, and the correspondence between the at least one bit and the at least one secondary carrier is related to an arrangement order of the identifier of the at least one secondary carrier in the second multi-carrier configuration information.

Embodiment 44: According to the wireless communication method in any one of Embodiments 38 to 43, the corresponding setting includes monitoring setting on a secondary carrier, in the at least one secondary carrier, that is indicated to be in an activated state in the second secondary carrier status indication information, and/or de-monitoring setting on a secondary carrier, in the at least one secondary carrier, that is indicated to be in a deactivated state in the second secondary carrier activation or deactivation information.

Embodiment 45: A machine-readable medium is provided. The medium stores instructions, and when the instructions are run on a machine, the machine is enabled to perform the method in any one of Embodiments 1 to 44.

Embodiment 46: A device is provided, and the device includes:

a processor; and a memory, where the memory stores instructions, and when the instructions are run on the processor, the system is enabled to perform the method in any one of Embodiments 1 to 44.

Embodiment 47: A communications system is provided, and the communications system includes transmission user equipment, a network device, and reception user equipment, where the network device is configured to generate first secondary carrier status indication information and send the first secondary carrier status indication information to the transmission user equipment, where the first secondary carrier status indication information indicates that each of a plurality of secondary carriers is in an activated state or a deactivated state, the plurality of secondary carriers are used for multi-carrier sidelink communication between the transmission user equipment and at least one reception user equipment, and each of the at least one reception user equipment corresponds to at least one of the plurality of secondary carriers;

the transmission user equipment is configured to: receive the first secondary carrier status indication information, and send second secondary carrier status indication information to each reception user equipment, where the second secondary carrier status indication information indicates that each of the at least one secondary carrier is in an activated state or a deactivated state; and the reception user equipment is configured to: send acknowledgment information to the transmission user equipment to acknowledge that the second secondary carrier status indication information is received, and complete corresponding setting based on the second secondary carrier status indication information.

What is claimed is:

1. A wireless communication method applied to a transmission user equipment (Tx UE), comprising:

receiving first secondary carrier status indication information from a network device, wherein the first secondary carrier status indication information indicates that each of a plurality of secondary carriers is in an activated state or a deactivated state, the plurality of secondary carriers are configured for multi-carrier sidelink communication between the transmission user equipment and a plurality of reception user equipments, and each reception user equipment of the plurality of reception user equipments corresponds to at least one secondary carrier of the plurality of secondary carriers; and sending second secondary carrier status indication information to each reception user equipment of the plurality of reception user equipments, wherein the second secondary carrier status indication information indicates that each of the at least one secondary carrier is in the activated state or the deactivated state, wherein the first secondary carrier status indication information comprises a secondary carrier status bitmap, and the secondary carrier status bitmap comprises a first bitmap part that indicates an index or a destination layer-2 identifier of each reception user equipment and a second bitmap part that indicates the activated state or the deactivated state of each of the at least one secondary carrier corresponding to each reception user equipment, and wherein the second bitmap part comprises a plurality of bit rows, the plurality of bit rows correspond to the plurality of reception user equipments, at least one bit row corresponding to each reception user equipment in the plurality of bit rows comprises at least one bit, the at least one bit is in a one-to-one correspondence with the at least one secondary carrier, and a value of each of the at least one bit indicates the activated state or the deactivated state of each of the at least one secondary carrier.

2. The wireless communication method according to claim 1, further comprising:

receiving first multi-carrier configuration information from the network device, wherein the first multi-carrier configuration information indicates information related to the plurality of secondary carriers configured by the network device, and the first multi-carrier configuration information comprises an identifier of each reception user equipment and an identifier of each of the at least one secondary carrier corresponding to each reception user equipment; and sending second multi-carrier configuration information to each reception user equipment based on the first multi-carrier configuration information, wherein the second multi-carrier configuration information comprises the identifier of each of the at least one secondary carrier corresponding to each reception user equipment.

3. The wireless communication method according to claim 1, wherein a total quantity of bits in the first bitmap part is related to a maximum quantity of reception user equipments supported by the transmission user equipment, a plurality of bits in the first bitmap part are in a one-to-one correspondence with the plurality of reception user equipments, and a correspondence between the plurality of bits and the plurality of reception user equipments is related to the index of each reception user equipment.

4. The wireless communication method according to claim 1, wherein a total quantity of bits comprised in the at least one bit row is related to a maximum quantity of secondary carriers supported by each reception user equipment or the transmission user equipment.

5. The wireless communication method according to claim 4, wherein the one-to-one correspondence between the at least one bit in the at least one bit row and the at least one secondary carrier is related to an arrangement order of identifier(s) of the at least one secondary carrier, or is related to an index of each of the at least one secondary carrier in the plurality of secondary carriers.

6. The wireless communication method according to claim 1, wherein the second secondary carrier status indication information comprises a bitmap part related to each reception user equipment in the second bitmap part, or comprises the first bitmap part and the second bitmap part.

7. The wireless communication method according to claim 1, wherein the secondary carrier status bitmap indicates the activated state or the deactivated state of each of the at least one secondary carrier corresponding to each reception user equipment.

8. The wireless communication method according to claim 7, wherein the secondary carrier status bitmap comprises at least one bitmap part, the at least one bitmap part is in a one-to-one correspondence with the plurality of reception user equipments, and each of the at least one bitmap part comprises at least one bit, the at least one bit is in the one-to-one correspondence with the at least one secondary carrier.

9. The wireless communication method according to claim 8, wherein a total quantity of bits in the at least one bitmap part is related to a total quantity of secondary carriers corresponding to the plurality of reception user equipments, and the total quantity of secondary carriers corresponding to the plurality of reception user equipments is equal to a sum of quantities of the at least one secondary carrier corresponding to each of the plurality of reception user equipments.

10. The wireless communication method according to claim 8, wherein an arrangement order of the at least one bitmap part in the secondary carrier status bitmap is related to an arrangement order of identifiers of the plurality of reception user equipments, and the one-to-one correspondence between the at least one bit and the at least one secondary carrier is related to an arrangement order of identifier(s) of the at least one secondary carrier.

11. The wireless communication method according to claim 8, wherein the second secondary carrier status indication information comprises the at least one bitmap part.

12. The wireless communication method according to claim 1, wherein the second secondary carrier status indication information comprises a second secondary carrier status bitmap, and the second secondary carrier status bitmap comprises a first bitmap part that indicates an index or a destination layer-2 identifier of each reception user equipment and a second bitmap part that indicates the activated state or the deactivated state of each of the at least one secondary carrier corresponding to each reception user equipment.

13. A transmission user equipment (Tx UE), comprises a processor, and a non-transitory memory, the non-transitory memory stores program instructions, and when the program instructions are executed, the transmission user equipment is caused to perform:

receiving first secondary carrier status indication information from a network device, wherein the first secondary carrier status indication information indicates that each of a plurality of secondary carriers is in an activated state or a deactivated state, the plurality of secondary carriers are configured for multi-carrier sidelink communication between the transmission user equipment and a plurality of reception user equipments, and each reception user equipment of the plurality of reception user equipments corresponds to at least one secondary carrier of the plurality of secondary carriers; and sending second secondary carrier status indication information to each reception user equipment of the plurality of reception user equipments, wherein the second secondary carrier status indication information indicates that each of the at least one secondary carrier is in the activated state or the deactivated state, wherein the first secondary carrier status indication information comprises a secondary carrier status bitmap, and the secondary carrier status bitmap comprises a first bitmap part that indicates an index or a destination layer-2 identifier of each reception user equipment and a second bitmap part that indicates the activated state or the deactivated state of each of the at least one secondary carrier corresponding to each reception user equipment, and wherein the second bitmap part comprises a plurality of bit rows, the plurality of bit rows correspond to the plurality of reception user equipments, at least one bit row corresponding to each reception user equipment in the plurality of bit rows comprises at least one bit, the at least one bit is in a one-to-one correspondence with the at least one secondary carrier, and a value of each of the at least one bit indicates the activated state or the deactivated state of each of the at least one secondary carrier.

14. The transmission user equipment according to claim 13, wherein the transmission user equipment is caused to further perform:
receiving first multi-carrier configuration information from the network device, wherein the first multi-carrier configuration information indicates information related to the plurality of secondary carriers configured by the network device, and the first multi-carrier configuration information comprises an identifier of each reception user equipment and an identifier of each of the at least one secondary carrier corresponding to each reception user equipment; and
sending second multi-carrier configuration information to each reception user equipment based on the first multi-carrier configuration information, wherein the second multi-carrier configuration information comprises the identifier of each of the at least one secondary carrier corresponding to each reception user equipment.

15. The transmission user equipment according to claim 13, wherein a total quantity of bits in the first bitmap part is related to a maximum quantity of reception user equipments supported by the transmission user equipment, a plurality of bits in the first bitmap part are in a one-to-one correspondence with the plurality of reception user equipments, and a correspondence between the plurality of bits and the plurality of reception user equipments is related to the index of each reception user equipment.

16. The transmission user equipment according to claim 13, wherein a total quantity of bits comprised in the at least one bit row is related to a maximum quantity of secondary carriers supported by each reception user equipment or the transmission user equipment.

17. The transmission user equipment according to claim 16, wherein the one-to-one correspondence between the at least one bit in the at least one bit row and the at least one secondary carrier is related to an arrangement order of identifier(s) of the at least one secondary carrier, or is related to an index of each of the at least one secondary carrier in the plurality of secondary carriers.

18. The transmission user equipment according to claim 13, wherein the second secondary carrier status indication information comprises a bitmap part related to each reception user equipment in the second bitmap part, or comprises the first bitmap part and the second bitmap part.

19. The transmission user equipment according to claim 13, wherein the secondary carrier status bitmap indicates the activated state or the deactivated state of each of the at least one secondary carrier corresponding to each reception user equipment.

20. The transmission user equipment according to claim 19, wherein the secondary carrier status bitmap comprises at least one bitmap part, the at least one bitmap part is in a one-to-one correspondence with the plurality of reception user equipments, and each of the at least one bitmap part comprises at least one bit, the at least one bit is in the one-to-one correspondence with the at least one secondary carrier.

21. The transmission user equipment according to claim 20, wherein a total quantity of bits in the at least one bitmap part is related to a total quantity of secondary carriers corresponding to the plurality of reception user equipments, and the total quantity of secondary carriers corresponding to the plurality of reception user equipments is equal to a sum of quantities of the at least one secondary carrier corresponding to each of the plurality of reception user equipments.

* * * * *